United States Patent
Park et al.

(10) Patent No.: US 9,491,750 B2
(45) Date of Patent: Nov. 8, 2016

(54) METHOD AND APPARATUS FOR TRANSRECEIVING DOWNLINK SIGNAL BY CONSIDERING ANTENNA PORT RELATIONSHIP IN WIRELESS COMMUNICATION SYSTEM

(71) Applicant: LG Electronics Inc., Seoul (KR)

(72) Inventors: Jonghyun Park, Anyang-si (KR); Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 14/420,243

(22) PCT Filed: Oct. 4, 2013

(86) PCT No.: PCT/KR2013/008873
§ 371 (c)(1),
(2) Date: Feb. 6, 2015

(87) PCT Pub. No.: WO2014/054902
PCT Pub. Date: Apr. 10, 2014

(65) Prior Publication Data
US 2015/0229451 A1   Aug. 13, 2015

Related U.S. Application Data

(60) Provisional application No. 61/709,975, filed on Oct. 4, 2012, provisional application No. 61/729,301, filed on Nov. 21, 2012.

(51) Int. Cl.
*H04W 72/04* (2009.01)
*H04L 5/00* (2006.01)
(Continued)

(52) U.S. Cl.
CPC ......... *H04W 72/042* (2013.01); *H04B 7/0413* (2013.01); *H04B 7/0626* (2013.01);
(Continued)

(58) Field of Classification Search
None
See application file for complete search history.

(56) References Cited

U.S. PATENT DOCUMENTS

2012/0039283 A1*  2/2012  Chen ............... H04W 72/042
                                                         370/329
2012/0044921 A1   2/2012  Chung et al.
(Continued)

FOREIGN PATENT DOCUMENTS

KR   10-2011-0010682 A    2/2011
WO      2011/136562 A2   11/2011
(Continued)

OTHER PUBLICATIONS

Samsung, "Remaining issues on quasi co-location of antenna ports", R1-123493, 3GPP TSG-RAN WG1 #70 meeting, Qingdao, P.R. China, Aug. 13-17, 2012, see pp. 1-5.
(Continued)

*Primary Examiner* — Hong Cho
(74) *Attorney, Agent, or Firm* — Dentons US LLP

(57) ABSTRACT

The present invention relates to a wireless communication system, and more specifically, disclosed are a method and an apparatus for transmitting or receiving a downlink signal by considering an antenna port relationship. A method for user equipment receiving a physical downlink shared channel (PDSCH) signal in the wireless communication system, according to one embodiment of the present invention, comprises the steps of: determining from the downlink subframe a resource element (RE) on which the PDSCH is mapped; and receiving the PDSCH signal based on the RE on which the PDSCH is mapped, wherein when the DCI is comprised according to DCI format 1A and the downlink subframe is a multicast broadcast single frequency network (MBSFN) subframe, the RE on which the PDSCH is mapped can be determined depending on cell-specific reference signal (CRS) location information, which is included in a PDSCH resource element mapping and Quasi co-location indicator (PQI) parameter set that is established by an upper layer.

11 Claims, 13 Drawing Sheets

(51) Int. Cl.
| | |
|---|---|
| H04B 7/04 | (2006.01) |
| H04L 12/18 | (2006.01) |
| H04W 72/00 | (2009.01) |
| H04B 7/06 | (2006.01) |
| H04W 4/02 | (2009.01) |
| H04W 28/18 | (2009.01) |
| H04W 72/12 | (2009.01) |

(52) U.S. Cl.
CPC ............ *H04L 5/001* (2013.01); *H04L 5/0023* (2013.01); *H04L 5/0037* (2013.01); *H04L 5/0048* (2013.01); *H04L 5/0053* (2013.01); *H04L 5/0094* (2013.01); *H04L 12/18* (2013.01); *H04L 12/189* (2013.01); *H04W 4/025* (2013.01); *H04W 72/005* (2013.01); *H04B 7/0417* (2013.01); *H04L 5/0035* (2013.01); *H04L 5/0057* (2013.01); *H04W 28/18* (2013.01); *H04W 72/12* (2013.01)

(56) References Cited

U.S. PATENT DOCUMENTS

| | | | |
|---|---|---|---|
| 2012/0113794 | A1 | 5/2012 | Roman et al. |
| 2012/0113917 | A1 | 5/2012 | Gaal et al. |
| 2012/0155561 | A1 | 6/2012 | Seo et al. |
| 2012/0257562 | A1* | 10/2012 | Kim .................. H04W 4/06 370/312 |
| 2013/0114419 | A1 | 5/2013 | Chen et al. |
| 2013/0178220 | A1 | 7/2013 | Lee et al. |
| 2013/0250879 | A1* | 9/2013 | Ng .................. H04W 72/042 370/329 |
| 2014/0044061 | A1 | 2/2014 | Yue et al. |
| 2014/0092827 | A1 | 4/2014 | Jongren et al. |
| 2014/0105162 | A1* | 4/2014 | Li .................. H04W 72/042 370/329 |
| 2015/0117382 | A1 | 4/2015 | Wang et al. |
| 2015/0349855 | A1 | 12/2015 | Sesia et al. |

FOREIGN PATENT DOCUMENTS

| | | |
|---|---|---|
| WO | 2012/102510 A2 | 8/2012 |
| WO | 2014/054903 A1 | 4/2014 |

OTHER PUBLICATIONS

Huawei et al., "Discussion on antenna ports collocation", R1-123124, 3GPP TSG-RAN WG1 #70 meeting, Qingdao, P.R. China, Aug. 13-17, 2012, see pp. 1-8.
Alcatel-Lucent, "Remaining aspects of Quasi-co-located Antenna ports", R1-123155, 3GPP TSG-RAN WG1 #70 meeting, Qingdao, P.R. China Aug. 13-17, 2012, see pp. 1-3.
Intel Corporation, "Remaining issues of antenna ports quasi co-location definition", R-123425, 3GPP TSG-RAN WG1 #70 meeting, Qingdao, P.R. China, Aug. 13-17, 2012, see pp. 1-6.
Ericsson, "Discussion Paper on Antenna Ports Quasi Co-location", R1-123746, 3GPP TSG-RAN WG1 #70 meeting, Qingdao, P.R. China, Aug. 13-17, 2012, see pp. 1-8.
Mediatek Inc.: "DRS Antenna Port Determination for ePDCCH Decoding", R1-122163, 3GPP TSG-RAN WG1 #69, Prague, Czech, May 21-25, 2012.
New Postcom: "Discussions on quasi-co-located antenna ports", R1-123440, 3GPP TSG-RAN WG1 Meeting #70, Qingdao, China, Aug. 13-17, 2012.
Renesas Mobile Europe Ltd: "Remaining issues on quasi-colocated antenna ports", R1-123589, 3GPP TSG-RAN WG1 Meeting #70, Qingdao, China, Aug. 13-17, 2012.
Nokia: On Quasi-co-located Antenna Ports, R1-123658, 3GPP TSG-RAN WG1 Meeting #70, Qingdao, China, Aug. 13-17, 2012.
Samsung: "Remaining issues on quasi colocation of antenna ports", R1-123855, 3GPP TSG-RAN WG1 Meeting #70, Qingdao, China, Aug. 13-17, 2012.
LG Electronics: "Signaling for quasi co-location assumptions and PDSCH rate matching", R1-124316, 3GPP TSG-RAN WG1 Meeting #70bis, San Diego, USA, Oct. 8-12, 2012.
Samsung: "Downlink Control Signalling for CoMP", 3GPP Draft, R1-124364 DL Control Signaling Final, 3rd Generation Partnership Project (3GPP), Mobile Competence Centre, 650, Route Des Lucioles, F-06921 Sophia-Antipolis Cedex, France, vol. RAN WG1, No. San Diego, USA, Oct. 8, 2012- Oct. 12, 2012, Sep. 29, 2012, XP050662195, Retrieved from the Internet: URL:http://www.3gpp.org/ftp/tsg_ran/WG1_RL1/TSGR1 70b/Docs/ [retrieved on Sep. 29, 2012] * sections 2-3 *.
NEC Group: "On PDSCH RE mapping in CoMP", 3GPP Draft, R1-124295, 3rd Generation Partnership Project (3GPP), Mobile Competence Centre, 650, Route Des Lucioles, F-06921 Sophia-Antipolis Cedex, France, vol. RAN WG1, No. San Diego, USA, Oct. 8, 2012-Oct. 12, 2012, Sep. 29, 2012, XP050662195, Retrieved from the Internet: URL:http://www.3gpp.org/ftp/tsg_ran/WG1_RL1/TSGR1 70b/Docs/ [retrieved on Sep. 29, 2012] * sections 2-3 *.
Huawei et al: "Signalling of Pusch mapping for CoMP", 3GPP Draft, R1-123109, 3rd Generation Partnership Project (3GPP), Mobile Competence Centre, 650, Route Des Lucioles, F-06921 Sophia-Antipolis Cedex, France, vol. RAN WG1, No. Qingdao, China; Aug. 13, 2012-Aug. 17, 2012 Aug. 4, 2012, XP050661033, Retrieved from the Internet: URL:http://www.3gpp.org/ftp/tsg_ran WG1_RL1/TSGR1 70/Docs/ [retrieved on Aug. 5, 2012] * sections 1-3 *.
U.S. Appl. No. 61/556,106, filed Nov. 4, 2011.
U.S. Appl. No. 61/662,534, filed Jun. 21, 2012.
U.S. Appl. No. 61/706,752, filed Sep. 27, 2012.
U.S. Appl. No. 61/707,811, filed Sep. 28, 2012.

* cited by examiner

FIG. 5
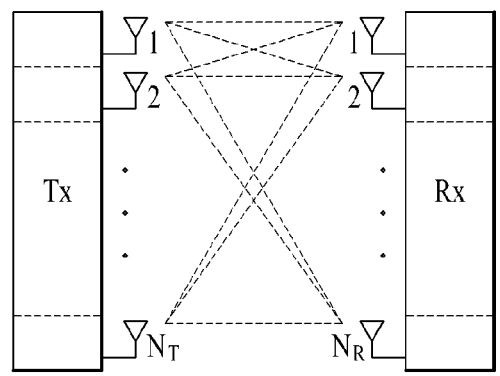
(a)
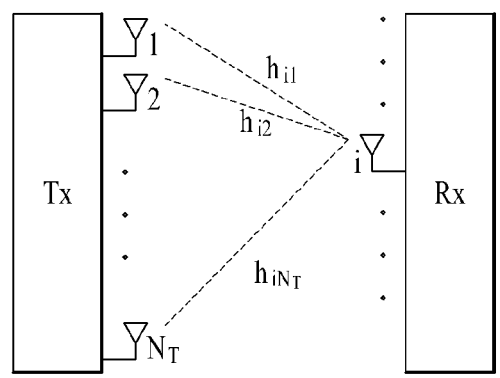
(b)

METHOD AND APPARATUS FOR TRANSRECEIVING DOWNLINK SIGNAL BY CONSIDERING ANTENNA PORT RELATIONSHIP IN WIRELESS COMMUNICATION SYSTEM

This application is a 35 USC §371 National Stage entry of International Application No. PCT/KR2013/008873 filed on Oct. 4, 2013, and claims priority to U.S. Provisional Application Nos. 61/709,975 filed on Oct. 4, 2012 and 61/729,301 filed on Nov. 21, 2012, all of which are hereby incorporated by reference in their entireties as if fully set forth herein.

TECHNICAL FIELD

The present invention relates to a wireless communication system, and more particularly, to a method and apparatus for transmitting or receiving a downlink signal by considering an antenna port relationship.

BACKGROUND ART

Multiple-Input Multiple-Output (MIMO) technology is a technology for improving efficiency of data transmission and reception using multiple transmit antennas and multiple receive antennas rather than using one transmit antenna and one receive antenna. If a single antenna is used, a receive entity receives data through a single antenna path. In contrast, if multiple antennas are used, the receive entity receives data through several paths, accordingly data transmission rate and throughput may be improved, and the coverage may be extended.

To increase multiplexing gain of the MIMO operation, an MIMO transmit entity may use channel state information (CSI) fed back by the MIMO receive entity. The receive entity may determine the CSI by performing channel measurement using a predetermined reference signal (RS) from the transmit entity.

DISCLOSURE

Technical Problem

In an advanced wireless communication system, a relationship between different antenna ports may be defined in various manners. For example, a terminal may assume that different RS ports of a network are quasi co-located (QCL) or that that the RS ports are not QCL, without asking whether the different RS ports are present at the same location.

An object of the present invention devised to solve the problem lies in a method for a terminal to accurately and efficiently receive a downlink signal transmitted from the network side by considering a relationship (particularly, a QCL relationship) between antenna ports.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a physical downlink shared channel (PDSCH) signal by a user equipment (UE) in a wireless communication system, the method including determining a resource element (RE) to which the PDSCH is mapped in a downlink subframe, and receiving the PDSCH signal based on the RE to which the PDSCH is mapped. The PDSCH may be scheduled by downlink control information (DCI). Herein, when the DCI is configured according to DCI format 1A, and the downlink subframe is a Multicast Broadcast Single Frequency Network (MBSFN) subframe, the RE to which the PDSCH is mapped may be determined according to Cell-specific Reference Signal (CRS) position information contained in a PDSCH resource element mapping and Quasi co-location Indicator (PQI) parameter set configured by a higher layer.

In another aspect of the present invention, provided herein is a user equipment (UE) for receiving a physical downlink shared channel (PDSCH) signal in a wireless communication system, the UE including a transmit module, a receive module, and a processor. The processor may be configured to determine a resource element (RE) to which the PDSCH is mapped in a downlink subframe and to receive the PDSCH signal based on the RE to which the PDSCH is mapped using the receive module. The PDSCH may be scheduled by downlink control information (DCI). Herein, when the DCI is configured according to DCI format 1A, and the downlink subframe is a Multicast Broadcast Single Frequency Network (MBSFN) subframe, the RE to which the PDSCH is mapped may be determined according to Cell-specific Reference Signal (CRS) position information contained in a PDSCH resource element mapping and Quasi co-location Indicator (PQI) parameter set configured by a higher layer.

The above aspects of the present invention may include the following details in common.

The CRS position information contained in the PQI parameter set may include at least one of number-of-CRS ports information, CRS frequency shift information and MBSFN subframe configuration information.

The PQI parameter set may be a PQI parameter set having a lowest index.

When the DCI is configured according to DCI format 1A and the downlink subframe is a non-MBSFN subframe, the RE to which the PDSCH is mapped may be determined according to a CRS configuration of a serving cell.

The CRS configuration of the serving cell may include at least one of the number of CRS ports of the serving cell, CRS frequency shift of the serving cell and an MBSFN subframe configuration of the serving cell.

The RE to which the PDSCH is mapped may not be used for the CRS.

When the DCI is configured according to DCI format 2D, the PQI parameter set may be determined according to a state value of a PQI field of the DCI format 2D.

The DCI may be received through a physical downlink control channel (PDCCH) or an enhanced PDCCH (EPDCCH).

The PQI parameter set may include at least one of parameters corresponding to number-of-CRS ports information, CRS frequency shift information, MBSFN subframe configuration information, Zero Power Channel State Information Reference Signal (ZP CSI-RS) configuration information, a PDSCH start symbol value, and Non-Zero Power (NZP) CSI-RS configuration information.

The UE may be set to transmission mode 10 (TM10).

The above general description and the following detailed description of the present invention are exemplarily given to supplement the recitations in the claims.

Advantageous Effects

According to embodiments of the present invention, a terminal may accurately and efficiently receive a downlink signal transmitted from the network side by considering a relationship (particularly, a QCL relationship) between antenna ports.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIGS. 5(a) and 5(b) illustrate configuration of a wireless communication system having multiple antennas;

FIGS. 10(a) and 10(b) illustrate carrier aggregation;

BEST MODE

Figure 1:
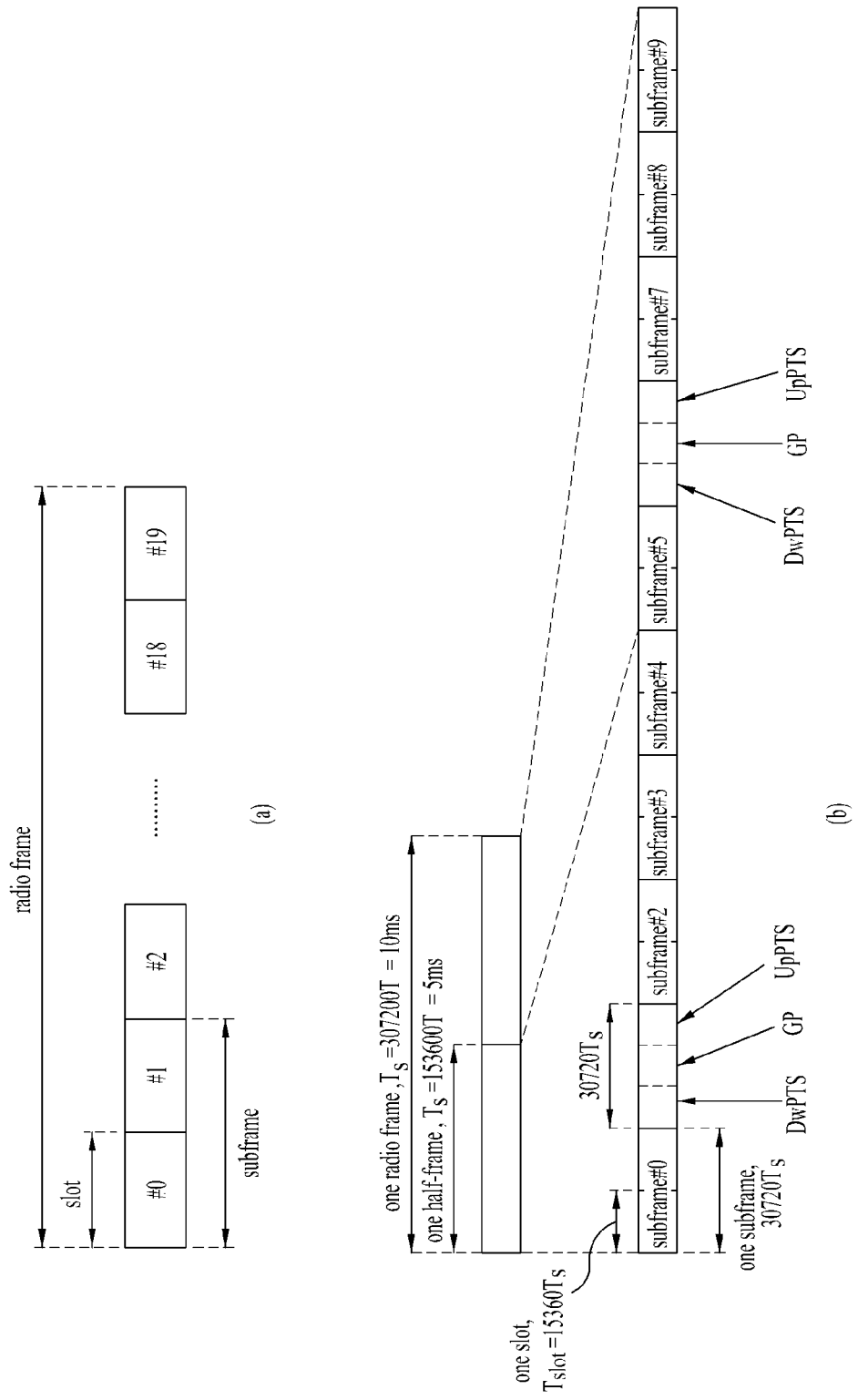
FIGS. 1(a) and 1(b) illustrate a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point (AP)," "remote radio head (RRD)," "transmission point (TP)," and "reception point (RP)." The term "relay" may be replaced with terms such as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

FIG. 1 illustrates a radio frame structure.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which includes 5 subframes, a downlink pilot time slot (DwPTS), a guard period (GP), and an uplink pilot time slot (UpPTS). One subframe includes two slots. A subframe including a DwPTS, a GP and a UpPTS may be referred to as a special subframe. The DwPTS is used for initial cell search, synchronization, or channel estimation in a UE, whereas the UpPTS is used for channel estimation in an eNB and UL transmission synchronization in a UE. The GP is provided to eliminate interference on UL caused by multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
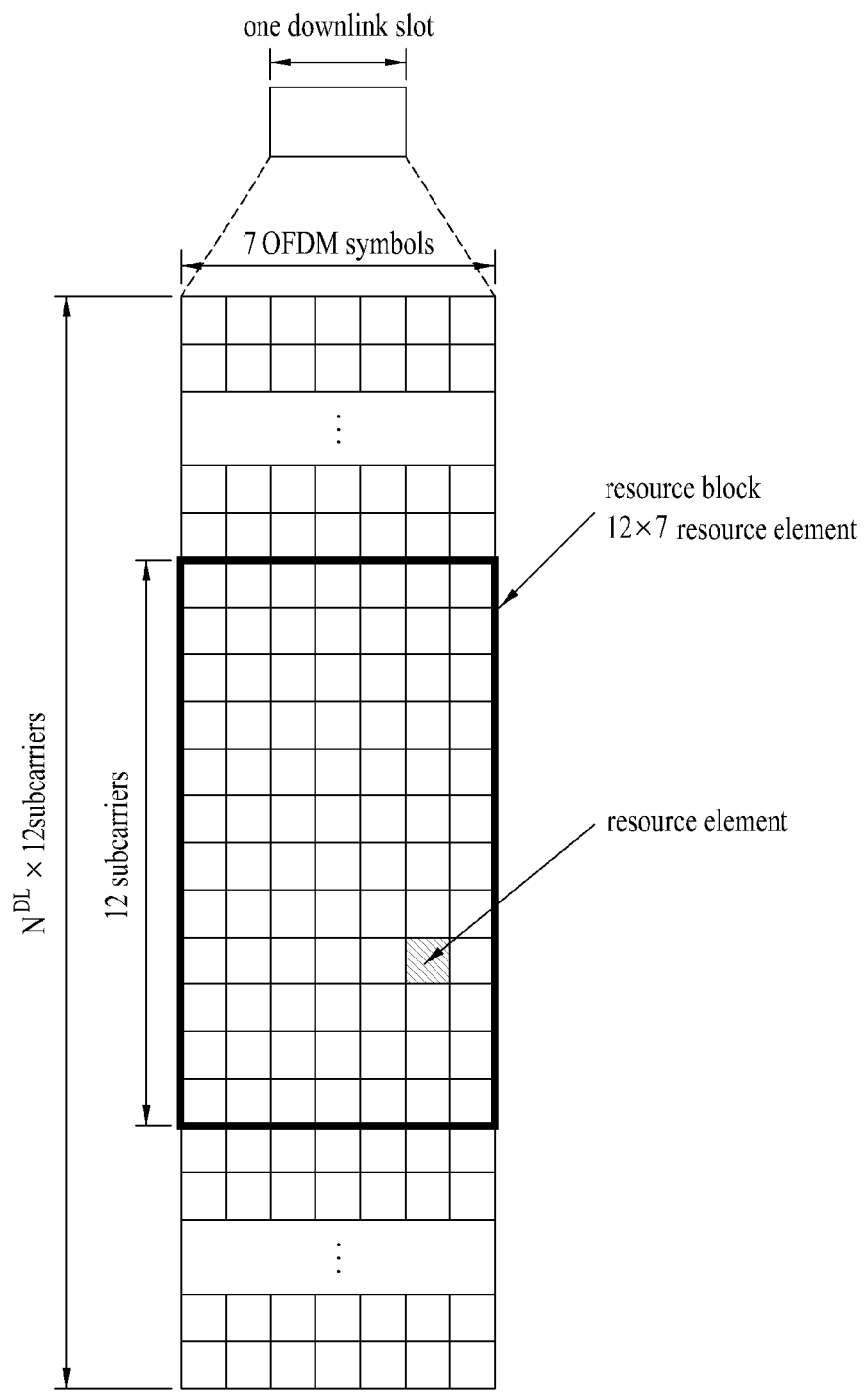
FIG. 2 is a diagram illustrating a resource grid for one downlink (DL) slot.

FIG. 2 is a diagram illustrating a resource grid for one DL slot.

A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
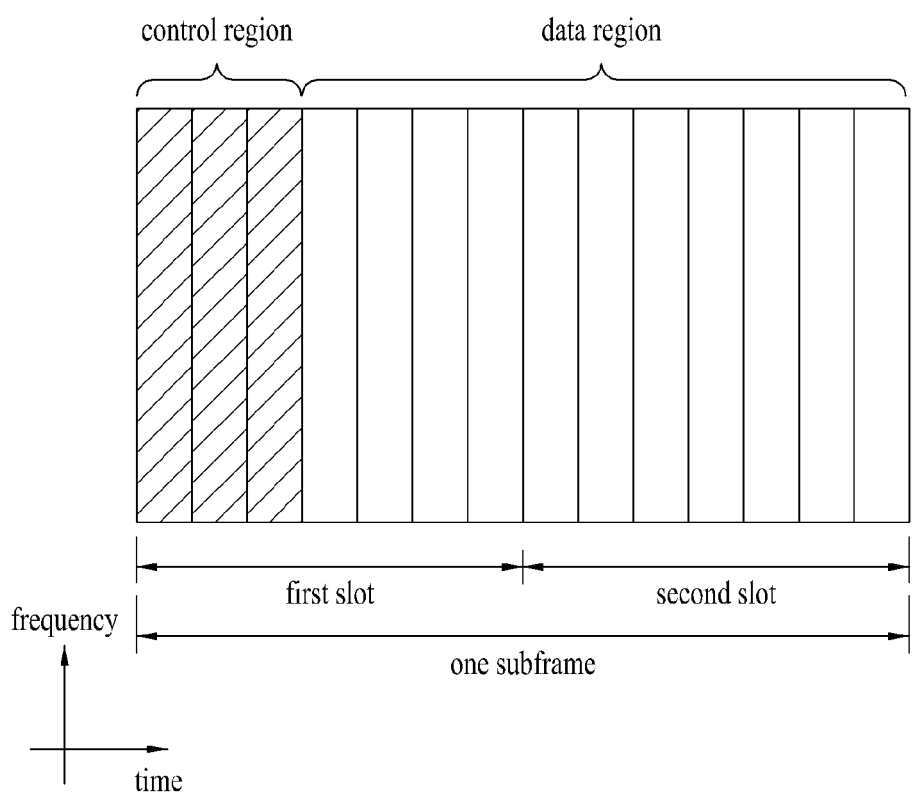
FIG. 3 is a diagram illustrating a DL subframe structure.

FIG. 3 illustrates a DL subframe structure.

Up to first three OFDM symbols of the first slot in a DL subframe correspond to a control region to which control channels are allocated and the other OFDM symbols of the DL subframe corresponds to a data region to which a physical downlink shared channel (PDSCH) is allocated.

DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over internet protocol (VoIP) activation information. A plurality of PDCCHs may be transmitted in the control region, and a UE may monitor PDCCHs.

A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs.

An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
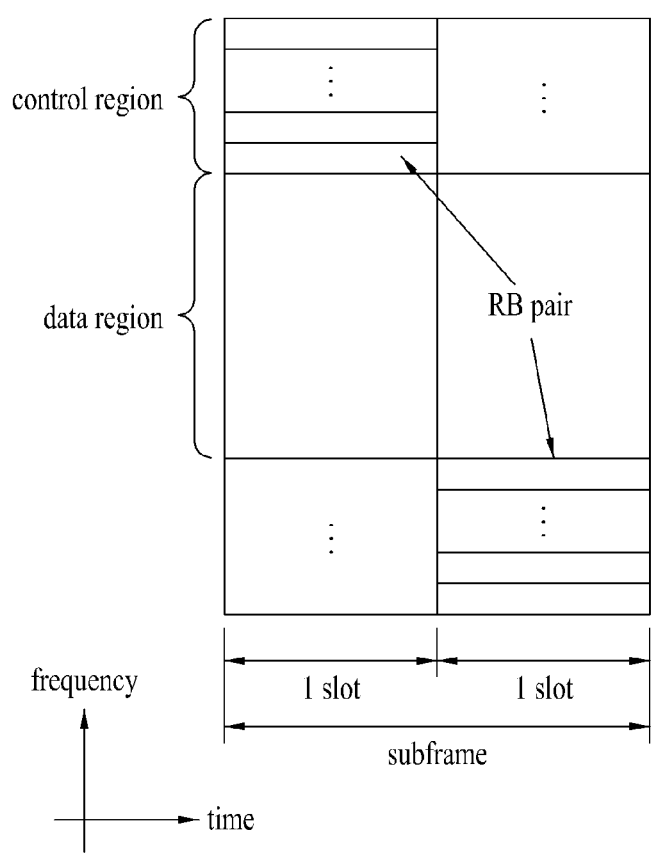
FIG. 4 is a diagram illustrating an uplink (UL) subframe structure.

FIG. 4 illustrates a UL subframe structure.

A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain a single carrier property, a UE does not simultaneously transmit a PUSCH and a PUCCH. A PUCCH for a UE is allocated to an RB pair in a subframe. The RBs of the RB pair occupy different subcarriers in two slots. This is called frequency hopping of the RB pair allocated to the PUCCH over a slot boundary.

Modeling of MIMO System

FIG. 5 illustrates configuration of a wireless communication system having multiple antennas.

Referring to FIG. 5(a), if the number of transmit (Tx) antennas increases to $N_T$, and the number of receive (Rx) antennas increases to $N_R$, a theoretical channel transmission capacity of the wireless communication system increases in proportion to the number of antennas, differently from a case in which only a transmitter or receiver uses multiple antennas, and accordingly transmission rate and frequency efficiency may be significantly increased. In this case, the transfer rate acquired by the increasing channel transmission capacity may theoretically increased by a predetermined amount that corresponds to multiplication of a maximum transfer rate ($R_o$) acquired when one antenna is used by a rate of increase ($R_i$). The rate of increase ($R_i$) may be represented by the following Equation 1.

$$R_i = \min(N_T, N_R) \quad \text{Equation 1}$$

For example, provided that a MIMO system uses four Tx antennas and four Rx antennas, the MIMO system may theoretically acquire a high transfer rate which is four times that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been reflected in a variety of wireless communication standards such as, for example, third-generation mobile communication and next-generation wireless LAN.

A variety of MIMO-associated technologies have been intensively researched. For example, research into information theory associated with MIMO communication capacity under various channel environments or multiple access environments, research into a radio frequency (RF) channel measurement and modeling of the MIMO system, and research into space-time signal processing technology have been conducted.

Mathematical modeling of a communication method for use in the aforementioned MIMO system will hereinafter be described in detail. It is assumed that the system includes $N_T$ Tx antennas and $N_R$ Rx antennas.

In the case of a transmission signal, the maximum number of pieces of transmittable information is $N_T$ under the condition that $N_T$ Tx antennas are used, and the transmission information may be represented by the following equation.

$$s = [s_1, s_2, \ldots, s_{N_T}]^T \quad \text{Equation 2}$$

Individual transmission pieces of information $s_1$, $s_2, \ldots, s_{N_T}$ may have different transmit powers. In this case, if the individual transmit powers are denoted by $P_1$, $P_2, \ldots, P_{N_T}$, transmission information having an adjusted transmit power may be represented by the following equation.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

Ŝ may be represented by the following equation using a diagonal matrix P of transmit powers.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

The information vector Ŝ having adjusted transmit powers is applied to a weight matrix W, and thus $N_T$ transmission signals $x_1, x_2, \ldots, x_{N_T}$ to be actually transmitted are configured. In this case, the weight matrix W serves to properly distribute transmission information to individual antennas according to transmission channel situations. The above-mentioned transmission signals $x_1, x_2, \ldots, x_{N_T}$ may be represented by the following equation using vector X.

$$x = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \quad \text{Equation 5}$$

Here, $w_{ij}$ denotes a weight corresponding to the i-th Tx antenna and the j-th information. W is also called a precoding matrix.

When $N_R$ Rx antennas are used, received signals $y_1$, $y_2, \ldots, y_{N_R}$ of individual antennas may be represented by a vector shown in the following equation.

$$y = [y_1, y_2, \ldots, y_{N_R}]^T \quad \text{Equation 6}$$

When channel modeling is executed in the MIMO communication system, individual channels may be distinguished from each other according to Tx/Rx antenna indexes. A specific channel from a Tx antenna j to an Rx antenna i is denoted by $h_{ij}$. Regarding $h_{ij}$, it should be noted that an Rx antenna index is located ahead of a Tx antenna index.

FIG. 5(b) shows channels from $N_T$ Tx antennas to Rx antenna i. The channels may be represented in the form of a vector or matrix. Referring to FIG. 5(b), the channels from the $N_T$ Tx antennas to the Rx antenna i may be represented by the following equation.

$$h_i^T = [h_{i1}, h_{i2}, \ldots, h_{iN_T}] \quad \text{Equation 7}$$

All channels from the $N_T$ Tx antennas to $N_R$ Rx antennas may also be represented as the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{Equation 8}$$

Additive white Gaussian noise (AWGN) is added to an actual channel after application of channel matrix H. AWGN $n_1, n_2, \ldots, n_{N_R}$ added to each of $N_R$ Rx antennas may be represented by the following equation.

$$n = [n_1, n_2, \ldots, n_{N_R}]^T \quad \text{Equation 9}$$

Reception signal calculated by the mathematical modeling described above may be represented by the following equation.

$$y = \begin{bmatrix} y_1 \\ y_2 \\ \vdots \\ y_i \\ \vdots \\ y_{N_R} \end{bmatrix} \quad \text{Equation 10}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and the number of columns of channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

A rank of a matrix is defined by a smaller number between the number of rows and the number of columns, in which the rows and the columns are independent of each other. Therefore, the matrix rank may not be higher than the number of rows or columns. The rank of the channel matrix H may be represented by the following equation.

$$\text{rank}(H) \min(N_T, N_R) \quad \text{Equation 11}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of pieces of information that may be transmitted on a given channel.

In this specification, "rank" with respect to MIMO transmission indicates the number of paths through which signals may be independently transmitted at specific time in a specific frequency resource and "the number of layers" refers to the number of signal streams transmitted through each path. Since a transmitter transmits as many layers as the rank used in signal transmission, the rank corresponds to the number of layers unless otherwise mentioned.

Reference Signal (RS)

In transmitting packets in a wireless communication system, the packets are transmitted over a radio channel, and therefore signal distortion may occur in the transmission process. For a receive entity to receive the correct signal in spite of signal distortion, the received distorted signal should be corrected using channel information. In detecting the channel information, a signal which is known to both the transmit entity and the receive entity is usually transmitted and the degree of distortion of the signal received over the channel is used to detect the channel information. This signal is referred to as a pilot signal or a reference signal.

When data is transmitted and received using multiple antennas, channel state between each Tx antenna and each Rx antenna needs to be recognized in order to receive a correct signal. Accordingly, a separate reference signal needs to be present per Tx antenna.

The RSs may be broadly divided into two types according to the purposes thereof. One type is used to acquire channel information and the other type is used for data demodulation. Since the former RS is used to allow the UE to acquire DL channel information, this RS should be transmitted over a wide band, and even a UE which does not receive DL data in a specific subframe should be receive and measure the RS. Such RS is also used for measurement of, for example, handover. The latter RS is sent when an eNB sends a resource on downlink. The UE may perform channel measurement by receiving this RS, thereby implementing data modulation. This RS should be transmitted in a region in which data is transmitted.

Legacy 3GPP LTE systems (e.g., 3GPP LTE Release-8) define two types of downlink RSs for the unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In the legacy 3GPP LTE systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 6:
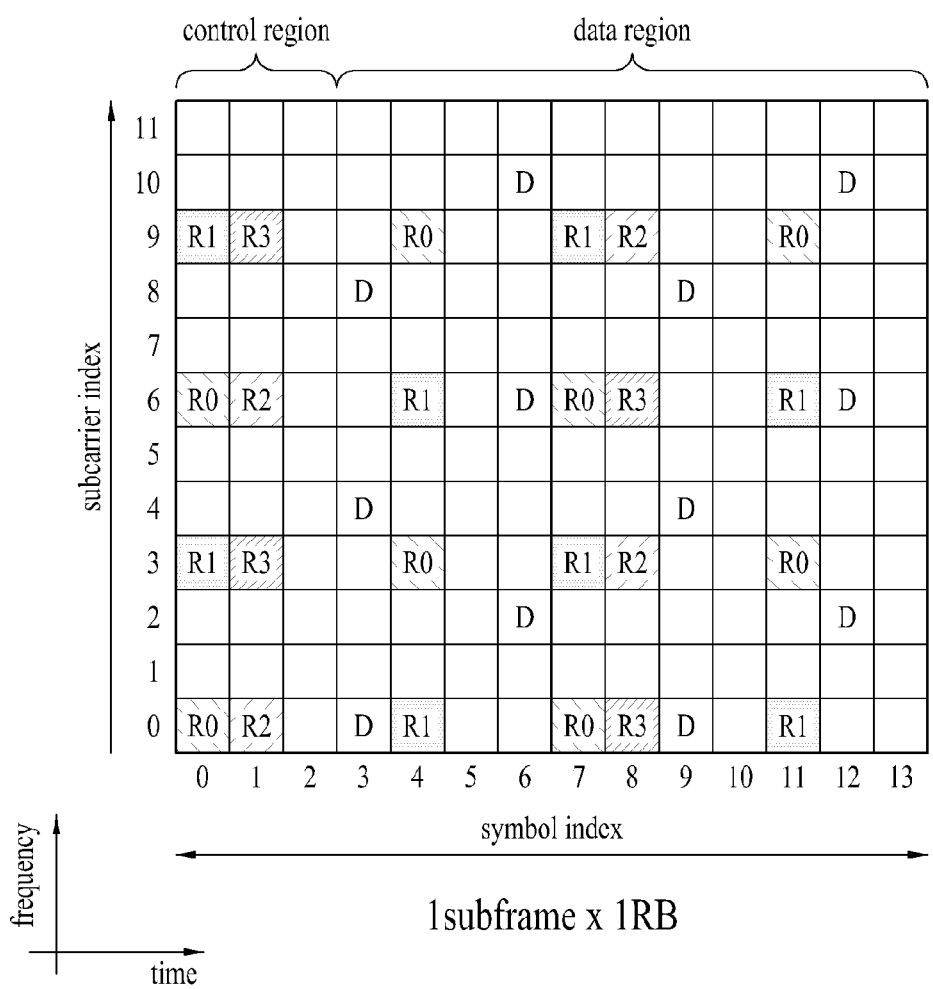
FIG. 6 is a diagram illustrating an exemplary pattern of a CRS and a DRS on one RB pair.

FIG. 6 illustrates an exemplary pattern of a CRS and a DRS on one RB pair.

Referring to FIG. 6, the pattern of the CRS and the DRS is presented on one RB pair (14 OFDM symbols in the time domain×12 subcarriers in the frequency domain in the case of normal CP) in a system in which the eNB supports four transmit antennas. In FIG. 6, resource elements (REs) denoted by "R0", "R1", "R2" and "R3" represent the locations of the CRSs for antenna port indexes 0, 1, 2 and 3, respectively. In FIG. 6, REs denoted by "D" represent the locations of DRSs.

LTE-A, which is an advanced version of LTE, can supports up to 8 Tx antennas on downlink. Accordingly, RSs for up to 8 Tx antennas need to be supported in LTE-A. In LTE, downlink RSs are defined only for up to 4 antenna ports. Therefore, if an eNB has 4 to 8 DL Tx antennas in LTE-A, RSs for these antenna ports need to be additionally defined. As the RSs for up to 8 Tx antenna ports, both the RS for channel measurement and the RS for data demodulation need to be considered.

One important consideration in designing an LTE-A system is backward compatibility. Backward compatibility refers to supporting the legacy LTE UE such that the legacy LTE UE normally operates in the LTE-A system. In terms of RS transmission, if RSs for up to 8 Tx antennas are added to a time-frequency region in which a CRS defined in the LTE standard is transmitted in every subframe over the full band, RS overhead excessively increases. Accordingly, in designing new RSs for up to 8 antenna ports, reducing RS overhead needs to be considered.

The new RSs introduced in LTE-A may be classified into two types. One is a channel state information-RS (CSI-RS) intended for channel measurement for selecting a transmission rank, a modulation and coding scheme (MCS), a precoding matrix index (PMI), and the like, and the other is a demodulation RS (DMRS) intended for demodulation of data transmitted through up to 8 Tx antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which the data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 7:
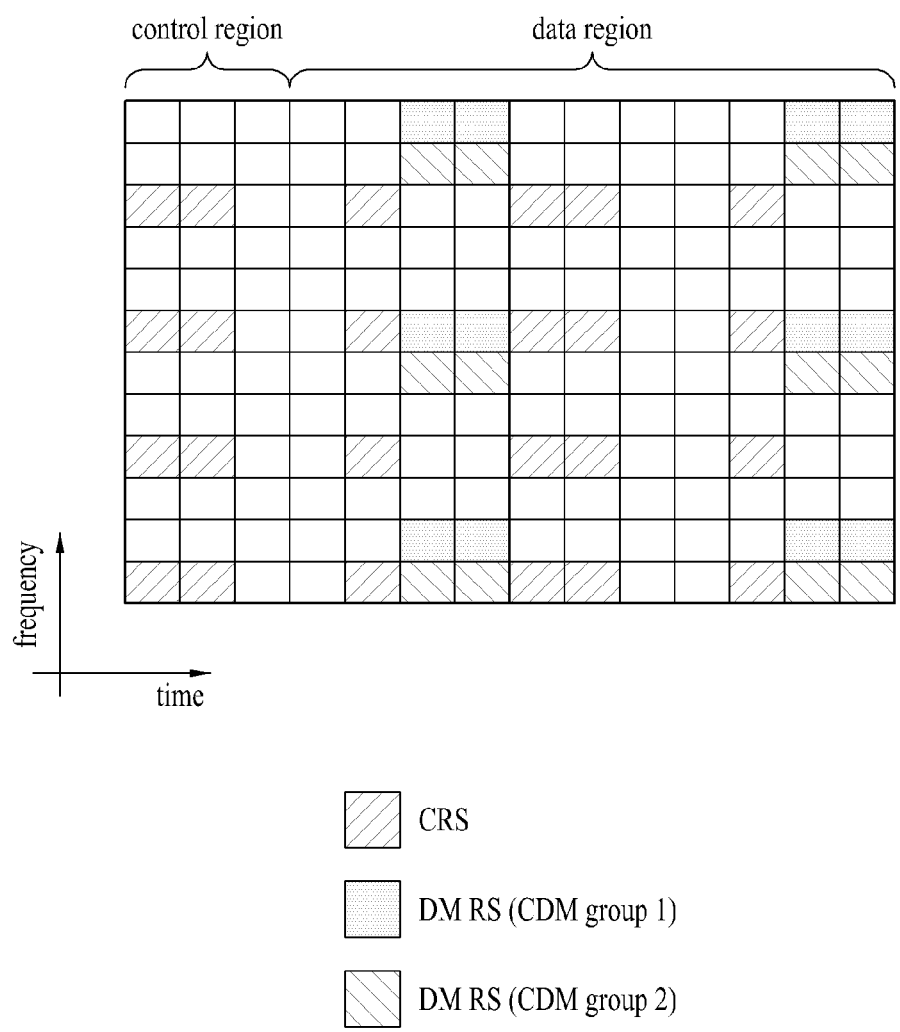
FIG. 7 is a diagram illustrating an exemplary DMRS pattern defined in LTE-A.

FIG. 7 illustrates an exemplary DMRS pattern defined in LTE-A.

FIG. 7 shows positions of REs for transmission of DMRSs on one RB pair (14 OFDM symbols in the time domain×12 subcarriers in the frequency domain in the case of normal CP) on which downlink data is transmitted. The DMRS may be transmitted with respect to four antenna ports (antenna port indexes 7, 8, 9 and 10) which are additionally defined in LTE-A. DMRSs for different antenna ports may be distinguished from each other as they are positioned on different frequency resources (subcarriers) and/or different time resources (OFDM symbols) (namely, they may be multiplexed using FDM and/or TDM). DMRSs for different antenna ports positioned on the same time-frequency resource may be distinguished from each other by an orthogonal code (namely, they may be multiplexed using the CDM scheme). In the example of FIG. 7, DMRSs for antenna ports 7 and 8 may be positioned on the REs indicated by DMRS CDM Group 1 and be multiplexed by an orthogonal code. Similarly, in the example of FIG. 7, DMRSs for antenna ports 9 and 10 may be positioned on the REs indicated by DMRS Group 2 and be multiplexed by the orthogonal code.

When the eNB transmits a DMRS, the precoding applied to data is applied to the DMRS. Accordingly, the channel information estimated by the UE using the DMRS (or UE-specific RS) is precoded channel information. The UE may easily perform data demodulation using the precoded channel information estimated through the DMRS. However, the UE does not know the information about the precoding applied to the DMRS, and accordingly the UE may not acquire, from the DMRS, channel information that is not precoded. The UE may acquire the channel information that is not precoded, using an RS separate from the DMRS, namely using the CSI-RS mentioned above.

Figure 8:
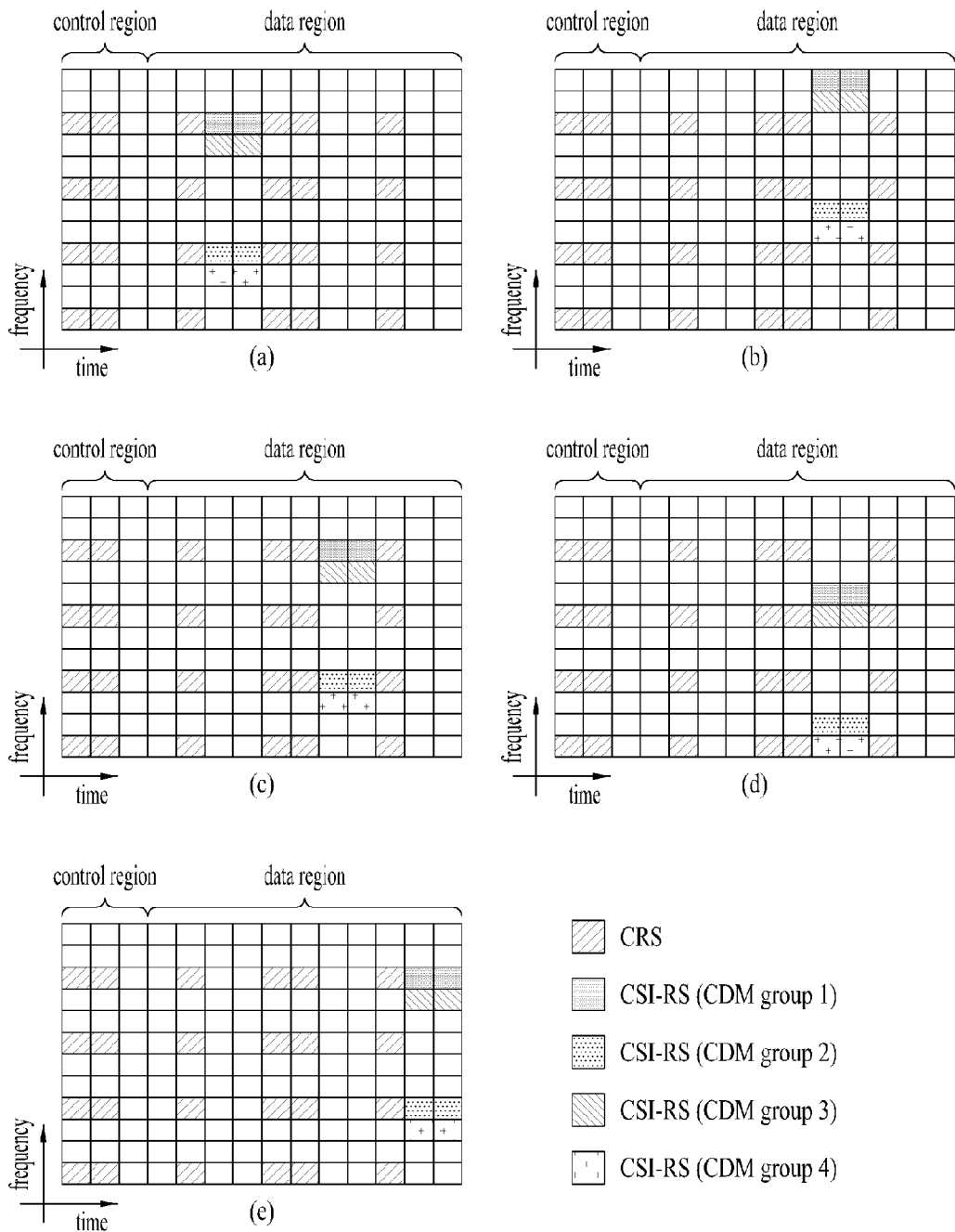
FIGS. 8(a)-8(e) are a diagram illustrating exemplary CSI-RS patterns defined in LTE-A.

FIG. 8 is a diagram illustrating exemplary CSI-RS patterns defined in LTE-A.

FIG. 8 shows positions of REs for transmission of CSI-RSs on one RB pair (14 OFDM symbols in the time domain×12 subcarriers in the frequency domain in the case of normal CP) on which downlink data is transmitted. One of CSI-RS patterns shown in FIGS. 8(a) to 8(e) may be used in a DL subframe. CSI-RSs may be transmitted with respect to 8 antenna ports (antenna port indexes 15, 16, 17, 18, 19, 20, 21 and 22) which are additionally defined in LTE-A. CSI-RSs for different antenna ports may be distinguished from each other as they are positioned on different frequency resources (subcarriers) and/or different time resources (OFDM symbols) (namely, they may be multiplexed using FDM and/or TDM). CSI-RSs for different antenna ports positioned on the same time-frequency resource may be distinguished from each other by an orthogonal code (namely, they may be multiplexed using CDM). In the example of FIG. 8(a), CSI-RSs for antenna ports 15 and 16 may be positioned on the REs indicated by CSI-RS CDM Group 1 and be multiplexed by an orthogonal code. In the example of FIG. 8(a), CSI-RSs for antenna ports 17 and 18 may be positioned on the REs indicated by CSI-RS CDM Group 2 and be multiplexed by the orthogonal code. CSI-RSs for antenna ports 19 and 20 may be positioned on the REs indicated by CSI-RS CDM Group 3 and be multiplexed by the orthogonal code. In the example of FIG. 8(a), CSI-RSs for antenna ports 21 and 22 may be positioned on the REs indicated by CSI-RS CDM Group 4 and multiplexed by the orthogonal code. The principle described above with reference to FIG. 8(a) may also be applied to FIGS. 8(b) to 8(e).

The RS patterns of FIGS. 6 to 8 are simply illustrative, and embodiments of the present invention are not limited to specific RS patterns. In other words, the embodiments of the present invention may be applied in the same manner when an RS pattern different from those of FIGS. 6 to 8 is defined and used.

CSI-RS Configuration

As described above, in the LTE-A system supporting up to 8 Tx antennas on downlink, an eNB needs to transmit CSI-RSs for all antenna ports. Since transmitting CSI-RSs for a maximum of 8 Tx antenna ports in every subframe excessively increases overhead, the CSI-RS may need to be intermittently transmitted in the time domain to reduce overhead, rather than being transmitted in every subframe. Accordingly, the CSI-RS may be periodically transmitted with a periodicity corresponding to an integer multiple of one subframe or transmitted in a specific transmission pattern.

Here, the periodicity or pattern in which the CSI-RS is transmitted may be configured by a network (e.g., an eNB). To perform CSI-RS-based measurement, the UE should be aware of a CSI-RS configuration for each CSI-RS antenna port of a cell (or a TP) to which the UE belongs. The CSI-RS configuration may include the index of a downlink subframe in which a CSI-RS is transmitted, time-frequency positions (e.g., a CSI-RS pattern as shown in FIGS. 8(a) to 8(e)) of CSI-RS REs in a transmission subframe, and a CSI-RS sequence (which is a sequence intended for CSI-RS and pseudo-randomly generated based on the slot number, cell ID, CP length and the like according to a predetermined rule). That is, a given eNB may use a plurality of CSI-RS configurations, and inform of CSI-RS configurations to be used for UE(s) in a cell among the CSI-RS configurations.

The plurality of CSI-RS configurations may or may not include a CSI-RS configuration for which the UE assumes that the transmit power of the CSI-RS is non-zero power. In addition, the plurality of CSI-RS configurations may or may not include at least one CSI-RS configuration for which the UE assumes that the transmit power of the CSI-RS is zero transmit power.

Further, each bit of a parameter (e.g., a 16-bit bitmap ZeroPowerCSI-RS parameter) for a CSI-RS configuration of zero transmit power may be caused by a higher layer to correspond to the CSI-RS configuration (or REs to which CSI-RSs can be allocated according to the CSI-RS configuration), and the UE may assume that the transmit power on the CSI-RS REs of a CSI-RS configuration corresponding to a bit set to 1 in the parameter is 0.

Since CSI-RSs for the respective antenna ports need to be distinguished from each other, resources on which the CSI-RSs for the antenna ports are transmitted need to be orthogonal to each other. As described above in relation to FIG. 8, the CSI-RSs for the antenna ports may be multiplexed using FDM, TDM and/or CDM using orthogonal frequency resources, orthogonal time resources and/or orthogonal code resources.

When the eNB informs a UE belonging to a cell thereof of information about CSI-RSs, the eNB needs to signal information about time and frequency to which a CSI-RS for each antenna port is mapped. Specifically, the information about time may include the subframe numbers of subframes in which the CSI-RS is transmitted, a CSI-RS transmission periodicity for transmission of the CSI-RS, a subframe offset for transmission of the CSI-RS, and a number corresponding to an OFDM symbol on which a CSI-RS RE of a specific antenna is transmitted. The information about frequency may include spacing of frequencies at which a CSI-RS RE of a specific antenna is transmitted, and an RE offset or a shift value in the frequency domain.

Figure 9:
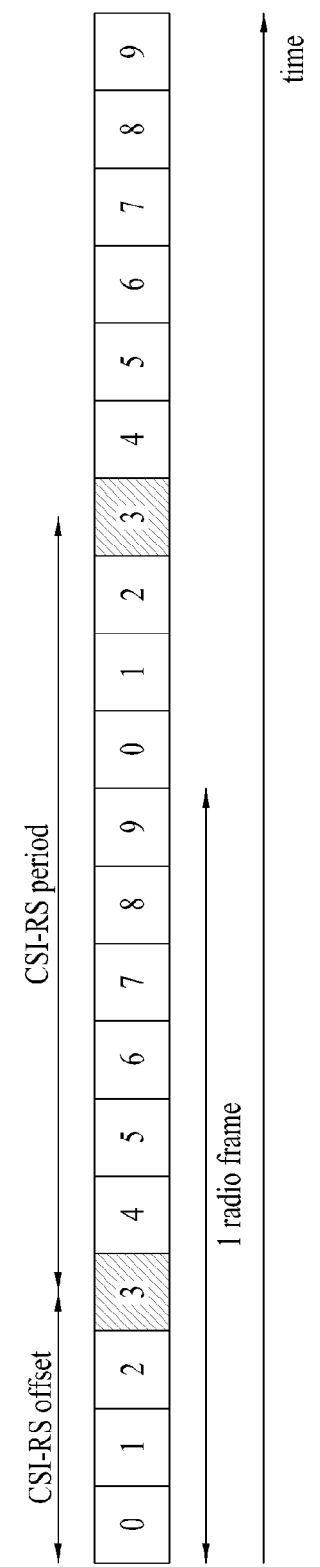
FIG. 9 is a diagram illustrating an exemplary scheme in which a CSI-RS is periodically transmitted.

FIG. 9 is a diagram illustrating an exemplary scheme in which a CSI-RS is periodically transmitted.

The CSI-RS may be periodically transmitted with a periodicity corresponding to an integer multiple of one subframe (e.g., 5 subframes, 10 subframes, 20 subframes, 40 subframes, or 80 subframes)

FIG. 9 illustrates a case in which one radio frame consists of 10 subframes (from subframe 0 to subframe 9). In the example illustrated in FIG. 9, the transmission periodicity of the CSI-RS of the eNB is 10 ms (i.e., 10 subframes), and the CSI-RS transmission offset is 3. Different offset values may be assigned to eNBs such that CSI-RSs of several cells are uniformly distributed in the time domain. When the CSI-RS is transmitted with a periodicity of 10 ms, the offset may be set to a value between 0 and 9. Similarly, when the CSI-RS is transmitted with a periodicity of, for example, 5 ms, the offset may be set to a value between 0 and 4. When the CSI-RS is transmitted with a periodicity of 20 ms, the offset may be set to a value between 0 and 19. When the CSI-RS is transmitted with a periodicity of 40 ms, the offset may be set to a value between 0 and 39. When the CSI-RS is transmitted with a periodicity of 80 ms, the offset may be set to a value between 0 and 79. The offset value indicates the value of a subframe in which an eNB transmitting the CSI-RS with a predetermined periodicity starts CSI-RS transmission. When the eNB informs the UE of the transmission periodicity and the offset value of the CSI-RS, the UE may receive the CSI-RS of the eNB at the corresponding subframe position, using the values. The UE may measure a channel through the received CSI-RS, and report information such as CQI, PMI and/or rank indicator (RI) to the eNB as a result of the measurement. The CQI, the PMI and the RI may be collectively referred to as CQI (or CSI) throughout the specification unless they are separately described. The aforementioned information related to the CSI-RS is cell-specific information and may be applied to the UEs in a cell in common. The CSI-RS transmission periodicity and offset may be separately specified for each CSI-RS configuration. For example, a separate CSI-RS transmission periodicity and offset may be set for a CSI-RS configuration representing a CSI-RS transmitted with zero transmit power and a CSI-RS configuration representing a CSI-RS transmitted with non-zero transmit power.

Contrary to the CRS transmitted in all subframes in which a PDSCH can be transmitted, the CSI-RS may be configured to be transmitted only in some subframes. For example, CSI subframe sets $C_{CSI,0}$ and $C_{CSI,1}$ may be configured by a higher layer. CSI reference resource (i.e., a predetermined resource region forming the basis of CSI calculation) may belong to either $C_{CSI,0}$ or $C_{CSI,1}$, may not belong to both $C_{CSI,0}$ and $C_{CSI,1}$ at the same time. Accordingly, when CSI subframe sets $C_{CSI,0}$ and $C_{CSI,1}$ are configured by a higher layer, the UE is not allowed to expect that it will receive a trigger (or an indication for CSI calculation) for a CSI reference resource which is present in a subframe which belongs to none of the CSI subframe sets.

Alternatively, the CSI reference resource may be configured in a valid downlink subframe. The valid downlink subframe may be configured as a subframe satisfying various conditions. In the case of periodic CSI reporting, one of the conditions may be a subframe belonging to a CSI subframe set that is linked to periodic CSI reporting when a CSI subframe set is configured for the UE.

The UE may derive a CQI index from the CSI reference resource in consideration of the following assumptions (For details, see 3GPP TS 36.213).

First three OFDM symbols in a subframe are occupied by control signaling.

No REs are used by a primary synchronization signal, a secondary synchronization signal, or a physical broadcast channel (PBCH).

CP length of a non-Multicast Broadcast Single Frequency Network (MBSFN) subframe.

Redundancy version is 0.

If a CSI-RS is used for channel measurement, the ratio of PDSCH energy per resource element (EPRE) to CSI-RS EPRE conforms to a predetermined rule.

For CSI reporting in transmission mode 9 (i.e., the mode supporting up to 8-layer transmission), if the UE is configured for PMI/RI reporting, it is assumed that DMRS overhead corresponds to the most recently reported rank. For example, in the case of two or more antenna ports (i.e., rank less than or equal to 2) as described in FIG. 7, DMRS overhead on one RB pair is 12 REs, whereas DMRS overhead in the case of three or more antenna ports (i.e., rank greater than or equal to 3) is 24 REs. Therefore, a CQI index may be calculated on the assumption of DMRS overhead corresponding to the most recently reported rank value.

No REs are allocated to a CSI-RS and a zero-power CSI-RS.

No REs are allocated to a positioning RS (PRS).

The PDSCH transmission scheme conforms to a transmission mode currently set for the UE (the mode may be a default mode).

The ratio of PDSCH EPRE to cell-specific RS EPRE conforms to a predetermined rule.

The eNB may inform UEs of such a CSI-RS configuration through, for example, radio resource control (RRC) signaling. That is, information about the CSI-RS configuration may be provided to UEs in a cell using dedicated RRC signaling. For example, while a UE establishes a connection with the eNB through initial access or handover, the eNB may inform the UE of the CSI-RS configuration through RRC signaling. Alternatively, when the eNB transmits, to a UE, an RRC signaling message demanding channel state feedback based on CSI-RS measurement, the eNB may inform the UE of the CSI-RS configuration through the RRC signaling message.

Meanwhile, locations of the CSI-RS in the time domain, i.e. a cell-specific subframe configuration period and a cell-specific subframe offset, may be summarized as shown in Table 1 below.

TABLE 1

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

As described above, parameter $I_{CSI-RS}$ may be separately configured for a CSI-RS assumed to have a non-zero transmit power by the UE and a CSI-RS assumed to have zero transmit power by the UE. A subframe including a CSI-RS may be represented by Equation 12 below (In Equation 12, $n_f$ is a system frame number and $n_s$ is a slot number).

$$(10n_f + \lfloor n_s/2 \rfloor - \Delta_{CSI-RS}) \bmod T_{CSI-RS} = 0 \quad \text{Equation 12}$$

CSI-RS-Config information elements (IEs) defined as in Table 2 below may be used to specify a CSI-RS configuration.

TABLE 2

CSI-RS-Config information elements

```
-- ASN1START
CSI-RS-Config-r10 ::=       SEQUENCE {
  csi-RS-r10                  CHOICE {
    release                     NULL,
    setup                       SEQUENCE {
      antennaPortsCount-r10       ENUMERATED
                                  {an1, an2, an4, an8},
      resourceConfig-r10          INTEGER (0..31),
      subframeConfig-r10          INTEGER (0..154),
      p-C-r10                     INTEGER (-8..15)
    }
  }                           OPTIONAL, -- Need ON
  zeroTxPowerCSI-RS-r10       CHOICE {
    release                     NULL,
    setup                       SEQUENCE {
      zeroTxPowerResourceConfigList-r10    BIT STRING (SIZE (16)),
      zeroTxPowerSubframeConfig-r10        INTEGER (0..154)
    }
  }                           OPTIONAL -- Need ON
}
-- ASN1STOP
```

In Table 2, parameter 'antennaPortsCount' indicates the number of antenna ports (i.e., CSI-RS ports). In this parameter, an1 corresponds to one antenna port, and an2 corresponds to two antenna ports.

In Table 2, parameter 'p_C' indicates a ratio between PDSCH energy per resource element (EPRE) and CSI-RS EPRE that is assumed when the UE derives CSI feedback.

In Table 2, parameter 'resourceConfig' has, for example, a value that determines the position of an RE to which a CSI-RS is mapped on an RB pair, as shown in FIG. 8.

In Table 2, parameter 'subframeConfig' corresponds to $T_{CSI-RS}$ in Table 1.

In Table 2, zeroTxPowerResourceConfigList and zeroTxPowerSubframeConfig correspond to resourceConfig and subframeConfig of a CSI-RS having a zero transmit power, respectively.

For details of the CSI-RS configuration IE of Table 2, see standard document TS 36.331.

Generation of CSI-RS Sequence

The RS sequence $r_{l,n_s}(m)$ may be defined as Equation 13 below.

$$r_{l,n_s}(m) = \frac{1}{\sqrt{2}}(1 - 2 \cdot c(2m)) + j\frac{1}{\sqrt{2}}(1 - 2 \cdot (2m+1)), \quad \text{Equation 13}$$

$$m = 0, 1, \ldots, N_{RB}^{max,DL} - 1$$

In Equation 13, $n_s$ denotes a slot number (or a slot index) in a subframe, and l denotes an OFDM symbol number (or OFDM symbol index) in a slot. c(i), which denotes a pseudo-random sequence, is defined as a length-31 gold sequence. In generating a pseudo-random sequence, an initialization value is given as $c_{int}$. $c_{int}$ may be given as Equation 14 below.

$$c_{int} = 2^{10} \cdot (7 \cdot (n_s+1) + l + 1) \cdot (2 \cdot N_{ID}^{cell} + 1) + 2 \cdot N_{ID}^{cell} + N_{CP} \quad \text{Equation 14}$$

In Equation 13, $n_s$ denotes a slot number (or a slot index) in a subframe, and l denotes an OFDM symbol number (or OFDM symbol index) in a slot. $N_{ID}^{cell}$ denotes a physical layer cell identifier. $N_{CP}$ is set to 1 for normal CP and to 0 for extended CP.

For details of generation of a CSI-RS sequence, see standard document TS 36.211 v10.4.0.

Channel Status Information (CSI)

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO Tx antennas. To allow the receiver (e.g., a UE) to feed back CSI, the transmitter (e.g., an eNB) may allocate a UL control channel or a UL-SCH to the receiver.

The UE may perform estimation and/or measurement of a downlink channel using a CRS and/or a CSI-RS. The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since the rank is determined mainly according to long-term fading of a channel, the RI may be fed back with a longer periodicity (namely, less frequently) than the PMI and the CQI.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back. For example, the PMI may be determined based on the most recently reported RI.

The CQI is information indicating channel quality or channel strength. The CQI may be expressed as a predetermined MCS combination. That is, a CQI index that is fed back indicates a corresponding modulation scheme and code rate. The CQI may configure a specific resource region (e.g., a region specified by a valid subframe and/or a physical RB) as a CQI reference resource and be calculated on the assumption that PDSCH transmission is present on the CQI reference resource, and the PDSCH can be received without exceeding a predetermined error probability (e.g., 0.1). Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs (e.g., i1 and i2). Thereby, more precise PMI may be fed back, and more precise CQI may be calculated and reported based on such precise PMI.

Meanwhile, the CSI may be periodically transmitted over a PUCCH and or aperiodically transmitted over a PUSCH. For the RI, various reporting modes may be defined depending on which of a first PMI (e.g., W1), a second PMI (e.g., W2), and a CQI is fed back and whether the PMI and/or CQI that is fed back relates to a wideband (WB) or a subband (SB).

CQI Calculation

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CSI. The CQI is more specifically defined below.

A CQI that the UE reports corresponds to a specific index value. The CQI index has a value indicating a modulation technique, code rate, and the like that correspond to the channel state. For example, CQI indexes and anaylized meanings thereof may be given as shown in Table 3 below.

TABLE 3

| CQI index | Modulation | Code rate x 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 1 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). If even CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

If all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. If two or more combinations of a TBS and a modulation scheme are almost equal to the code rate indicated by the corresponding CQI index, a combination having the smallest TBS may be determined.

A CQI reference resource is defined as the following.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_f may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field if the length of DwPTS is less than or equal to 7680*Ts (Ts=1/(15000×2048) seconds), nor belongs to a measurement gap configured for the UE. If there is no valid downlink subframe for the CQI reference resource, CQI reporting is not performed in uplink subframe n.

In the layer region, the CQI reference resource is defined as a RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmission diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, see 3GPP TS 36.213.

In summary, the downlink receiver (e.g., a UE) may configure a specific single subframe of the past as a CQI reference resource with respect to the current time at which it is performing CQI calculation, and when a PDSCH is transmitted from the eNB on the CQI reference resource, may calculate a CQI value such that a condition that the error probability should not exceed 10% is satisfied.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. CoMP technology may increase performance of UEs located at a cell edge and average sector throughput.

In a multi-cell environment with a frequency reuse factor set to 1, the performance of a UE located at a cell edge and average sector throughput may be lowered due to inter-cell interference (ICI). To attenuate ICI, the legacy LTE system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. That is, one point transmits data to a single UE at a given time point, while the other points in the CoMP cooperation unit do not transmit data to the UE at the time point. A point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination among cells of the CoMP cooperation units.

In the case of uplink, CoMP reception refers to reception of a signal transmitted through cooperation among a plurality of geographically separated points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination among the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

Carrier Aggregation

Before description is given of carrier aggregation, the concept of cell introduced to manage radio resources in LTE-A will be described first. A cell may be understood as a combination of downlink resources and uplink resources.

Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Figure 10:
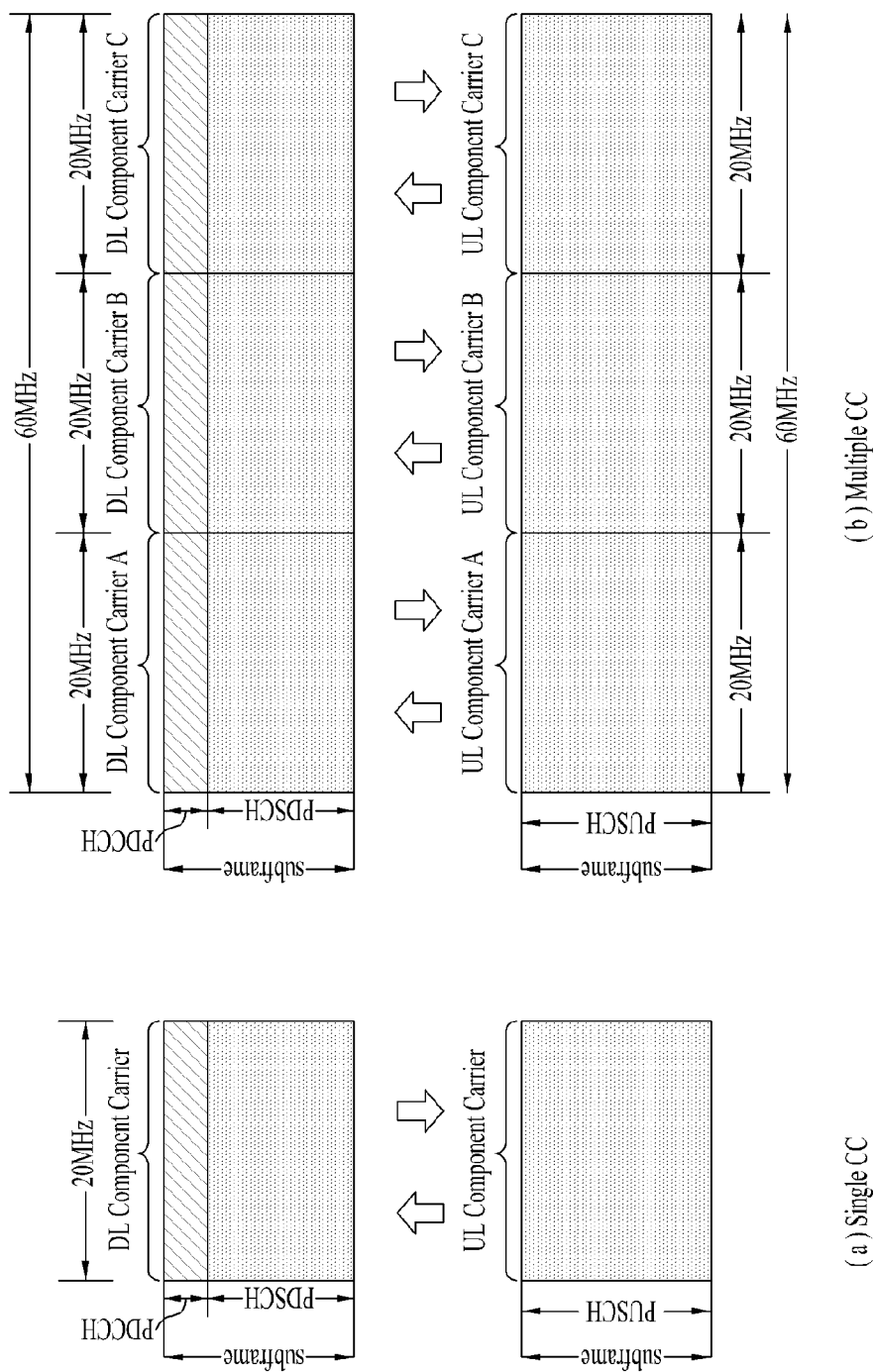
FIG. 10 illustrates

FIG. 10 illustrates carrier aggregation

Carrier aggregation is a technology that has been introduced to allow for use of a broader band in order to meet the requirements of a high-speed transmission rate. Carrier aggregation may be defined as an aggregation of two or more component carriers (CCs) having different carrier frequencies or an aggregation of two or more cells. Referring to FIG. 10, FIG. 10(a) illustrates a subframe in a case when one CC is used in the legacy LTE system, and FIG. 10(b) illustrates a subframe in a case where carrier aggregation is used. For example, in FIG. 10(b), 3 CCs of 20 MHz are used, thereby supporting a bandwidth of 60 MHz. Herein, CCs may be continuous or non-continuous in the frequency domain.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Figure 11:
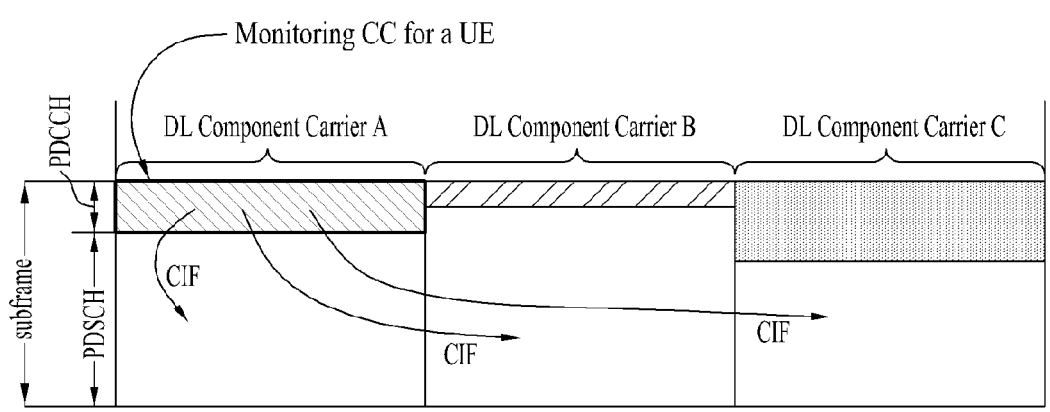
FIG. 11 is a diagram illustrating cross-carrier scheduling.

FIG. 11 illustrates cross-carrier scheduling.

Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, the size of 3 bits), or may not be included in the DCI format (in this case, the CIF may be defined to have, for example, the size of 0 bit). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 11, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure, may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, the burden of blind decoding to the UE may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDCCH may not be transmitted in DL CC B and DL CC C.

PDCCH Processing

Control channel elements (CCEs), which are contiguous logical allocation units, are used in mapping PDCCHs to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 4.

TABLE 4

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

One of the four formats may be used for a PDCCH, but this is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is an aggregation of candidate PDCCHs including CCEs which the UE needs to attempt to decode at an aggregation level. Each aggregation level and the corresponding number of candidate PDCCHs may be defined as shown in Table 5 below.

TABLE 5

| | Search space | | |
|---|---|---|---|
| | Aggregation level | Size (in CCE units) | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 5, there are 4 aggregation levels, and the UE has a plurality of search spaces according to the aggregation levels. The search spaces may be divided into a UE-specific search space and a common search space, as shown in Table 5. The UE-specific search space is for specific UEs. Each UE may check an RNTI and CRC with which the PDCCH is masked, by monitoring the UE-specific search space thereof (attempting to decode an aggregation of PDCCH candidates according to a possible DCI format) and acquire control information if the RNTI and CRC are valid.

The common search space is intended for use in the case in which a plurality of UEs or all UEs need to receive PDCCHs, as in the cases of system information dynamic scheduling and paging messages. The common search space may be used for a specific UE in terms of resource management. Furthermore, the common search space may overlap the UE-specific search space.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times for each of six PDCCH candidates in the common search space, in consideration of two DCI sizes (DCI formats 0/1A/3/3A and DCI format 1C). In the UE-specific search space, the UE needs to attempt to perform decoding for each of 16 (6+6+2+2=16) PDCCH candidates up to 32 times, in consideration of two DCI sizes. Accordingly, when carrier aggregation is not applied, the UE needs to attempt to perform decoding up to 44 times.

Enhanced Control Channel

Hereinafter, an enhanced PDCCH (EPDCCH) will be described as an example of enhanced control channels.

Control information included in the aforementioned DCI formats has been described in terms of a case in which the control information is transmitted through a PDCCH defined in LTE/LTE-A. However, the control information can be applied to another DL control channel, for example, an E-PDCCH in place of the PDCCH. The EPDCCH may correspond to a new form of a control channel for carrying DCI such as scheduling allocation for the UE and may be introduced in order to effectively support a scheme such as inter-cell interference coordination (ICIC), CoMP, MU-MIMO, etc.

The EPDCCH is differentiated from the existing PDCCH in that the EPDCCH is allocated to a time-frequency resource region (e.g., the data region of FIG. 3) except for a region (e.g., the control region of FIG. 3) defined for PDCCH transmission in a legacy LTE/LTE-A system (hereinafter, the existing PDCCH will be referred to as a legacy-PDCCH in order to differentiate the PDCCH from the EPDCCH). For example, mapping of resource elements of the EPDCCH may be expressed as mapping the resource elements to OFDM symbols except for first N (e.g., N≤4) OFDM symbols of a DL subframe in the time domain and mapping the resource elements to a set of semi-statically allocated resource blocks (RBs) in the frequency domain.

For a reason similar to that for introduction of the EPDCCH, an E-PHICH may be defined as a new control channel for carrying HARQ ACK/NACK information about UL transmission and an E-PCFICH may be defined as a new control channel for carrying information about a resource region used for DL control channel transmission. The EPDCCH, the E-PHICH, and/or the E-PCFICH may be collectively referred to as an enhanced-control channel.

An enhanced REG may be used to define mapping of enhanced-control channels to resource elements. For example, for one physical resource block (PRB) pair, 16 EREGs (i.e., EREG 0 to EREG 15) may be present. On one PRB, REs except for REs to which demodulation reference signals (DMRSs) are mapped are denoted by numbers 0 to 15. The numbers are assigned in an order in which frequency increases and then in an order in which time increases. For example, REs denoted by i constitute EREG i.

Enhanced-control channels may be transmitted using aggregation of one or more enhanced CCEs (ECCEs). Each ECCE may include one or more EREGs. The number of EREGs per ECCE may be, for example, 4 or 8 (4 in the case of a general subframe of a normal CP).

Available ECCEs for the enhanced-control channel may be denoted by numbers 0 to $N_{ECCE}-1$. $N_{ECCE}$ may be, for example, 1, 2, 4, 8, 16, or 32.

The number of REs of a PRB pair configured for transmission of the enhanced-control channel may be defined to satisfy the following conditions i), ii), and iii): i) the REs are contained in one of 16 EREGs of the PRB pair; ii) the REs are not used for a cell-specific reference signal (CRS) or a channel state information-reference signal (CSI-RS); and iii) the enhanced-control channel belongs to an OFDM symbol with an index that is greater than or equal to the index of an OFDM symbol on which a control channel is started.

In addition, enhanced-control channels may be mapped to REs in a localized manner or a distributed manner. The enhanced-control channel may be mapped to REs that satisfy the following conditions a) to d): a) the REs are contained in an EREG allocated for transmission; b) the REs are not a part of a PRB pair used in transmitting a physical broadcast channel (PBCH) or a synchronization signal; c) the REs are not used for a CRS or a CSI-RS for a specific UE; and d) the enhanced-control channel belongs to an OFDM symbol with an index that is greater than or equal to the index of an OFDM on which the enhanced-control channel starts.

Allocation of the enhanced-control channel may be performed as the following. One or more enhanced-control channel-PRB-sets may be configured for the UE through higher layer signaling from an eNB. For example, in the case of the EPDCCH, the enhanced-control channel-PRB-set may be used for monitoring of the EPDCCH.

In addition, cross interleaving may or may not be applied to mapping of the enhanced-control channel to REs.

When cross interleaving is not applied, one enhanced-control channel may be mapped to a specific set of RBs, and the number of RBs included in the RB set may correspond to an aggregation level of 1, 2, 4, or 8. In addition, another enhanced-control channel may not be transmitted in this RB set.

When cross interleaving is applied, a plurality of enhanced-control channels may be multiplexed and interleaved together and mapped to an RB allocated for enhanced-control channel transmission. That is, multiple enhanced-control channels may also be expressed as being mapped together to a specific resource block set.

DCI Format 1A

DCI format 1A refers to DCI formats which are used for compact scheduling of one PDSCH codeword in a cell. That is, DCI format 1A may include control information that is used for rank-1 transmission such as single antenna transmission, single stream transmission, or transmission diversity transmission. Tables 3 and 4 show examples of DCI format 1A that is defined in the legacy 3GPP LTE/LTE-A standard.

TABLE 6

| Carrier Indicator | 0 or 3 bits |
|---|---|
| Flag for format 0/format 1A differentiation | 1 bit |
| Localized/Distributed VRB assignment Flag | 1 bit |
| Resource Block Assignment | N bits |
| Modulation and coding scheme | 5 bits |
| HARQ process number | 3 bits (FDD), 4 bits (TDD) |
| New Data Indicator | 1 bit |
| Redundancy Version | 2 bits |
| TPC (Transmit Power Control) command for PUCCH | 2 bits |
| Downlink Assignment Index | 0 bit (FDD), 2 bits (TDD) |
| SRS (Sounding Reference Signal) request | 0 or 1 bit |

DCI format 1A containing control information as shown in Table 6 may be provided to the UE over a PDCCH or an EPDCCH by the eNB.

DCI format 1A contains information for scheduling the most basic DL transmission (transmission of one PDSCH codeword with rank 1). Accordingly, in the case in which a complex PDSCH transmission scheme such as transmission with a rank higher than or equal to 2 and/or transmission of a plurality of codewords is not correctly implemented, DCI format 1A may be used to support the most basic PDSCH transmission scheme (i.e., fallback).

Quasi Co-Location (QCL)

Hereinafter, a QC or QCL (Quasi Co-Located) relationship will be described in terms of signal or channel.

When large-scale properties of a signal received through one antenna port can be inferred from another signal received through another antenna port, the two antenna ports may be said to be QCL. Herein, the large-scale properties may include at least one of a delay spread, a Doppler shift, a frequency shift, an average received power, and received timing.

Alternatively, two antenna ports may be said to be QCL when large-scale properties of a channel over which a symbol on one antenna port is transmitted can be inferred from properties of a channel over which another symbol on the other antenna port is transmitted. Herein, the large-scale properties may include at least one of a delay spread, a Doppler spread, a Doppler shift, an average gain, and an average delay.

In using the term QC or QCL in this disclosure, the definition thereof is not distinguished in terms of the signals or channels described above.

The UE may assume that any two antenna ports having the QCL assumption established therebetween are co-located even if the antenna ports are not actually co-located. For example, the UE may assume that two antenna ports having the QCL assumption established therebetween are at the same transmission point (TP).

For example, a specific CSI-RS antenna port, a specific downlink DMRS antenna port, and a specific CRS antenna port may be configured to be QCL. This configuration may correspond to a case in which the specific CSI-RS antenna port, the specific downlink DMRS antenna port, and the specific CRS antenna port are from one serving cell.

Alternatively, a CSI-RS antenna port and a downlink DMRS antenna port may be configured to be QCL. For example, in a CoMP environment in which a plurality of TPs participates, a TP from which a CSI-RS antenna port is actually transmitted may not be explicitly known to the UE. In this case, the UE may be informed that a specific CSI-RS antenna port and a specific DMRS antenna port are QCL. This may correspond to a case in which the specific CSI-RS antenna port and the specific DMRS antenna port are from a certain TP.

In this case, the UE may increase the performance of channel estimation through a DMRS, based on the information about large-scale properties of a channel acquired using a CSI-RS or a CRS. For example, the UE may perform an operation of, for example, attenuating interference of a channel estimated through the DMRS, using the delay spread of a channel estimated through the CSI-RS.

For example, regarding delay spread and Doppler spread, the UE may apply estimation results of the power-delay-profile, the delay spread and Doppler spectrum and the Doppler spread for one antenna port to a Wiener filter which is used in performing channel estimation for another antenna port. In addition, regarding frequency shift and received timing, after the UE performs time and frequency synchronization for an antenna port, it may apply the same synchronization to demodulation on another antenna port. Further, regarding average received power, the UE may average measurements of reference signal received power (RSRP) over two or more antenna ports.

For example, the UE may receive information about a DL scheduling grant through a specific DMRS-based DL-related DCI format (e.g., DCI format 2C) over a PDCCH (or an EPDCCH). In this case, the UE performs channel estimation of a scheduled PDSCH through a configured DMRS sequence and then performs data demodulation. For example, if the UE can make a QCL assumption that a DMRS port configuration received from the DL scheduling grant and a port for a specific RS (e.g., a specific CSI-RS, a specific CRS, a DL serving cell CRS of the UE, etc.) are QCL, then the UE may apply the estimates of the large-scale properties such as the delay spread estimated through the port for the specific RS to implementation of channel estimation through the DMRS port, thereby improving performance of DMRS-based reception.

This is because the CSI-RS or CRS is a cell-specific signal transmitted over the full band in the frequency domain, and thus allows for more accurate recognition of large-scale properties of a channel than the DMRS. Particularly, the CRS is a reference signal that is broadcast with a relatively high density over the full band in every subframe as described above, and thus, generally, estimates of the large-scale properties of a channel may be more stably and accurately acquired from the CRS. On the other hand, the DMRS is UE-specifically transmitted only on specific scheduled RBs, and accordingly accuracy of estimates of the large-scale properties of a channel is lower than in the case of the CRS or the CSI-RS. In addition, even if a plurality of physical resource block groups (PBRGs) are scheduled for a UE, an effective channel received by the UE may change on a PRBG-by-PRBG basis since a precoding matrix that the eNB uses for transmission may change on the PRBG-by-PRBG basis. Therefore, even if large-scale properties of a radio channel are estimated based on the DMRS over a wide band, the accuracy of estimation may be low.

For antenna ports (APs) which are not QCL (non-quasi-co-located (NQC)), the UE cannot assume that the APs have the same large-scale properties. In this case, the UE needs to perform independent processing for each NQC AP regarding timing acquisition and tracking, frequency offset estimation and compensation, delay estimation, and Doppler estimation.

Information indicating whether or not APs are QCL may be provided to the UE through downlink control information (e.g., a PQI field of DCI format 2D (a PDSCH RE mapping and QCL indicator field)). Specifically, parameter sets of a QCL configuration may be preconfigured by a higher layer, and a specific one of the QCL parameter sets may be indicated through the PQI field of DCI format.

Method for Signaling QC-Related Information

According to one embodiment of the present invention, an eNB may signal QC assumption information between RSs such as a CRS, a CSI-RS, and a DMRS, thereby improving performance of CSI feedback and reception processing in the UE.

Higher Layer Signaling of QC-Related Information

Hereinafter, descriptions will be given of embodiments of the present invention in which QC-related information is configured through higher layer (e.g., RRC) signaling. For example, when the UE receives signaling of one or more CSI-RS configuration(s) through a higher layer, whether or not QC assumption with specific RS (s) is possible may be indicated for each CSI-RS configuration (herein, the specific RS may be a CRS of a specific cell (e.g., a DL serving cell or a neighboring cell) of the UE, another CSI-RS, or a DMRS). The UE configured as above may apply such QC assumption or NQC assumption to calculation/determination of information (e.g., RI, PMI, CQI, etc.) to be reported in feeding back CSI based on each CSI-RS configuration.

As an example of higher layer signaling of QC-related information, an operation depending on whether QC/NQC assumption between a CSI-RS port and a CRS port is applied will be described.

For example, a UE may receive signaling of a plurality of CSI-RS configurations. In the description below, CSI-RS configurations may be understood as CSI-RS resources. For example, the UE may receive signaling of CSI-RS configuration 1 (hereinafter, referred to as "CSI-RS1") and CSI-RS configuration 2 (hereinafter, referred to as "CSI-RS2") through a higher layer. In addition, it may be signaled by the higher layer that it can be assumed that CSI-RS1 and the DL serving cell CRS are QC and that CSI-RS2 and the DL serving cell CRS are NQC.

In this case, the UE may perform CSI calculation using CSI-RS1 for which QC assumption with the DL serving cell CRS is possible based on the following assumption. In calculating CSI, the UE may calculate/determine RI, PMI, CQI, and the like that do not exceed a predetermined error rate in performing data demodulation on the assumption that a DMRS-based PDSCH is received. In this case, the UE may calculate an RI, a PMI, a CQI, and the like with which the UE can achieve an FER less than or equal to 10% of the FER obtained in the case of data demodulation on the assumption that a corresponding PDSCH DMRS port(s) has a QC relationship with the DL serving cell CRS. In addition, in calculating CSI using CSI-RS1, the QC assumption may be reflected in a Pc value (see parameter p_C of Table 2) contained in the CSI-RS configuration, in a manner that predetermined scaling considering the DL serving cell CRS is applied.

Meanwhile, since CSI-RS2 is configured to have an NQC relationship with the DL serving cell CRS, the UE does not adopt the QC assumption between the PDSCH DMRS port(s) and the DL serving cell CRS when calculating/determining RI, PMI and CQI, assuming that a DMRS-based PDSCH is received from the TP having transmitted CSI-RS2. In other words, the UE may calculate/determine an RI, a PMI and a CQI with which the UE can achieve an FER less than or equal to 10% of the FER obtained in the case of data demodulation through the DMRS-based PDSCH without the QC assumption. For example, the UE may calculate/determine an MCS level, a CQI, an RI, and the like lower (namely, expected to provide more robust transmission) than when the QC assumption is applicable, and report the same to the eNB.

As another example of higher layer signaling of QC-related information, information indicating whether or not QC/NQC assumption between CSI-RS port(s) for a specific CSI-RS configuration and CSI-RS port(s) for another CSI-RS configuration is applied may be included in higher layer signaling.

For example, it is proposed that predetermined location information be included in each CSI-RS configuration to be interpreted as indicating that QC assumption can be made between CSI-RSs having the same location value. The location information may have a size of N bits. For example, it may be assumed that an eNB having a 2-dimensional uniform rectangular antenna array (URA) including L×M antennas performs 3-dimensional beamforming. In this case, the eNB may signal that multiple CSI-RS configurations established for one UE by a 2-dimensional URA have a QC relationship therebetween. Accordingly, the UE may apply part or all of large-scale properties (e.g., delay spread, Doppler spread, frequency shift, received timing, etc.) measured for a specific CSI-RS port for one CSI-RS configuration to a CSI-RS port for another CSI-RS configuration. Thereby, channel estimation complexity of the UE may be significantly reduced. However, if average received powers for different CSI-RS configurations are assumed to have a QC relationship among other large-scale channel properties, a 3-dimensional beamforming gain may not be sufficiently achieved. Accordingly, in determining average received power, CSI-RS ports belonging to different CSI-RS configurations may be assumed to have an NQC relationship.

In another example, each CSI-RS configuration may include a flag bit. Every time the flag bit is toggled, it may be indicated whether or not a corresponding CSI-RS configuration belongs to the same group of CSI-RS configurations subject to the QC assumption. For example, if the value of the flag bit is toggled, (namely, if the flag bit of a corresponding CSI-RS configuration changes from 0 to 1 or from 1 to 0 with respect to the flag bit of the previous CSI-RS configuration), it may be indicated that the CSI-RS configuration belongs to a group different from the group to which the previous CSI-RS configuration belongs. If the flag bit is not toggled, this may indicate that the CSI-RS configuration belongs to the group to which the previous CSI-RS configuration belongs. For example, suppose that 5 CSI-RS configurations (CSI-RS1, CSI-RS2, . . . , CSI-RS5) are signaled to the UE and that the flag bits for CSI-RS1 and CSI-RS2 are set to '0', flag bits for CSI-RS3 and CSI-RS4 are set to '1', and the flag bit for CSI-RS5 is toggled to '0'. In this case, it may be indicated that QC assumption is possible between CSI-RS1 and CSI-RS2 and between CSI-RS3 and CSI-RS4 and that CSI-RS5 does not have a QC relationship with the other CSI-RSs (namely, CSI-RS5 has an NQC relationship with the other CSI-RSs). Additionally, it can be seen that QC assumption cannot be made between CSI-RS1 or CSI-RS2 and CSI-RS3 or CSI-RS4.

In another example, when X indicates the value of a CSI-RS sequence scrambling seed included in each CSI-RS configuration, whether or not QC assumption is applied may be implicitly indicated depending on whether or not the X values are equal. For example, if CSI-RS configurations have the same X value, it may be indicated that QC assumption is applied to the CSI-RS port(s) for the CSI-RS configurations. If CSI-RS configurations have different X values, it may be indicated that NQC assumption is applied to the CSI-RS port(s) for the CSI-RS configurations. Herein, the X value is included in the CSI-RS configurations which are UE-specifically established, and accordingly it may be set independently of a physical cell identifier (PCI), which is cell-specifically given, and be referred to as a virtual cell identifier (VCI). X may be set to an integer between 0 and 503 as in the case of the PCI, but need not have the same value as the PCI.

If the value of X included in a specific CSI-RS configuration is equal to the PCI value of specific CRS port(s), it may be implicitly indicated that QC assumption may be possible between the CSI-RS port(s) of the CSI-RS configuration and the specific CRS port(s). If the value of X included in a specific CSI-RS configuration is not equal to the PCI value of specific CRS port(s), it may be implicitly indicated that NQC assumption may be possible between the CSI-RS port(s) of the CSI-RS configuration and the specific CRS port(s).

Additionally, X indicating a CSI-RS scrambling sequence seed value may be individually allocated to each CSI-RS port in one CSI-RS configuration. In this case, whether or not QC/NQC assumption between a CSI-RS port and another RS port (e.g., a CSI-RS port of another CSI-RS configuration, another CSI-RS port in the same CSI-RS configuration, and/or a CRS port) is applied may be implicitly indicated depending on whether the X values of the respective CSI-RS ports (or the X value for a specific CSI-RS port and the PCI value for a specific CRS) are equal to each other.

In another example of higher layer signaling of QC-related information, a specific CSI-RS configuration may contain information indicating whether or not QC/NQC assumption between a corresponding port and another DMRS port is applied.

For example, whether or not QC/NQC assumption specific DMRS port(s) is applied may be indicated for each CSI-RS configuration through RRC. If the UE receives a configuration of CSI-RS1 to which i QC assumption with all DMRS port(s) is applicable, the UE may apply estimates of large-scale properties obtained using CSI-RS1 to DMRS-based PDSCH reception. Upon receiving the configuration of CSI-RS1, the UE may interpret this configuration as meaning that the eNB will semi-statically (namely, as long as the CSI-RS is not reconfigured) transmit a PDSCH to the UE from a TP having transmitted CSI-RS1. In particular, in CoMP scenario 4 (i.e., in a situation in which CRSs are simultaneously transmitted from multiple TPs having the same cell ID), it is difficult to apply a TP-specific QC assumption through such CRSs, and accordingly information about DMRS port(s) for which QC assumption with CSI-RS port(s) is established may be signaled to the UE such that the information is utilized in improving performance of DMRS-based reception processing.

In another example, it is assumed that the UE receives configurations of CSI-RS1 and CSI-RS2 with QC assumption applied between CSI-RS1 and a DL serving cell CRS and NQC assumption applied between CSI-RS2 and the DL serving cell CRS. In this case, the UE may interpret this reception/operate as having received an implicit semi-static indication that QC assumption with both CSI-RS1 and the DL serving cell CRS is applied to DMRS port(s). For example, as the UE receives a configuration indicating that QC assumption is possible between CSI-RS1 and the DL serving cell CRS, the UE may report, when feeding back CSI based on CSI-RS1, CSI feedback information such as an MCS level and CQI which are higher than when NQC assumption is established. Accordingly, if the eNB signals that QC assumption is applied to CSI-RS1 and the DL serving cell CRS (and does not signal otherwise), the UE may interpret this signaling as an agreement that the eNB will cause a TP having transmitted CSI-RS1 to transmit a DMRS-based PDSCH when the eNB schedules DL transmission for the UE. Thus, the UE may report CSI feedback information based on CSI-RS1 for which QC is assumed, and receive a PDSCH by applying the QC assumption. Thereby, performance of reception processing may be improved.

Specifically, if any of multiple CSI-RS configurations in a CoMP measurement set is allowed to have a QC assumption with the DL serving cell CRS, the UE may implicitly interpret this as semi-statically indicating that QC assumption is possible between the corresponding DMRS port(s) and the DL serving cell CRS port(s) of the UE (and CSI-RS port(s) to which QC assumption with the DL serving cell CRS port(s) is applied) in performing DMRS-based PDSCH demodulation. Thereby, the UE is allowed to perform reception processing in consideration of the QC assumption among the DL serving cell CRS, DMRS and CSI-RS ports. In addition, the UE generates CSI to be fed back on the assumption of reception processing subjected to the QC assumption. For example, the UE may calculate/determine and report an MCS level, a CQI, an RI, a PMI, and the like with which an error rate less than or equal to 10% can be achieved in performing data demodulation, assuming that the DMRS port(s) has a QC relationship with the DL serving cell CRS port(s) (and CSI-RS port(s) to which QC assumption with the DL serving cell CRS port(s) is applied) on the assumption that the UE receives a DMRS-based PDSCH.

If all the CSI-RS configurations in a CoMP measurement set are set to be subjected to NQC assumption with the DL serving cell CRS, the UE may implicitly interpret this as semi-statically indicating that NQC assumption between the corresponding DMRS port(s) and the DL serving cell CRS port(s) of the UE is applied in performing DMRS-based PDSCH demodulation. In addition, in performing reception processing, the UE should not apply the QC assumption between the CSI-RS port(s) of a CSI-RS configuration and other RS port(s). Further, the UE generates CSI to be fed back on the assumption of reception processing subjected to the NQC assumption. For example, the UE may calculate/determine and report an MCS level, a CQI, an RI, a PMI, and the like with which an error rate less than or equal to 10% can be achieved in performing data demodulation, assuming that the DMRS port(s) has an NQC relationship with the DL serving cell CRS port(s) on the assumption that the UE receives a DMRS-based PDSCH.

In another example, when each CSI-RS configuration contains subframe index information, and a DMRS-based PDSCH is scheduled in corresponding subframe(s), whether or not QC/NQC assumption between the DMRS port(s) and the CSI-RS port(s) (and the DL serving cell CRS port(s)) is applied may be indicated through RRC signaling. For example, if it is signaled that a QC assumption can be made between CSI-RS1 and the DMRS port(s) in a subframe whose index is an even number, the UE may apply all or some of large-scale properties estimated using CRS port(s)) of CSI-RS1 and/or DL serving cell CRS port(s) to DMRS-based PDSCH reception processing. In feeding back CSI, the UE may generate and report both CSI in consideration of QC assumption and CSI in consideration of NQC assumption. Alternatively, the UE may calculate/determine and report both a CQI assuming QC and a CQI assuming NQC.

Such signaling may be provided in the form of a subframe bitmap or a subframe index set. For example, subframe set 1 may be configured such that the QC assumption is possible between DMRS port(s) and DL serving cell CRS port(s), and subframe set 2 may be configured such that the QC assumption is possible between DMRS port(s) and specific CSI-RS port(s). Alternatively, subframe set 1 may be configured such that the QC assumption is possible between DMRS port(s) and DL serving cell CRS port(s), and subframe set 2 may be configured such that DMRS port(s) and specific CSI-RS port(s) are assumed to be NQC.

Dynamic Signaling of QC-Related Information

Hereinafter, description will be given of examples of the present invention of configuring QC-related information through dynamic signaling. For example, the UE may receive DL-related (or downlink grant) DCI about DMRS-based PDSCH transmission through a PDCCH or an EPDCCH. The DCI may include information indicating whether or not QC assumption between DMRS port(s) and other RS (e.g., a DL serving cell CRS or CSI-RS of the UE) port(s) is applied.

As an example of dynamic signaling of QC-related information, only whether or not QC assumption is made between the DMRS port(s) and a specific RS (e.g., the DL serving cell CRS or CSI-RS of the UE) port(s) may be dynamically signaled through information having the size of 1 bit. Thereby, if a PDSCH is transmitted, in the manner of dynamic point selection, from a TP for which QC assumption is possible when DL-related DCI for PDSCH scheduling in a manner of CoMP DPS or dynamic cell selection, the eNB may signal, to the UE, that application of QC assumption is possible, thereby improving performance of reception processing of the UE.

In another example of dynamic signaling of QC-related information, "QC-pair information between a CSI-RS port and a DMRS port" or "QC-pair information between a CRS port and a DMRS port" may be semi-statically pre-configured as information having a plurality of states by higher layer (e.g., RRC layer) signaling, and one of the states may be dynamically indicated when scheduling grant information is provided to the UE through DCI. For example, one of N (e.g., N=2) bit states is dynamically triggered, and each of the states corresponds to one of inter-RS QC-pair candidates (e.g., a pair of a CSI-RS and a DMRS and a pair of a CRS and a DMRS) pre-configured by RRC.

For example, if N=2, states may be pre-configured such that state '00' indicates NQC (namely, DMRS ports are not subject to QC assumption with other RS ports), state '01' indicates that QC assumption with a DL serving cell CRS port is possible, state '10' indicates that QC assumption with a first RRC-configured set of RS (e.g., specific CSI-RS or specific CRS) ports is possible, and state '11' indicates that a second RRC-configured set of RS ports configured by RRC is possible. For example, the inter-RS QC-pair of the first RRC-configured set may indicate that "DMRS ports can have QC assumption with CSI-RS port(s) of CSI-RS1 and CSI-RS2", and the second RRC-configured inter-RS QC-pair may indicate that "DMRS ports can have QC assumption with CRS port(s)".

In addition, QC information and CRS rate matching (RM) pattern information may be jointly encoded. In this case, the N bit field in the DCI format may be referred to as a "PDSCH RE mapping and QCL indicator field" (or PQI field).

For example, N (e.g., N=2) bit states may be configured as shown in Table 7 below.

TABLE 7

| State | QC assumption with CSI-RS | RM pattern information (RM pattern information) | Flag for QC assumption with CRS |
| --- | --- | --- | --- |
| '00' | CSI-RS1 | CRS-RM1(e.g., PCI1) | 1 |
| '01' | CSI-RS2 | CRS-RM2(e.g., PCI2) | 1 |
| '10' | CSI-RS3 | CRS-RM3(e.g., PCI3) | 0 |
| '11' | CSI-RS1, CSI-RS2 | CRS-RM1(e.g., PCI1), CRS-RM2(e.g., PCI2) | 1 |

In Table 7, the item "QC assumption with CSI-RS" indicates a CSI-RS configuration to which QC assumption with the DMRS port is applicable when information indicating a specific state ('00', '01', '10', '11') is included in DL-related DCI for scheduling transmission of a DMRS-based PDSCH. For example, it may be assumed that one different CSI-RS per TP is pre-configured for the UE through RRC signaling. Herein, a specific TP may be referred to as TPn with an index n(n=0, 1, 2, . . . ), a CSI-RS configuration corresponding to TPn may be referred to as CSI-RSn. Herein, the term TP may be understood as meaning a cell. CSI-RSn may be a CSI-RS configuration of non-zero Tx power (non-zero power (NZP)).

In this case, state '00' of Table 7 may indicate that QC assumption between CSI-RS port(s) for CSI-RS1 transmitted from TP1 and the DMRS port(s) is possible. State '01' may indicate that QC assumption is possible between CSI-RS port(s) of CSI-RS2 transmitted from TP2 and corresponding DMRS port(s), and state '10' may indicate that QC assumption is possible between CSI-RS port(s) of CSI-RS3 transmitted from TP3 and corresponding DMRS port(s). That is, the eNB may indicate one of states '00', '01' and '10' through the DL-related DCI, thereby dynamically signaling DPS-wise PDSCH transmission from one of TP1, TP2 and TP3.

The item "QC assumption with CSI-RS" of Table 7 may also be signaled, for example, in a manner of informing that the CSI-RS is transmitted from specific TP(s). For example, the UE may be informed of a TP transmitting a CSI-RS to which QC assumption with the DMRS is applied, using an identifier (e.g., PCI, VCI, a scrambling sequence seed value, or the like) configured to indicate specific TP(s).

The item "QC assumption with CSI-RS" may also be used to indicate a specific CSI process. In the case of DPS-wise PDSCH transmission, only one CSI process index may be indicated. In the case of PDSCH transmission in the JP or joint transmission (JT) scheme, multiple CSI process indexes may be indicated. Each CSI process may be associated with a CSI-RS resource for channel measurement and a CSI-interference measurement resource (CSI-IM resource). Specifically, one CSI process is defined to be associated with an NZP CSI-RS resource for measurement of a desired signal and an interference measurement resource (IMR) for interference measurement. Each CSI process has an independent CSI feedback configuration. The independent CSI feedback configuration represents a feedback mode (the type of CSI (RI, PMI, CQI, etc.) and a transmission order of CSIs), a periodicity of feedback and a feedback offset.

When N (N=2) bit information indicating "QC assumption with CSI process" is included in DL-related DCI for scheduling DMRS-based PDSCH transmission as described above, the information may indicate whether QC assumption with the DMRS is applicable for each of the NZP CSI-RS resource and the IMR which are associated with a specific CSI process. That is, information indicating whether QC assumption with the DMRS is applicable to both the NZP CSI-RS resource and the IMR, to only the NZP CSI-RS resource, or to only the IMR, or whether both are NQC with the DMRS may be individually provided.

If QC assumption is applicable between the IMR and the DMRS, this may mean that a parameter (e.g., the value of interference or noise variance) estimated through the IMR is allowed to be utilized to determine a coefficient of a minimum mean squared error (MMSE) filter such as the Wiener filter in the reception processing for DMRS-based demodulation. In this case, performance of demodulation of the DMRS may be improved.

By individually signaling whether or not QC assumption with the DMRS is applicable for each of the NZP CSI-RS and the IMR associated with a CSI process, more accurate channel estimation may be expected. For example, when a parameter (e.g., noise variance value) estimated using the IMR is used for reception processing for data demodulation based on the DMRS (e.g., when the parameter is used as a coefficient of an MMSE filter), there may occur an error in single-user (SU)-MIMO transmission or multiple user (MU)-MIMO transmission. Specifically, for SU-MIMO transmission, QC assumption with the DMRS is applicable for both the NZP CSI-RS resource and the IMR, and thus it may be expected that data demodulation performance will be improved. For MU-MIMO transmission, on the other hand, QC assumption with the DMRS is preferably applicable only to the NZP CSI-RS resource and NQC assumption is established between the IMR and the DMRS (namely, a value such as noise variance estimated using the IMR is prohibited from being reused for data demodulation).

Accordingly, an additional flag bit with the size of 1 bit operatively connected with each state of Table 7 may be defined such that the flag bit indicates only QC assumption between an NZP CSI-RS resource and the DMRS when the flag bit is set to '0', and indicates QC assumption between the DMRS and both the NZP CSI-RS resource and the IMR when the flag bit is set to '1'. Alternatively, the additional flag bit may be defined such that the flag bit indicates MU-MIMO transmission when set to '0', and indicates SU-MIMO transmission when set to '1'. Alternatively, the additional flag bit may be defined such that the flag bit indicates, when set to '0', that QC assumption between a CSI process index and the DMRS is disabled (namely, NQC assumption is applied), and indicates, when set to '1', that the QC assumption between the CSI process index and the DMRS is enabled.

The N bit (e.g., N=2) information and/or the additional flag information with the size of 1 bit which is defined for dynamic signaling of QC information as described above may reuse a format defined in the legacy DCI format, or a new bit field may be additionally defined. When the additional flag information with the size of 1 bit is used to switch on/off the QC assumption depending on whether MIMO is SU-MIMO or MU-MIMO, the information may be semi-statically configured as additional information indicated by the N bit information (namely, information which each state of the N bit information pre-represents through RRC signaling), rather than being included in dynamic signaling as a separate bit.

In the example of Table 7, a TP implementing PDSCH transmission in the DPS scheme (or an RS to which QC assumption with the DMRS is applied) may be indicated as described above. Additionally, as in the case of state '11' of Table 7, PDSCH transmission from TP1 and TP2 in the JT scheme may be indicated. That is, as in the example of Table 7, the item "QC assumption with CSI-RS" may be signaled as "CSI-RS1, CSI-RS2", as an identifier corresponding to TP1 and TP2 (e.g., PCI, VCI, or a scrambling sequence seed value), or as "CSI process1, CSI process2". Once the UE acquires such signaling information through DCI, the UE may recognize, through information indicating that QC assumption with TPs is applicable, that DMRS ports will be transmitted from multiple TPs in the form of a virtual DMRS, and may determine estimates of large-scale properties from the TPs by averaging estimates of large-scale properties from the TPs and use the same to improve reception performance.

In another example, the item "QC assumption with CSI-RS" for a specific state (e.g., state '11' of Table 7) in the N bit information may be set to "non-QC (NQC)" or "not available" or left empty to signal that QC assumption with any TPs should not be applied. This may be used to indicate JT. For example, in the case of JT, since providing only information about QC assumption with one specific TP may be inappropriate, the NQC state may be signaled. If "not available" or empty item is signaled, the NQC state may be implicitly indicated, and as a result no QC assumption may be applied or a certain default state may be applied. For example, the default state may be defined as a state in which only QC assumption with a specific DL serving cell RS(s)

(e.g., a DL serving cell CRS, a CSI-RS corresponding to a default TP (e.g., a DL serving TP), a CSI-RS belonging to a specific CSI process, etc.) can be applied.

Additionally, as in the example of Table 7, information about a CRS rate matching (RM) pattern which the UE needs to assume upon receiving a corresponding PDSCH may be signaled. The information about the CRS RM pattern may include the number of CRS ports, a CRS v-shift (a value of shift in the frequency axis with respect to a basic CRS pattern (see FIG. 6)), and a subframe set to which the RM pattern is applied. The CRS RM pattern refers to configuring PDSCH symbols on the assumption that a PDSCH is mapped to the REs except RE(s) to which a CRS is mapped. Accordingly, a terminal that receives the PDSCH can correctly demodulate the PDSCH only when it correctly recognizes a CRS pattern which is considered in rate-matching and transmitting the PDSCH.

For example, when CRS RM pattern information which TPn transmits is defined as CRS-RMn, state '00' may signal CRS-RM1 representing information about a CRS RM pattern transmitted from TP1, state '01' may signal CRS-RM2 representing information about a CRS RM pattern transmitted from TP2, and state '10' may signal CRS-RM3 representing information about a CRS RM pattern transmitted from TP3. That is, the eNB may indicate one of states '00', '01' or '10', thereby dynamically signaling PDSCH transmission according to DPS from one of TP1, TP2 and TP3. Herein, each CRS RM pattern may be correctly and dynamically indicated in the form of CRS-RMn by providing CRS RM pattern information in addition to "QC assumption with CSI-RS" information, particularly in CoMP scenario 3 (namely, in a situation in which CRSs are simultaneously transmitted from multiple TPs having different cell IDs (i.e., PCIs).

Each pattern may also be signaled in a manner of informing that the item "RM pattern information" of Table 7 is transmitted from specific TP(s). For example, the UE may be informed of a CRS RM pattern by using an identifier (e.g., a PCI, a VCI, or a scrambling sequence seed value, etc.) indicating specific TP(s).

As described above, DPS transmission may be dynamically indicated through state '00', '01' or '10'. Additionally, as a method for indicating JT from TP1 and TP2 as in the example of state '11' of Table 7, the item "RM pattern information" may be signaled as "CRS-RM1, CRS-RM2", or an identifier (e.g., PCI, VCI, or scrambling sequence seed value, etc.) corresponding to TP1 and TP2 may be indicated. The UE having acquired such signaling information through DCI may perform PDSCH demodulation, assuming, for example, that PDSCHs are rate-matched on all REs corresponding to a union of CRS-RM1 and CRS-RM2. That is, if multiple pieces of CRS RM pattern information are indicated by the item "RM pattern information", the UE receiving the PDSCH may perform PDSCH demodulation, assuming that the PDSCH is not mapped to RE positions indicated by any one of indicated CRS RM patterns (namely, rate-matching is performed during PDSCH transmission).

Additionally, as in the example of Table 7, the item "Flag for QC assumption with CRS" may include flag indication information indicating whether or not QC assumption can be established between specific CSI-RSn indicated by the item "QC assumption with CSI-RS" and a specific CRS port (i.e., CRS port(s) designated by PCI information) indicated by the item "RM pattern information". Specifically, if a specific state value (e.g., '00', '01', '10', '11') is triggered and the flag bit in the information indicated by the state value is enabled (or is set to '1'), this may be defined to indicate that QC assumption can be established between CSI-RS port(s) of CSI-RSn indicated by the state value and CRS port(s) of CRS-RMn indicated by the state value (the CRS port(s) may be known, for example, through PCIn or VCIn which the CRS-RMn indicates). If a specific state value (e.g., '00', '01', '10', '11') is triggered and the flag bit in the information indicated by the state value is disabled (or set to '0'), this may be defined to indicate that QC assumption should not be established between CSI-RS port(s) of CSI-RSn indicated by the state value and CRS port(s) of CRS-RMn indicated by the state value (the CRS port(s) may be known, for example, through PCIn or VCIn which the CRS-RMn indicates) (namely, an NQC relationship is established).

Referring to Table 7, states '00' and '01' have "Flag for QC assumption with CRS" set to '1', and thus respectively indicate DPS transmission from TP1 and TP2. Specifically, if the flag bit is set to '1' in state '00', this is interpreted as indicating that QC assumption between CSI-RS1 and DMRS port(s) and QC assumption between CSI-RS1 and PCB-based CRS port(s) are applicable on the assumption that a PDSCH is rate-matched according to CRS-RM1 pattern. If the flag bit is set to '1' in state '01', this is interpreted as QC assumption between CSI-RS2 and DMRS port(s) and QC assumption between CSI-RS2 and PCI2-based CRS port(s) are applicable on the assumption that a PDSCH is rate-matched according to CRS-RM2 pattern.

If not only applicability of QC assumption between DMRS port(s) and specific CSI-RS port(s) but also applicability of QC assumption between CSI-RS port(s) and specific CRS port(s) (i.e., information indicated by the flag bit of Table 7) is signaled to the UE as above, the UE may be allowed to use not only CSI-RS port(s) to which QC assumption is applicable, but also large-scale channel properties estimated from the CRS port(s) providing a significantly high RS density (namely, more accurate large-scale channel properties) in performing DMRS-based PDSCH demodulation.

Meanwhile, in the example of Table 7, if "Flag for QC assumption with CRS" corresponding to state '10' is set to '0', which indicates DPS transmission from TP3, this is interpreted as meaning that QC assumption between CSI-RS3 and DMRS port(s) is applicable, but QC assumption between CSI-RS3 and PCI3-based CRS port(s) should not be applied on the assumption that a PDSCH is rate-matched according to CRS-RM3 pattern.

In the example of Table 7, if "Flag for QC assumption with CRS" corresponding to state '11' is set to '1', which indicates JT transmission from TP1 and TP2, this is interpreted as meaning that QC assumption between CSI-RS1 and PCI1-based CRS port(s) and QC assumption between CSI-RS2 and PCI2-based CRS port(s) are applicable on the assumption that a PDSCH is rate-matched in consideration of both CRS-RM1 and CRS-RM2 patterns.

If multiple CSI-RSn's are present in the item "QC assumption with CSI-RS" corresponding to a specific state, and CRS-RMn's are present in the item "RM pattern information", this may be interpreted as meaning that QC-pairs between a CSI-RSn and a CRS-RMn are configured in a predetermined order. For example, this case may be interpreted as meaning that QC assumption between CSI-RS1 and CRS-RM1 and QC assumption between CSI-RS2 and CRS-RM2 is applied. If the flag bit is set to '0', for example, this may be interpreted as meaning that neither QC assumption between CSI-RS1 and CRS-RM1 nor QC assumption between CSI-RS2 and CRS-RM2 is applied (namely, an NQC relationship is established between the CSI-RSs and the CRS-RMs). Alternatively, "Flag for QC assumption with CRS" information may be configured in a manner such that the information individually indicates whether QC/NQC is established between each CSI-RSn and each CRS-RMn.

As another example of dynamic signaling of QC-related information, N (e.g., N=2) bit states may be configured as shown in Table 8.

TABLE 8

| State | QC assumption with CSI-RS) | RM pattern information | Flag for QC assumption with CRS | Interpretation |
|---|---|---|---|---|
| '00' | CSI-RS1 | CRS-RM4 (e.g., PCI4) | 0 | There is no CRS port to which QC assumption with CSI-RS1 is applicable (NQC). |
| '01' | CSI-RS2 | CRS-RM4 (e.g., PCI4) | 0 | There is no CRS port to which QC assumption with CSI-RS1 is applicable (NQC). |
| '10' | CSI-RS3 | CRS-RM3 (e.g., PCI3) | 1 | QC assumption between CSI-RS3 and a PCI3-based CRS port is applicable. |

TABLE 8-continued

| State | QC assumption with CSI-RS) | RM pattern information | Flag for QC assumption with CRS | Interpretation |
|---|---|---|---|---|
| '11' | CSI-RS1, CSI-RS2 | No-CRS (i.e., MBSFN) | 0 | There is no CRS port to which QC assumption with CSI-RS1 and CSI-RS2 is applicable (NQC). |

In the example of Table 8, CRS-RM4 (e.g., PCI4) may correspond to CoMP scenario 4, in which TP1 and TP2 share PCI4. In addition, as in the case of state '11' of Table 8, No-CRS (i.e., MBSFN) may be indicated as CRS RM pattern information. Referring to FIG. 3, an MBSFN subframe may represent a subframe in which only a CRS and a control channel (e.g., PDCCH) are transmitted in the control region, and neither the CRS nor the PDSCH is transmitted in the data region. To perform scheduling of JT only in MBSFN subframes, No-CRS (i.e., an MBSFN) may be indicated. The UE may interpret this indication as meaning that there is no CRS in the data region, and thus may assume that rate matching of the PDSCH is not performed at RE locations corresponding to CRS ports (namely, the PDSCH is mapped to the corresponding REs) in assuming rate matching for the PDSCH.

The DMRS scrambling seed value x(n) (e.g., n=0, 1) may be implicitly pre-linked or pre-tied (e.g., by RRC signaling) to each state of an N bit-sized field (e.g., a PQI field) described above with reference to Tables 7 and 8. In this case, when a specific one of 2^N states is indicated by dynamic signaling, a joint encoding scheme may be used, for example, in a manner that a separate dynamic indication parameter (e.g., a scrambling identifier (nSCID)) indicates a value to be used among the values of x(n) linked to the state.

In the case in which the joint encoding scheme described above is added to the example of Table 7, an example of Table 9 below may be considered.

TABLE 9

| State | QC assumption with CSI-RS | RM pattern information | Flag for QC assumption with CRS | DMRS scrambling seed x(0) tied to nSCID = 0 | DMRS scrambling seed x(1) tied to nSCID = 1 |
|---|---|---|---|---|---|
| '00' | CSI-RS1 | CRS-RM1 (e.g, PCI1) | 1 | 315 | 420 |
| '01' | CSI-RS2 | CRS-RM2 (e.g., PCI2) | 1 | 96 | 420 |
| '10' | CSI-RS3 | CRS-RM3 (e.g., PCI3) | 0 | 117 | 420 |
| '11' | CSI-RS1, CSI-RS2 | CRS-RM1 (e.g., PCI1), CRS-RM2 (e.g., PCI2) | 1 | 480 | 420 |

In the example of Table 9, the range of x(n) may be from 0 to 503, which corresponds to the PCI range. Table 9 shows exemplary values of x(0) and x(1) allocated to each state. For example, 420 may be allocated in common as a value of x(1) linked/tied to nSCID=1. If a specific identifier value to be used in common by multiple TPs is allocated and nSCID=1 is indicated as in this case, using the shared identifier value may be allowed, thereby ensuring DMRS orthogonality between TPs. In addition, different values of x(0) linked/tied to nSCID=0 may be allocated to the individual states as in the example of Table 9. Thereby, a TP-specific VCI (or a scrambling seed value) may be used to acquire a cell-splitting gain. In addition, a separate VCI (or scrambling seed value) for JT may be designated by allocating a value of x(0) to state '11' such that the value of x(0) for state '11' differs from the values of x(0) for the other states as in the example of Table 9.

For example, different values of x(n) may be linked/tied to 2^N states respectively in an N bit field (e.g., a PQI field) indicating QC information and information about a CRS RM pattern as described above. In this case, the value of nSCID to be used to generate a DMRS sequence is dynamically indicated through another filed in the DCI format, and the value of x(n) is implicitly determined according to the value of nSCID. For example, a rule may be established such that x(n) (e.g., n=0 or 1) is indicated when nSCID=n. For example, when a specific state of the 2^N states is dynamically indicated, x(0), x(1), and the like linked to the state are determined through joint encoding for x(n). Additionally, one of x(0), x(1), and the like is finally determined/selected according to the value of nSCID indicated through a separate field.

QC Behavior

In a legacy system (e.g., a system operating according to a standard prior to 3GPP LTE Release-10 (Rel-10)) that does not support CoMP operation, a behavior of assuming QC between RS ports may be substantially viewed as being implicitly defined. In this invention, this behavior may be referred to as Behavior A. Behavior A may be defined as a behavior of assuming that a CRS, a CSI-RS and a PDSCH DMRS are QC with respect to at least one of frequency shift, Doppler spread, received timing and delay spread. This is because the CRS port, CSI-RS port and the PDSCH DMRS port all naturally need to be assumed to be transmitted from one cell or TP in the legacy system, without considering CoMP operation.

In a system supporting CoMP operation, another behavior (e.g., a behavior of assuming that CSI-RS1 of TP1 and CSI-RS2 of TP2 are QC) may be defined for QC assumption. Accordingly, an embodiment of the present invention proposes that Behavior A be defined as a default behavior in a system to which multiple QC behaviors are applicable. That is, the UE may be defined to always operate according to Behavior A, which is the default behavior, if a specific condition is satisfied.

For example, the UE may be configured to always apply Behavior A to specific CSI process index(s) unless the index is not separately signaled. This is intended to ensure the same performance as in the legacy system (Rel-10 system) by allowing the UE to operate according to the same QC assumption as in the legacy system for at least one CSI process when multiple CSI processes are configured for the UE. For example, for CSI process index 0, Behavior A may always be applied. In this case, a specific CSI-RS resource to which QC assumption with a CRS transmitted from a DL serving cell/TP is applicable in, for example, CoMP scenario 3, may be configured for CSI process index 0.

Behavior A, which is the default behavior, may be defined to be applied to transmission modes (e.g., TM9) defined in a legacy system (e.g., a system operating according to a standard prior to 3GPP LTE Rel-10) other than a new transmission mode (e.g., TM10) defined in a CoMP operation-supporting system (e.g., a system conforming to a standard after 3GPP LTE Rel-11).

A QC behavior applicable to only a system supporting the CoMP operation may be defined as follows.

In the case in which a DL grant is received through a DCI format (e.g., DCI format 2D) applied to a new transmission mode (e.g., TM10), the UE may assume a new QC behavior (hereinafter, Behavior B). Behavior B may be defined as assuming that a CRS, a CSI-RS, and a PDSCH DMRS (and/or an EPDCCH DMRS) are not QC with respect to at least one of delay spread, Doppler spread, Doppler shift, average gain, and average delay, except for the following exception. The exception is that a PDSCH DMRS (and/or an EPDCCH DMRS) and a specific CSI-RS resource indicated by physical layer signaling (e.g., signaling through PDCCH DCI) can be assumed to be QC with respect to at least one of the delay spread, the Doppler spread, the Doppler shift, and the average delay. That is, Behavior B may be basically configured not to allow QC assumption between a CRS and another RS (e.g., a CSI-RS and a DMRS), and when the DL grant is received through DCI format 2D, QC assumption between CSI-RS port(s) of a specific CSI-RS resource indicated by dynamic signaling as in the examples of Tables 7, 8 and 9 and DMRS port(s) of a PDSCH scheduled by DCI format 2D may be applicable.

Whether or not QC assumption between a specific CRS and a specific CSI-RS is applicable may also be signaled in the examples of Tables 7, 8 and 9 (or through separate RRC signaling).

If the DL grant is received through DCI format 2D, QC assumption between a corresponding PDSCH DMRS port and a specific CSI-RS port may be established. Additionally, whether or not QC assumption between a specific CSI-RS and a specific CRS is applicable may be configured through RRC signaling. In this case, it may be signaled that QC assumption can be established among a DMRS port, a CSI-RS port and a CRS port. Behavior B may be given for DCI format 2D, and the UE may perform data demodulation (for example, the UE may reflect large-scale properties estimated through other RSs in determining a Wiener filter coefficient) based on the QC assumption according to Behavior B. When Behavior B is applied, a specific CSI-RS, a CRS, and a DMRS are not necessarily from the DL serving cell even if it is indicated that QC assumption has been established among the specific CSI-RS, the CRS, and the DMRS, which is a great difference from Behavior A. For example, the CRS may correspond to a CRS port of a neighboring cell rather than the DL serving cell, and one of multiple CSI-RS resources may be indicated for the CSI-RS.

Regarding frequency offset (or Doppler shift), even if the UE is set to Behavior B, it may be configured to estimate an initial (or coarse) frequency offset based on the serving cell CRS and to estimate a fine frequency offset through an indicated CSI-RS only within a specific frequency range (e.g., [−N; +N] Hz). For example, if the transmission periodicity of the CSI-RS is 5 ms, the frequency offset of 200 Hz, which is the reciprocal of 5 ms, may be estimated based on the CSI-RS without ambiguity, and thus the following operation of the UE may be defined.

The UE may expect, using the CSI-RS as indicated (by Behavior B), that a Doppler shift (and/or Doppler spread) tracked by the UE is within the range of frequency offset (e.g., [−N; +N] Hz) for the serving cell. For example, if the periodicity of the indicated CSI-RS is 5 ms, N=100 Hz. If the periodicity of the indicated CSI-RS is 10 ms, N=50 Hz. If the periodicity of the indicated CSI-RS is 20 ms, N=25 Hz. If the periodicity of the indicated CSI-RS is 40 ms, N=12.5 Hz. If the periodicity of the indicated CSI-RS is 80 ms, N=6.25 Hz. Briefly, if the indicated CSI-RS has a periodicity of T [ms], N may be set such that N=1/(kT) [Hz]. Herein, k may be, for example, 2.

The proposed embodiment of the present invention above means that the UE variably determines a frequency range to be searched with respect to the serving cell CRS for estimation of a frequency offset (or a Doppler shift and/or a Doppler spread) as the periodicity of the indicated CSI-RS varies. Herein, the indicated CSI-RS may represent one NZP CSI-RS which can establish QC assumption with a DMRS indicated by a DCI (e.g., DCI format 2D) in the case of a UE for which a plurality of CSI-RS resources are configured by a higher layer (e.g., a UE for which TM10 is configured). Alternatively, the indicated CSI-RS may be a specific default CSI-RS configured through RRC in the case of DCI format 1A.

If the periodicity of the CSI-RS is 10 ms, the range for the UE to search is reduced by half of the range for the periodicity of 5 ms. That is, as the CSI-RS periodicity set by the eNB increases, the frequency offset between the CSI-RS and the CRS of a serving cell needs to be set within a narrower range. In this case, the UE only needs to estimate the frequency offset within a narrower search range. To prevent CSI-RS transmission having a frequency offset out of the search range from causing the UE to incorrectly perform channel estimation and degrading the performance of the UE, the eNB needs to ensure the relationship between the CRS and the CSI-RS as above.

In view of the eNB, if a frequency offset (or a Doppler shift) between the oscillator of a TP transmitting the CRS and the oscillator of a TP transmitting the indicated CSI-RS is not within a range of $[-N; +N]$ Hz according to $N=1/(kT)$ (e.g., $k=2$) corresponding to the periodicity of the indicated CSI-RS, T[ms], this may mean that the periodicity of the CSI-RS cannot be set to T [ms]. In this case, the eNB needs to configure and transmit a CSI-RS having a periodicity set to a value less than T [ms].

Alternatively, to unify the UE operations, the eNB may be limited to always configure only a CSI-RS having the periodicity of T1 ms (e.g., T1=5) as a CSI-RS to be applied to the case of Behavior B. In this case, the UE may expect that the Doppler shift (and/or Doppler spread) tracked by the UE by using the CSI-RS as indicated (Behavior B) is within the range of frequency offset ($[-N; +N]$ Hz with, for example, N=100) with respect to the serving cell, regardless of the indicated periodicity of the CSI-RS.

Alternatively, the eNB may configure a CSI-RS having a periodicity different from the periodicity of T1 ms, but may set the frequency range for the UE to search to the narrowest range. For example, the eNB may configure various CSI-RSs having periodicities of T=5, 10, 20, 40 and 80 ms, such that the value of N always ensures at least the narrowest range (namely, N=6.25 Hz when T=80 ms). In this case, the UE may expect that the Doppler shift (and/or Doppler spread) tracked by the UE by using the CSI-RS as indicated (Behavior B) is within the range of frequency offset ($[-N; +N]$ Hz with, for example, N=6.25) with respect to the serving cell, regardless of the indicated periodicity of the CSI-RS. If the eNB can configure various CSI-RSs having periodicities of T=5 and 10, N may be set to 50 Hz to ensure the narrowest frequency range of search. That is, regardless of the periodicity of the indicated CSI-RS, the UE may only need to perform search within a specific range of $[-N; +N]$ Hz. Thereby, the eNB may configure only a CSI-RS having a periodicity ensuring the above operation of the UE such that the UE utilizes the CSI-RS in Behavior B.

If system performance is lowered or other problems occur in a system to which a new transmission mode (e.g., TM10) is applicable, operation in the default transmission mode needs to be supported for stable operation. This mode may be referred to as a fallback operation mode. For example, in the case in which a DL grant is received through a fallback DCI format (e.g., DCI format 1A) in MBSFN subframes, the UE may operate according o to Behavior A' (i.e., a variant of Behavior A). Behavior A' may be defined as assuming that a CRS, a CSI-RS, and a PDSCH DMRS (and/or an EPD-CCH DMRS) are not QC with respect to at least one of delay spread, Doppler spread, Doppler shift, average gain, and average delay, except for the following exception. The exception may be that a CRS (e.g., a CRS of a DL serving cell or a specific CRS indicated through RRC signaling) and a PDSCH DMRS are assumed to be QC with respect to at least one of the delay spread, the Doppler spread, the Doppler shift, and the average delay. That is, Behavior A' may be basically configured not to allow QC assumption between a CSI-RS and another RS (e.g., a CRS, a DMRS), and when the DL grant is received through DCI format 1A in an MBSFN subframe, QC assumption may be always established between specific CRS port(s) and DMRS port(s) (e.g., DMRS port 7) of a PDSCH scheduled by DCI format 1A.

In another example, Behavior A' may be defined such that QC assumption can be additionally established between a specific CSI-RS resource index n (e.g., n=0), a CRS and a DMRS. In this case, the scrambling seed value X of the corresponding CSI-RS resource may be restricted to be always a PCI. Alternatively, it may be expressed in terms of operation of the UE that the UE is not allowed to expect that CSI-RS resource index n is not identical to the PCI. Alternatively, a CSI process (or a specific CSI-RS resource associated with the CSI process) may be used in place of the CSI-RS resource. That is, Behavior A' may be presented as indicating that additional QC assumption can be established between specific CSI process i (e.g., i=0), a CRS and a DMRS. When the UE performs data demodulation according to the above assumption, it may apply large-scale channel properties estimated using other RSs to a reception process (by, for example, determining a Wiener filter coefficient based on the properties).

As Behavior A' is defined as a separate behavior different from Behavior A or B as above, performance of data demodulation of the UE may be further improved. Specifically, DCI format 1A, which corresponds to a fallback DCI format, may be used to ensure clear and robust transmission, for example, in a situation in which ambiguity can occur in a period in which various RRC reconfigurations are applied. In a legacy system (e.g., a Rel-10 system), demodulation is defined to be performed through DMRS port 7 when DCI format 1A is received in an MBSFN subframe. In performing demodulation, a PCI may be used as a DMRS scrambling seed. In this case, QC assumption may be established between a DL serving cell CRS port through which a CRS generated using the PCI is broadcast and a DMRS. Accordingly, more accurate large-scale channel properties measured using the CRS can be used in performing data demodulation, thereby improving data demodulation performance.

Accordingly, Behavior A' may basically allow QC assumption between a CRS port and a DMRS port. In addition, Behavior A' may provide information indicating that QC assumption can be established between a specific CSI-RS resource index (e.g., CSI-RS resource index 0) or a CSI-RS port belonging to the specific CSI process index (e.g., CSI process index 0) and a DMRS port. For example, in CoMP scenario 4, in which multiple TPs use the same cell identifier, CSI-RSs may be simultaneously transmitted from the TPs from which CRSs are simultaneously transmitted (namely, virtual CSI-RSs generated by the PCI may be simultaneously transmitted from a plurality of TPs).

In other words, Behavior A' may be understood as being basically similar to Behavior A in that QC assumption can always be established between a CRS and a DMRS, but being different from Behavior A in terms of a method of indicating a CSI-RS to which QC assumption with a DMRS is applicable. Specifically, according to Behavior A, a CSI-RS to which QC assumption with a DMRS is applicable may be dynamically indicated through the DCI. According to Behavior A', on the other hand, a CSI-RS to which QC assumption with the DMRS is applicable may be semi-statically indicated through RRC signaling or a specific CSI-RS resource index (e.g., CSI-RS resource index 0) may be statically configured.

In another example relating to Behavior A', Behavior A' may be defined such that QC assumption cannot be established between a CRS and a DMRS, but can be established between a specific CSI-RS resource index (e.g., CSI-RS resource index 0) and the DMRS. Behavior A' defined as above is similar to Behavior B. However, according to Behavior B, a CSI-RS resource which can be assumed to be QC with the DMRS is dynamically indicated through the DCI. According to Behavior A', on the other hand, a CSI-RS to which QC assumption with the DMRS is applicable may be semi-statically indicated through RRC signaling or a specific CSI-RS resource index (e.g., CSI-RS resource index 0) may be statically configured.

In the various examples of Behavior A' described above, the specific CSI-RS resource index (e.g., CSI-RS resource index 0) may be dynamically indicated as in Behavior B, rather than being statically or semi-statically configured. For example, a CSI-RS port belonging to a CSI-RS resource (or a CSI process) to which QC assumption with the DMRS port is applicable may be indicated through a specific field of DCI format 1A detected in an MBSFN subframe (or a UE-specific search space of the MBSFN subframe). In this case, Behavior B may be applied in both a case in which the DL grant is received through DCI format 1A in the MBSFN subframe and a case in which the DL grant is received through DCI format 2D. Alternatively, Behavior A may be applied in a case in which the DL grant is received through DCI format 1A in the MBSFN subframe and a case in which TMs having indexes lower than that of TM9 (and in this case, the CSI-RS resource may be subject to semi-static RRC signaling or a specific CSI-RS resource index may be statically applied), while Behavior B may be applied only in a case in which the DL grant is received through DCI format 2D.

Meanwhile, the CSI-RS may be excluded from definition of Behavior A. That is, Behavior A may be defined to assume that a CRS and a PDSCH DMRS are QC with respect to at least one of frequency shift, Doppler spread, received timing, and delay spread. Excluding QC assumption for the CSI-RS is intended to support a case such as CoMP scenario 4 in which CRSs are simultaneously transmitted from multiple TPs in the form of SFN, but CSI-RSs are not simultaneously transmitted from the TPs in the form of SFN. In other words, in Behavior A, estimates of large-scale properties which can aid in performing data demodulation can be sufficiently reflected through QC assumption between the CRS and the DMRS alone, and channel properties measured using the CSI-RS having a lower density than the CRS may not be viewed as greatly improving the performance of DMRS-based data demodulation. For this reason, QC assumption between the CSI-RS and the DMRS may be excluded.

Further, Behavior A excluding the CSI-RS as above may be applied to a case in which no CSI-RS resource is configured for the UE (namely, a TDD system, a reciprocity system, and the like). On the other hand, if a CSI-RS resource is configured for the UE, QC assumptions among the CRS, the CSI-RS and the DMRS may be applied according to Behavior A described above. Behavior A may be restricted to be applied to only specific TM(s) (e.g., TM1 to TM9 or TM1 to TM8).

Behavior A depending on whether or not a CSI-RS resource is configured may be expressed as follows. Behavior A may be defined to assume that a CRS, a CSI-RS (if configured), and a PDSCH DMRS are QC with respect to at least one of frequency shift, Doppler spread, received timing and delay spread. In other words, by assigning a condition of "if configured" to the CSI-RS, Behavior A depending on whether or not the CSI-RS resource is configured may be briefly expressed.

Further, when details of Behavior A' are incorporated into Behavior A, Behavior A may be defined as the following. Behavior A may be defined as a behavior of assuming that a CRS, a CSI-RS (if only one CSI-RS resource is configured) and a PDSCH DMRS are QC with respect to at least one of frequency shift, Doppler spread, received timing and delay spread. In other words, Behavior A may be defined as a behavior of assuming that a CRS, a CSI-RS (if the CSI-RS is configured, and the number of configured CSI-RS resources is 1) and a PDSCH DMRS are QC with respect to at least one of frequency shift, Doppler spread, received timing and delay spread. In other words, Behavior A may be defined as a behavior of assuming that a CRS, a CSI-RS (if the CSI-RS is configured, the number of configured CSI-RS resource is 1 (or UE capability P for the maximum number of CSI processes is $\{1\}$)) and a PDSCH DMRS are QC with respect to at least one of frequency shift, Doppler spread, received timing and delay spread.

By assigning a condition having the same meaning as "if one CSI-RS resource is configured" to the CSI-RS as above, Behavior A depending on whether or not the CSI-RS resource is configured may be briefly expressed. Accordingly, when one CSI-RS resource is configured for the UE, QC assumption may be established among the CRS, the CSI-RS and the DMRS. If no CSI-RS resource is configured for the UE (as in, for example, the TDD system), or two or more CSI-RS resources are configured for the UE (as in the case of, for example, TM10), QC assumption may be established only between the CRS and the DMRS, while QC assumption with the CSI-RS is not applied.

If Behavior A is defined to include a case in which QC assumption is excluded for the CSI-RS as above, Behavior A may also be applied to a case in which a DL grant is received through DCI format 1A in an MBSFN subframe in TM10. Behavior B, on the other hand, may be applied only to a case in which the DL grant is received through DCI format 2D in TM10.

Among the proposed details above, QC Behavior of the UE in the case in which the DL grant is received through DCI format 1A in an MBSFN subframe may also be applied to a case in which the DL grant is received through DCI format 1A in a non-MBSFN subframe (or only a case in which the DL grant is received through DCI format 1A in the UE-specific search space in a non-MBSFN subframe). This is because DMRS-based data demodulation can be defined as in the operation in an MBSFN subframe in the case in which a DL grant is received through DCI format 1A in a non-MBSFN subframe in a new TM (e.g., TM10) (or through DCI format 1A in the UE-specific search space in a non-MBSFN subframe) in a new system (e.g., a system after Rel-11), whereas CRS-based data demodulation is defined in a legacy system (e.g., a system prior to Rel-10) such that CRS-based data demodulation is performed when a DL grant is received through DCI format 1A in a non-MBSFN subframe. If DMRS (e.g., DMRS port 7)-based data demodulation is defined, above descriptions of examples of a case in which the DL grant is received through DCI format 1A in an MBSFN subframe may be applied to a case in which the DL grant is received through DCI format 1A in a non-MBSFN subframe.

Determination of PDSCH Symbol Location

In the examples of the present invention described above, description has been given of dynamically indicating information about whether or not QC assumption is applied through an N bit field (e.g., a PQI field) in a DCI format and information associated with PDSCH RE mapping. The present invention additionally proposes a method for additionally indicating information associated with a PDSCH start symbol (or data start symbol) (i.e., an OFDM symbol on which mapping of a PDSCH starts) through an N bit field in a DCI format.

Specifically, $2^N$ parameter sets may be configured for the UE by a higher layer, and one of the $2^N$ parameter sets may be dynamically signaled through an N bit field (e.g., PQI field) in a DCI format. Herein, parameters in one parameter set may include PDSCH start symbol information.

It is assumed that OFDM symbol indexes of one subframe are given as 0, 1, 2, .... That is, for a normal CP subframe, the OFDM symbol indexes of the first slot (or a slot having an even-numbered index if the slot index begins with 0) are given as 0, 1, 2, 3, 4, 5, and 6, and the OFDM symbol indexes of the second slot (or a slot having an odd-numbered index if the slot index begins with 0) are given as 7, 8, 9, 10, 11, 12, and 13. For an extended CP, the OFDM symbol indexes of the first slot (or a slot having an even-numbered index) are given as 0, 1, 2, 3, 4, and 5, and the OFDM symbol indexes of the second slot (or a slot having an odd-numbered index) are given as 6, 7, 8, 9, 10, and 11. In usual cases, a PDCCH may be mapped to OFDM symbol indexes from 0 to 1 or 2. The UE may recognize where the PDCCH symbol is through a PCFICH. If there is not separate signaling of a PDSCH start symbol index, a symbol index right next to the last PDCCH symbol index determined by the PCFICH is basically determined to be the PDSCH start symbol index.

In the present invention, a method of signaling PDSCH start symbol information is proposed separately from determination of the location of a PDSCH start symbol based on the PCFICH (i.e., a CFI value). For example, the PDSCH start symbol information may be provided according to each of $2^N$ states indicated by an N bit field (e.g., a PQI field) in a DCI format indicating the QC assumption-associated information. Alternatively, PDSCH start symbol information to be applied to multiple states of the $2^N$ states in common may be configured through RRC signaling.

The present invention proposes that the UE be informed of PDSCH start symbol index information for each subframe pattern (or subframe set). There may be at least two subframe sets, and the UE may be pre-informed of configuration of the subframe sets. For example, one set including MBSFN subframe(s) and another set including non-MBSFN subframe(s) may be configured. In this case, a PDSCH start symbol index applied to the MBSFN subframe and a PDSCH start symbol index applied to the non-MBSFN subframe may be signaled respectively.

In another example, one PDSCH start symbol index value (e.g., index k) may be provided for each of $2^N$ states indicated by an N bit field (e.g., PQI field) in a DCI format (or as information commonly applied to all states through separate RRC signaling). Further, a PDSCH start symbol is basically determined according to the signaled value of k, but if $k>K_{Threshold}$, $k=K_{Threshold}$ may be applied in a specific subframe set (e.g., an MBSFN subframe). That is, in a specific subframe, the signaled k may be interpreted as having an upper limit ($K_{Threshold}$). In other words, k=min ($K_{Threshold}$, K). Here, K is a PDSCH start symbol index value applied to a normal subframe, and k is a PDSCH start symbol index that the UE determines in the specific subframe.

The specific subframe set may be an MBSFN subframe or may be a non-MBSFN subframe. In addition, the specific subframe set may represent one subframe set or a plurality of subframe sets.

For example, if $K_{Threshold}=3$, it is assumed that a specific state of an N bit field (e.g., a PQI field) in a DCI format indicates k=4. The UE performs PDSCH demodulation considering that the PDSCH start symbol index as signaled is 4 in a non-MBSFN subframe. In an MBSFN subframe, the UE interprets k as $k=K_{Threshold}=3$, thereby performing PDSCH demodulation on the assumption that the PDSCH start symbol index is 3. Herein, $K_{Threshold}=3$ is but an example, and embodiments of the present invention are not limited thereto. $K_{Threshold}$ may be 0, 1, 2, 3, or 4.

To summarize the above proposal, the UE may determine, as a PDSCH start symbol index value, one value (indicated by K) of values of RRC-signaled PDSCH start symbol candidates in a normal subframe (e.g., a non-MBSFN subframe) a value determined from a PCFICH of a serving cell in the case of non-cross-carrier scheduling, and a value set by a higher layer in the case of cross-carrier scheduling. Herein, the values of RRC-signaled PDSCH start symbol candidates may be 0 or reserved values 1, 2, 3, and 4 (4 is applied only when the system bandwidth corresponds to 10 or fewer PRBs). In a specific subframe (e.g., an MBSFN subframe), the PDSCH start symbol index k of the specific subframe (e.g., the MBSFN subframe) is determined as $k=\min(K_{Threshold}, K)$ (e.g., $K_{Threshold}=2$).

In another example, if the PDSCH start symbol determined as above overlaps another control channel region (e.g., a DL serving cell control channel region), an OFDM symbol next to the control channel region may be determined as the PDSCH start symbol.

For example, in a non-MBSFN subframe, the greater one of K and a value (i.e., P) determined from the PCFICH of the serving cell in the case of non-cross-scheduling or determined by a higher layer in the case of cross-carrier scheduling may be determined as the PDSCH start symbol (i.e., k) (i.e., $k=\max\{K, P\}$). Herein, K may be set to one of 0, reserved values of 1, 2, 3 and 4 (4 is applied only when the system bandwidth corresponds to 10 or fewer PRBs), a value determined from the PCFICH of a serving cell in the case of non-cross-carrier scheduling, and a value set by a higher layer in the case of cross-carrier scheduling. Meanwhile, in an MBSFN subframe indicated by the DCI, the greater one of the least one of $K_{Threshold}$ and K and P (i.e., max $\{\min(K_{Threshold}, K), P\}$) may be determined as the PDSCH start symbol (i.e., k).

In another example, the value of K may be determined regardless of determining the PDSCH start symbol from the PCFICH of the serving cell.

For example, in a non-MBSFN subframe, the greater one of K and P may be determined as the PDSCH start symbol (i.e., k) (i.e., $k=\max\{K, P\}$). Herein, K may be set to one of 0 and reserved values of 1, 2, 3 and 4 (4 is applied only when the system bandwidth corresponds to 10 or less PRBs). Meanwhile, in an MBSFN subframe indicated by the DCI, the greater one of the at least one of $K_{Threshold}$ and K and P (i.e., $\max\{\min(K_{Threshold}, K), P\}$) may be determined as the PDSCH start symbol (i.e., k).

The method of determining the PDSCH start symbol as described above may be limited not to be applied if the number of DwPTS symbols in the configuration of a special subframe in a TDD system is less than or equal to a specific value. 8 TDD special subframe configurations, for example, may be defined. Of the TDD special subframe configurations, configurations having DwPTS symbols whose number is less than or equal to 3 may be configurations #0 and #5 (for details, see TS 36.211). In other words, a rule relating to priority between a value determined for the PDSCH start symbol information by RRC signaling and a value determined by DCI signaling may be applied only to special TDD configuration(s) having symbols whose number exceeds a specific symbol number.

In another example, for a TDD system, TDD special configurations which are scheduled to be applied to the $2^N$ states for the DCI signaling respectively may be signaled.

For example, independent TDD special subframe configuration(s) may be configured for each of $2^N$ states by RRC signaling. Which of the $2^N$ states should be applied to the currently scheduled PDSCH transmission may be dynamically indicated through DCI signaling. If a specific state is indicated, and this state indicates a special subframe configuration (e.g., special subframe configuration 6), the UE may override any special subframe configuration of the DL serving cell, and interpret the indicated special subframe configuration as meaning that a PDSCH corresponding to the length of the OFDM symbol is transmitted in the DwPTS region according to the DCI-signaled special subframe configuration, thereby performing PDSCH demodulation according to the interpretation.

If multiple special subframe configurations are indicated by the DCI, JT transmission may be performed. This case may be interpreted as meaning that there is always PDSCH transmission on a DwPTS symbol corresponding to an intersection of the special subframe configurations (namely, an OFDM symbol on which a DwPTS is present in the special subframe configurations in common) or that there is PDSCH transmission on a DwPTS symbol corresponding to a union of the special subframe configurations (namely, an OFDM symbol according to a special subframe configuration having the largest DwPTS region among the special subframe configurations).

Additionally, PDSCH last symbol (PDSCH ending symbol, data last symbol, or data ending symbol) information may be explicitly signaled. In this case, the PDSCH last symbol information may be signaled together with the special subframe configuration(s) according to the $2^N$ states of the DCI signaling. Alternatively, only the last OFDM symbol information may be signaled without signaling the special subframe configuration(s).

For example, the UE may determine a DwPTS region through the special subframe configuration(s) indicated through DCI signaling. Additionally, if PDSCH last OFDM symbol information is explicitly given, then the UE may determine that a few OFDM symbol(s) in the last portion of the DwPTS region are excluded from the PDSCH region, or more symbols may be included in the PDSCH region than in the DwPTS region. That is, given PDSCH last OFDM symbol information, the UE may determine the PDSCH region based on the PDSCH last OFDM symbol even if the special subframe configurations are given through DCI signaling.

Meanwhile, the UE may assume that special subframe configurations of a DL serving cell are applied and even PDSCH transmission from a neighboring cell/TP other than the serving cell matches the special subframe configurations of the serving cell, rather than signaling the special subframe configurations for $2^N$ states indicated by an N bit field (e.g., a PQI field) of a DCI format. In other words, it may be defined that the UE can assume that the configurations are the same as the special subframe configurations of the DL serving cell or that the UE is not allowed to expect that a special subframe configuration different from the special subframe configurations of the DL serving cell will be provided. Similarly, if a PDSCH is scheduled in a DwPTS of a special subframe, the UE is not allowed to expect that the PDSCH will be transmitted from a cell/a TP other than the DL serving cell of the UE.

In another example, when a DL grant is transmitted in a special subframe (specifically, in a DwPTS), an N bit field (e.g., PQI field) may not be included in a corresponding DCI format. This may mean that a non-CoMP operation is performed and that only PDSCH transmission from the DL serving cell may be scheduled in the special subframe.

In the various examples of the present invention described above, the range of the last OFDM symbol indexes of the DwPTS region may be signaled to the UE by informing the UE of the special subframe configuration(s) according to the $2^N$ states of an N bit field (e.g., PQI field) in the DCI format. In addition, signaling for determining a PDSCH start OFDM symbol index may also be provided according to the $2^N$ states of the N bit field (e.g., a PQI field) in the DCI format by RRC signaling. That is, information indicating the PDSCH start OFDM symbol index and information about a TDD special subframe configuration for determining the PDSCH last OFDM symbol index may be included together in an RRC-configuration parameter set according to each of the $2^N$ states. Thereby, the UE may determine the PDSCH start symbol and/or PDSCH last symbol included in a parameter set corresponding to a state value indicated through DCI dynamic signaling, thereby correctly performing PDSCH demodulation.

Application of EPDCCH-Related PQI Parameter

QCL information about a DMRS and a CSI-RS, PDSCH RE mapping (or CRS RM pattern (e.g., the number of CRS ports, a CRS frequency shift, a cell identifier, etc.)) information, information about MBSFN subframe configurations, NZP CSI-RS configuration information, zero-power (ZP) CSI-RS configuration information, TDD special subframe configuration information, PDSCH start symbol information, and/or PDSCH last symbol information may be defined by PQI parameters included in a parameter set (or a parameter list). Such parameter set may be referred to as a PQI (PDSCH RE mapping and QCL indicator) parameter set. Multiple (e.g., $2^N$) PQI parameter sets may be semi-statically configured by a higher layer. Of the $2^N$ PQI parameter sets, a certain parameter set may be dynamically indicated by a state value of an N-bit PQI field (hereinafter, referred to as "PQI state value") in a DCI format (e.g., DCI format 2D).

In addition, the information about the PQI parameter sets may be semi-statically configured in the form of a separate RRC-configured parameter set, as information for the UE to depend on when the information is scheduled by DCI format 1A. Alternatively, a certain PQI parameter set may be configured as default information that the UE should depend on in the case of DCI format 1A. A default PQI parameter set may be configured to, for example, match a configuration of a serving cell, or may be separately defined as a default configuration. The default PQI parameter set for DCI format 1A may be a parameter set (e.g., a parameter set corresponding to the least PQI state value (e.g., '00')) (e.g., parameter set 1) of a plurality of PQI parameter sets configured for DCI format 2D by a higher layer.

Scheduling information corresponding to DCI format 1A may be signaled to the UE over an EPDCCH. In the case of the EPDCCH, a specific PQI parameter set to be applied to each EPDCCH set may be configured by higher layer signaling. The EPDCCH set (or EPDCCH-PRB-set) may represent, for example, a localized EPDCCH mapping RB set or a distributed EPDCCH mapping RB set.

In the case in which scheduling information corresponding to DCI format 1A is signaled to the UE through an EPDCCH, at least one of the PQI parameters may be pre-configured for each EPDCCH set by, for example, RRC signaling. Accordingly, the UE may operate according to some or all of parameters included in an RRC-configured parameter set configured for (or linked or mapped to) each EPDCCH set depending on an EPDCCH set through which DCI format 1A is transmitted to the UE. More specifically, the UE may perform blind decoding in a search space for each pre-configured EPDCCH set, and if DCI format 1A is successfully detected as a result of blind decoding, the UE may perform reception processing by reflecting an assumption according to some or all of the parameters included in an RRC-configured parameter set linked to an EPDCCH set describing the search space in PDSCH demodulation scheduled by DCI format 1A.

Causing the UE to operate according to the PQI parameters configured for each EPDCCH set may be applied only when DCI format 1A is transmitted over the EPDCCH in TM10. If a plurality of EPDCCH sets is configured in TM10, a PQI parameter set may be RRC-configured for each EPDCCH set, and the UE may reflect an assumption according to some or all of the parameters included in an RRC-configured parameter set corresponding to an EPDCCH set in PDSCH demodulation scheduled by DCI format 1A, depending on the EPDCCH set in which DCI format 1A has been detected among the EPDCCH sets. On the other hand, for TM1 to TM9, even if a plurality of EPDCCH sets is configured, some or all of the parameters included in the PQI parameter set may be configured to be applied to the EPDCCH sets in common. The UE may perform reception processing by reflecting an assumption according to some or all of the parameters included in the PQI parameter set and configured in common in PDSCH demodulation scheduled by DCI format 1A, regardless of the EPDCCH set through which DCI format 1A has been received and decoded.

While DCI format 1A has been given above as an example in describing embodiments of the present invention in which a PQI parameter set is RRC-configured EPDCCH set-specifically or EPDCCH set-commonly, the embodiments may also be applied to DCI format 2C or 2D.

In addition, a PQI parameter set for a DCI transmitted through a legacy-PDCCH and a PQI parameter set for a DCI transmitted through an EPDCCH may be independently RRC-configured. That is, they may be different from each other since the PQI parameter set mapped to the PQI state value of a DCI transmitted through a legacy-PDCCH is configured independently of the PQI parameter set mapped to the PQI state value transmitted through an EPDCCH.

An EPDCCH QC behavior may also be defined for each EPDCCH set. For example, RRC-configuration may be implemented such that EPDCCH Behavior A or EPDCCH Behavior B is applied to each EPDCCH set. Herein, EPDCCH Behavior A is a behavior assuming a QCL relationship between an EPDCCH DMRS and a serving cell CRS. EPDCCH Behavior B is a behavior assuming a QCL relationship between the EPDCCH DMRS and a CSI-RS. Alternatively, EPDCCH Behavior A may be configured for all EPDCCH sets as a default QC behavior, and EPDCCH Behavior B for a specific CSI-RS may be independently configured for each EPDCCH set. The EPDCCH QC behavior will be separately described in detail later.

Further, not only a QCL behavior but also some or all of PQI parameters may be configured for each EPDCCH set. In this case, some or all of the RRC-configured PQI parameter sets may be configured to be applied to decoding of the EPDCCH such that they correspond to $2^N$ PQI state values of a DCI. For example, if a DCI (e.g., DCI format 2D) is transmitted through a legacy-PDCCH (or an EPDCCH), a PQI parameter set indicated by a specific state value among the PQI state values may be configured for each EPDCCH set such that some or all of parameters of an RRC-configured parameter set are applied to a specific EPDCCH set so as to correspond to the specific PQI state of the DCI.

In other words, a specific state value of the PQI state values may be designated for each EPDCCH set by RRC configuration. In addition, some or all of PQI parameters (QCL information about a DMRS and a CSI-RS, PDSCH RE mapping (or CRS RM pattern (e.g., the number of CRS ports, a CRS frequency shift, a cell identifier etc.)) information, information about an MBSFN subframe configuration, NZP CSI-RS configuration information, zero-power (ZP) CSI-RS configuration information, TDD special subframe configuration information, PDSCH start symbol information, and/or PDSCH last symbol information) indicated by the specific PQI state value may be applied to EPDCCH decoding.

For example, RE mapping of the EPDCCH may be determined according to the ZP CSI-RS configuration information, one of the PQI parameters, (on the assumption that the EPDCCH is not mapped to an RE indicated by the ZP CSI-RS), and the EPDCCH may be decoded.

Alternatively, RE mapping of the EPDCCH may be determined according to the CRS RM pattern information, which is one of the PQI parameters, and the EPDCCH may be decoded.

Alternatively, whether the subframe in which the EPDCCH is transmitted is an MBSFN subframe or non-MBSFN subframe may be determined according to the MBSFN subframe configuration information, which is one of the PQI parameters, and then whether or not there are RE(s) to which a CRS is mapped may be determined. Then, RE mapping of the EPDCCH may be finally determined, and the EPDCCH may be decoded.

Alternatively, a start symbol of the EPDCCH may be determined based on the PDSCH start symbol information, which is one of the PQI parameters, to determine RE mapping of the EPDCCH and decode the EPDCCH. For example, k, the value of the PDSCH start symbol may be determined based on the PDSCH start symbol information included in a PQI parameter set. The value of k may be used as the value of the start symbol of the EPDCCH. Herein, k indicating the start symbol index of the EPDCCH may be applied to both an MBSFN subframe and a non-MBSFN subframe. Alternatively, k may be determined to be equal to K in the non-MBSFN subframe, and be determined to be equal to $\min(K_{Threshold}, K)$ in the MBSFN subframe. Herein, K may be set to one of 0, reserved values 1, 2, 3 and 4 (4 is applied only when the system bandwidth corresponds to 10 or fewer PRBs), a value determined from the PCFICH of a serving cell in the case of non-cross-carrier scheduling, and a value set by a higher layer in the case of cross-carrier scheduling. $K_{Threshold}$ may be, for example, 2.

When the PQI parameters include one piece of NZP CSI-RS configuration information, the NZP CSI-RS configuration information may be ignored (or may not be considered) for decoding of the EPDCCH. Specifically, if Behavior A or Behavior B is separately RRC-configured for each EPDCCH set, NZP CSI-RS configuration information included in the PQI parameter set for PDSCH demodulation is not applied to decoding of the EPDCCH.

Alternatively, NZP CSI-RS configuration information may be considered for a specific EPDCCH set indicated by EPDCCH Behavior B. The NZP CSI-RS configuration information may optionally be included in the PQI parameter set, and thus description will be given below of each case. If one NZP CSI-RS configurations included in the PQI parameters, this may be considered in determining RE mapping of the EPDCCH and decoding the EPDCCH. Specifically, if there is information about one NZP CSI-RS configuration belonging to an RRC-configured PQI parameter set for each EPDCCH set, Behavior B assuming that the EPDCCH DMRS and the NZP CSI-RS are QCL is applied to decoding of the EPDCCH. If the configuration information about one NZP CSI-RS is not included in the PQI parameters, Behavior B assuming that the EPDCCH DMRS and a default CSI-RS are QCL is applied to decoding of the EPDCCH. Herein, the default CSI-RS may be set to one of a CSI-RS resource assigned the lowest index (e.g., CSI-RS resource index 0), a specific CSI-RS resource (e.g., CSI-RS resource index n, where n has a predetermined value), a CSI-RS resource belonging to the lowest CSI process index (e.g., CSI process index 0) and a CSI-RS resource belonging to a specific CSI process (e.g., CSI process index n, where n has a predetermined value).

As described above, according to an embodiment of the present invention, a PQI parameter set configured for each of EPDCCH sets (or for all EPDCCH sets in common) by a higher layer may be used to determine RE mapping and EPDCCH antenna port QCL of the EPDCCH. Thereby, the performance of encoding the EPDCCH may be improved.

Priorities in Determining PDSCH Start Symbol

The N-bit PQI field in a DCI may have one of $2^N$ PQI state values, thereby indicating one of $2^N$ PQI parameter sets. The $2^N$ PQI parameter sets may be pre-configured by a higher layer (e.g., an RRC layer).

If a specific parameter is not included in a PQI parameter set, a value determined according to a default rule may be applied for the specific parameter.

For example, if PDSCH start symbol index information is not included in (or given to) a PQI parameter set corresponding to the state value of a specific PQI field, the UE may assume that the PDSCH start symbol index matches the PDSCH start location of the serving cell. This means that the UE determines that the location of an EPDCCH start symbol already given through RRC signaling is identical to the location of the PDSCH start symbol rather than determining the PDSCH start symbol based on the PCFICH of the DL serving cell if an EPDCCH start symbol other than the PCI parameter is configured for the UE through separate RRC signaling in the case in which the PDSCH start symbol is not included in the PQI parameters.

For example, if PDSCH start symbol index information is not included in (or given to) a PQI parameter set corresponding to the state value of a specific PQI field, the UE may determine that the PDSCH start symbol index is a symbol index next to the last symbol index of the PDCCH indicated by the PCFICH of the DL serving cell (namely, PDCCH last symbol index+1).

Priorities by which the PQI parameters proposed by the present invention are applied are configured as follows. The first priority (i.e., an operation that is applied first compared to the other cases) is to operate according to a specific PQI parameter corresponding to a PQI state value when the specific PQI parameter is given. The second priority (i.e., an operation that is applied when the operation according to the first priority is not applied), which is applied when a specific PQI parameter corresponding to a PQI state value is not given, is to determine the value of the specific PQI parameter value according to a value, if given, that is separately configured (even for a purpose other than the PQI parameter configuration) in relation to the specific PQI parameter.

Hereinafter, an operation according to an embodiment of the present invention will be described in relation to the PDSCH start symbol information, which is one of the PQI parameters.

In order to determine whether to apply the operation according to the first priority or the operation according to the second priority, it is determined whether a PDSCH start symbol value is included in (or given to) a PQI parameter set corresponding to a specific state value of the PQI field in the DCI.

As the operation according to the first priority, if a PDSCH start symbol value is provided by a PQI parameter set corresponding to a specific state value of the PQI field in the DCI, the UE may perform PDSCH demodulation (or EPDCCH decoding) using the PDSCH start symbol value.

Herein, PDSCH start symbol information (e.g., information represented by K in the above examples) that is RRC-signaled with respect to a non-MBSFN subframe may be one of 0, reserved values of 1, 2, 3 and 4 (4 is applied only when the system bandwidth corresponds to 10 or less PRBs), a value determined from the PCFICH of a serving cell in the case of non-cross-carrier scheduling, and a value set by a higher layer in the case of cross-carrier scheduling.

Alternatively, K may be set to one of 0, reserved values of 1, 2, 3 and 4 (4 is applied only when the system bandwidth corresponds to 10 or fewer PRBs), a value determined from the PCFICH of a specific cell or TP in the case of non-cross-carrier scheduling, and a value set by a higher layer in the case of cross-carrier scheduling. Herein, the method of dynamically determining the number of PDSCH start symbols according to the information (or another parameter/value/variable indicating the number of OFDM symbols in the control region) given by the PCFICH of the specific cell or TP may be applied if an RE (e.g., CRS, CSI-RS, tracking RS, etc.) of the specific cell or TP can be reliably detected (by, for example, a UE having an interference cancellation receiver).

The above operation of dynamically determining the PDSCH start symbol K according to the PCFICH of a specific cell or TP may also be applied to other embodiments for preventing the DL control channel region and the PDSCH region from overlapping.

For example, in a non-MBSFN subframe, the PDSCH start symbol value k may be determined to be max{K, P}. In an MBSFN subframe, the PDSCH start symbol value k may be determined to be max{(min($K_{Threshold}$, K)). Herein, K may be set to one of 0, reserved values 1, 2, 3 and 4 (4 is applied only when the system bandwidth corresponds to 10 or fewer PRBs), a value determined from the PCFICH of a specific cell or TP in the case of non-cross-carrier scheduling, and a value set by a higher layer in the case of cross-carrier scheduling. P may be set to a value determined from the PCFICH of a serving cell in the case of non-crossscheduling or a value set by a higher layer in the case of cross-carrier scheduling. $K_{Threshold}$ may be, for example, 2.

As the operation according to the second priority, if a PDSCH start symbol value is not provided by a PQI parameter set corresponding to a specific state value of the PQI field in the DCI, but there is a PDSCH start symbol value separately configured (even for a purpose other than the PQI parameter configuration), the UE may perform PDSCH demodulation (or EPDCCH decoding) using the separately configured value.

For example, the PDSCH start symbol configured separately from the PQI parameter may be information for indicating an EPDCCH start symbol value. In other words, it may be determined that EPDCCH start symbol=PDSCH start symbol. To this end, if EPDCCH start symbol information is semi-statically configured in the UE, the UE may determine a PDSCH start symbol according to the information and perform PDSCH demodulation.

As another example, even when the PDSCH start symbol information of the DL serving cell is not provided, the UE may perform PDSCH demodulation if there is PDSCH start symbol information configured for another cell or TP (e.g., a cell or TP which transmits a PDSCH through QC information about the CSI-RS). This may be interpreted as being similar to providing PDSCH start symbol information of an SCell through RRC signaling in a carrier aggregation (CA) system. Herein, the SCell may be viewed as a neighboring TP in a CoMP measurement set in the same frequency band.

For example, there may be a case in which DCI format 1A is used to perform fallback operation. In this case, information for an operation mode such as the CoMP mode (particularly, information about a PDSCH start symbol) may not be provided. Alternatively, when a DCI for scheduling a PDSCH for the CoMP mode is given, if the DCI is transmitted in the common search space in which the UE attempts to detect a scheduling message together with other UEs, the DCI may not include PDSCH start symbol information in order to maintain the same length as that of other scheduling information. If a PDSCH is scheduled by scheduling information not containing information about the PDSCH start symbol as in this case, the EPDCCH and the PDSCH may have the same start point on the same cell (or CC).

As the operation according to the third priority, if no PQI parameter is given, nor is there a value configured for other purposes, the PDSCH start symbol index may be determined to be a symbol index next to the last symbol index of the PDCCH indicated by the PCFICH of the DL serving cell (namely, PDCCH last symbol index+1), as a method to support the most basic operation.

In another example, the greatest value which can be indicated by CFI of the PCFICH plus 1 (i.e., PDCCH maximum span+1) may be determined as the value of the PDSCH start symbol index. In the case of the method of determining PDCCH maximum span+1 as the value of the PDSCH start symbol index, resource availability may be degraded when the PDCCH uses fewer symbols than the maximum span. However, this method has an advantage of simplifying and stabilizing the operation of the UE. For example, the number of OFDM symbols which can be used for the PDCCH may be defined as shown in Table 10 below. In this case, when the downlink system bandwidth corresponds to 10 or fewer RBs (i.e., $N_{RB}^{DL} \leq 10$), the maximum number of OFDM symbols for the PDCCH is 4. Accordingly, the PDSCH start symbol may be determined to be the 5th OFDM symbol (or symbol index 4 when the OFDM symbol index starts from 0).

TABLE 10

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| Subframes 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

In another example, in Table 10, the greatest value may be determined among the values indicated by the CFI (namely, the number of OFDM symbols) under given conditions such as a frame structure, whether a subframe is an MBSFN subframe or a non-MBSFN subframe, and the number of CRS antenna ports, and a symbol index corresponding to the determined greatest value plus 1 may be determined as the position of the PDSCH start symbol. The greatest value satisfying the above conditions may be determined to be the greatest value in a specific row or a specific column in Table 10.

In another example, PDSCH start symbol position information of a cell or TP other than the DL serving cell may be used. For example, the cell or TP may be a cell or TP that transmits PDSCH according to QC information about a CSI-RS. When a specific signature value (e.g., a scrambling seed value such as a physical cell identifier and a virtual cell identifier) for the cell or TP is indicated, if the PCFICH can be decoded through an RS (e.g., a CRS, tracking RS, a CSI-RS, etc.) of the cell or TP, then a symbol index next to the last symbol index of the PDCCH determined according to a CFI value indicated by the PCFICH may be determined to be the location of the PDSCH start symbol.

In an additional example, if the UE receives specific PDSCH scheduling information (e.g., information about downlink scheduling through a specific DCI format), a cell to transmit the PDSCH may be predetermined to be a specific cell other than the serving cell of the UE. In this case, what the predetermined specific cell is may be configured by a higher layer (e.g., the RRC layer).

If the PDSCH is scheduled by a DCI transmitted through the PDCCH rather than the EPDCCH, this may correspond to a case in which information about the EPDCCH start symbol is different from the information about the PDSCH start symbol or there is no information about the EPDCCH start symbol. In this case, the PDSCH start symbol value separately configured in the second priority cannot be used, and therefore the location of the PDSCH start symbol may be determined according to the third priority.

Application of PQI Parameter to PDSCH Scheduled in Fallback Mode

When reconfiguration of the transmission mode is performed with respect to the UE, the operation mode of the eNB may be inconsistent with that of the UE. In this case, both the UE and the eNB may operate in the fallback mode, which is basically supported, in order to ensure stable operation. In this embodiment, it is proposed that a PQI parameter be applied to a PDSCH scheduled in the fallback mode.

When operation is performed in the fallback mode, an operation according to the first priority (e.g., an operation performed in the case in which the PDSCH start symbol information is directly given) may not be applied. Herein, when the UE and the eNB operate in the fallback mode, if the operation according to the first priority cannot be applied, an operation according to the second priority (e.g., the operation of determining the location of the PDSCH start symbol according to the EPDCCH start symbol information) may not be performed, but an operation according to the third priority (e.g., the operation of determining a symbol index next to the PDCCH last symbol index determined by a CFI value indicated by the PCFICH as the location of the PDSCH start symbol) may be performed.

For example, the start symbol location of PDSCH transmission scheduled by a DCI format for the fallback mode (e.g., DCI format 1A) may be configured to be different from that of the EPDCCH start symbol of the same cell (CC) in order to ensure more stable fallback operation. For example, in the case in which a PDSCH is scheduled according to DCI format 1A for the fallback mode, the PDSCH may be designated as a PDSCH transmitted from a predetermined specific cell (e.g., a serving cell of the UE). This is because it is appropriate in the fallback mode to allow the serving cell to manage operation of the UE. In this case, the start symbol location of the PDSCH scheduled according to DCI format 1A is preferably configured to be identical to the PDSCH start symbol location of the serving cell.

Thereby, if the PDSCH is scheduled according to DCI format 1A, the UE may determine the PDSCH start symbol location according to a value indicated by the CFI of the PCFICH of the serving cell regardless of the start symbol location of a separately RRC-configured EPDCCH.

Alternatively, PDSCH start symbol information of the serving cell may be provided through higher layer signaling (e.g., RRC layer signaling) and operation may be performed according to the information. Herein, the PDSCH start symbol information of the serving cell indicated by a higher layer signal may be given as a PDSCH start symbol location to be applied when the PDSCH is scheduled according to DCI format 1A or as a PDSCH start symbol location to be used when the PDSCH can be assumed to be transmitted from the same location as that of a specific RS (e.g., a CRS or a specific reference CSI-RS) of the serving cell. Herein, the reference CSI-RS may be implicitly assumed to be transmitted by the serving cell, and correspond to a specific CSI-RS configuration index such as the first (or lowest) CSI-RS configuration index.

In addition, even when a PDSCH scheduling message is detected in the common search space (CSS), and the information about the PDSCH start symbol location is not contained in the PDSCH scheduling message, operation may be performed in a similar manner. In other words, in the case of DCI format 1A transmitted in the CSS in a non-MBSFN subframe, CRS-based operation needs to be performed to provide the fallback operation that ensures the same operation in all transmission modes, it is preferable to ensure that the PDSCH start symbol location is determined according to the PCFICH information of the serving cell.

To summarize the above proposal, the operation of the UE according to a first embodiment of the present invention relating to application of a PQI parameter in the fallback mode may be defined as follows.

If a PDSCH is scheduled according to DCI format 1A in the CSS in a non-MBSFN subframe, the start symbol of the PDSCH is determined based on PCFICH information (i.e., CFI) of the DL serving cell.

If a PDSCH is scheduled according to DCI format 1A in a UE-specific search space in an MBSFN subframe or a non-MBSFN subframe, the start symbol of the PDSCH is determined according to a PQI parameter matching a predetermined one of PQI state values configured for DCI format 2D. Herein, DCI format 2D exemplarily refers to a DCI format including a PQI field. In addition, the predetermined one of the PQI state values represents a default PQI state value, and may be defined as, for example, the first PQI state value or the lowest PQI state value.

As a second embodiment of the present invention relating to application of a PQI parameter in the fallback mode, a UE operation may be defined so as to allow operation in the fallback mode even when a PDSCH is scheduled by a DCI transmitted in the UE-specific search space in a non-MBSFN subframe. Thereby, the UE operation may be defined for the case of the MBSFN subframe and the non-MBSFN subframe as follows.

If a PDSCH is scheduled according to DCI format 1A in a non-MBSFN subframe, the start symbol of the PDSCH is determined based on PCFICH information (i.e., CFI) of the DL serving cell.

If a PDSCH is scheduled according to DCI format 1A in an MBSFN subframe, the start symbol of the PDSCH is determined according to a PQI parameter matching a predetermined one of PQI state values configured for DCI format 2D. Herein, DCI format 2D exemplarily refers to a DCI format including a PQI field. In addition, the predetermined one of the PQI state values represents a default PQI state value, and may be defined as, for example, the first PQI state value or the least PQI state value.

It has been proposed, in the exemplary embodiments of the present invention described above, that the PDSCH start symbol should be determined based on PCFICH information (i.e., the CFI) of the serving cell when PDSCH demodulation is performed based on the CRS. In the case of TM10, when a PDSCH is scheduled according to DCI format 1A in a non-MBSFN subframe as in the case of TM9, if CRS-based PDSCH transmission (e.g., antenna port 0 transmission or transmit diversity mode) is performed regardless of whether DCI format 1A is detected in the common search space or the UE-specific search space, the PQI parameter may not be applied as described above in the second embodiment of the present invention relating to application of the PQI parameter in the fallback mode, but the PDSCH start symbol may be determined based on the PCFICH information (i.e., the CFI) of the serving cell. Meanwhile, DCI format 1A transmitted through an EPDCCH in a non-MBSFN subframe is transmitted only in the UE-specific search space. Accordingly, as described above in the first embodiment relating to application of a PQI parameter in the fallback mode, the PDSCH start symbol of a PDSCH scheduled according to DCI format 1A received through the common search space in a non-MBSFN subframe may be determined based on the PCFICH information (i.e., the CFI) of the serving cell, while a PQI parameter corresponding to a specific PQI state value may be applied to a PDSCH scheduled according to another DCI format 1A.

Regarding the first and second embodiments of the present invention relating to application of a PQI parameter in the fallback mode, UE operations according to an additional embodiment performed depending on whether DCI format 1A is transmitted over an EPDCCH or a PDCCH may be defined as follows.

A variation of the first embodiment relating to application of a PQI parameter in the fallback mode may be defined as follows.

- If a PDSCH is scheduled according to DCI format 1A transmitted through an EPDCCH in the common search space in a non-MBSFN subframe, the start symbol of the PDSCH is determined according to the EPDCCH start symbol. Herein, the EPDCCH start symbol may be determined based on the PCFICH information (i.e., the CFI) of the serving cell, or determined according to an RRC-configured EPDCCH start symbol value.
- If a PDSCH is scheduled according to DCI format 1A transmitted through a PDCCH in the common search space in a non-MBSFN subframe, the start symbol of the PDSCH is determined based on the PCFICH information (i.e., the CFI) of a DL serving cell.
- If a PDSCH is scheduled according to DCI format 1A in the UE-specific search space in an MBSFN subframe or a non-MBSFN subframe, the start symbol of the PDSCH is determined according to a PQI parameter matching a predetermined one of PQI state values configured for DCI format 2D, regardless of whether transmission is performed through the PDCCH or the EPDCCH. Herein, DCI format 2D exemplarily refers to a DCI format including a PQI field. In addition, the predetermined one of the PQI state values represents a default PQI state value, and may be defined as, for example, the first PQI state value or the lowest PQI state value.

A variation of the second embodiment relating to application of a PQI parameter in the fallback mode may be defined as follows.

- If a PDSCH is scheduled according to DCI format 1A transmitted through an EPDCCH in a non-MBSFN subframe, the start symbol of the PDSCH is determined according to the EPDCCH start symbol. Herein, the EPDCCH start symbol may be determined based on the PCFICH information (i.e., the CFI) of the serving cell, or determined according to an RRC-configured EPDCCH start symbol value.
- If a PDSCH is scheduled according to DCI format 1A transmitted through a PDCCH in a non-MBSFN subframe, the start symbol of the PDSCH is determined based on the PCFICH information (i.e., the CFI) of a DL serving cell.
- If a PDSCH is scheduled according to DCI format 1A in an MBSFN subframe, the start symbol of the PDSCH is determined according to a PQI parameter matching a predetermined one of PQI state values configured for DCI format 2D regardless of whether transmission is performed through the PDCCH or the EPDCCH. Herein, DCI format 2D exemplarily refers to a DCI format including a PQI field. In addition, the predetermined one of the PQI state values represents a default PQI state value, and may be defined as, for example, the first PQI state value or the lowest PQI state value.

The various embodiments of the present invention relating to a method for determining the PDSCH start symbol in the fallback mode (e.g., when the PDSCH is scheduled according to DCI format 1A) described above may be similarly applied to the operation of determining a CRS RM (Rate Matching) pattern (e.g., the number of CRS ports, CRS frequency shift information, MBSFN configuration information, etc.). This serves to eliminate ambiguity and promote stability by determining the PDSCH start symbol according to the PCFICH information (i.e., the CFI) of a serving cell in the case of CRS-based PDSCH transmission (e.g., antenna port 0 transmission or transmit diversity mode) scheduled according to fallback mode DCI format 1A. Accordingly, it is appropriate to determine PDSCH RE mapping according to the CRS RM pattern of the serving cell for the same purpose. That is, a PQI parameter (e.g., PDSCH start symbol information, CRS RM pattern, etc.) corresponding to a specific PQI state value (e.g., the first PQI state value or the lowest PQI state value) configured for DCI format 2D is preferably applied only to PDSCH transmission (e.g., DMRS-based PDSCH transmission) other than CRS-based PDSCH transmission (e.g., antenna port 0 transmission or transmit diversity mode). When the CRS RM pattern is determined in this way, PDSCH RE mapping may be correspondingly determined.

Herein, demodulation of a PDSCH transmitted based on the CRS may be performed using a part of the PQI parameter, and the other parameters may match information of the serving cell. For example, only information about ZP CSI-RS configuration and/or PDSCH start symbol may be applied to demodulation of the PDSCH transmitted based on the CRS among the parameters included in the PQI parameter set, and information about the CRS RM pattern may not be applied (namely, the CRS RM pattern may match the information of the serving cell). Corresponding UE operations may be defined as follows.

- If a PDSCH is scheduled according to DCI format 1A in the common search space in a non-MBSFN subframe, the CRS RM pattern is determined based on the CRS RM pattern information of the DL serving cell. Herein, the CRS RM pattern information of the serving cell may include, for example, the number of CRS ports of the serving cell, CRS frequency shift of the serving cell, and an MBSFN subframe configuration of the serving cell.
- If a PDSCH is scheduled according to DCI format 1A in the UE-specific search space in an MBSFN subframe or a non-MBSFN subframe, the CRS RM pattern is determined based on a parameter associated with the CRS RM pattern among the PQI parameters depending on a predetermined one of PQI state values configured for DCI format 2D. Herein, DCI format 2D refers to a DCI format including a PQI field. In addition, the predetermined one of the PQI state values represents a default PQI state value, and may be defined as, for example, the first PQI state value or the lowest PQI state value. In addition, the parameter associated with the CRS RM pattern among the PQI parameters corresponds to the number of CRS ports (e.g., 1, 2, 4, or reserved value), CRS frequency shift, and an MBSFN subframe configuration.

According to an embodiment of the present invention relating to determination of the CRS RM pattern, in order to ensure operation in the fallback mode in the case in in which a PDSCH is scheduled according to DCI transmitted in the UE-specific search space in a non-MBSFN subframe, the following UE operations may be defined. Thereby, UE operations may be defined separately according to the MBSFN subframe and the non-MBSFN subframe respectively.

- If a PDSCH is scheduled according to DCI format 1A in a non-MBSFN subframe, the CRS RM pattern is determined based on the CRS RM pattern information of the DL serving cell. Herein, the CRS RM pattern information of the serving cell may include, for example, the number of CRS ports of the serving cell, CRS frequency shift of the serving cell, and an MBSFN subframe configuration of the serving cell.

If a PDSCH is scheduled according to DCI format 1A in an MBSFN subframe, the CRS RM pattern is determined based on a parameter associated with the CRS RM pattern among the PQI parameters depending on a predetermined one of PQI state values configured for DCI format 2D. Herein, DCI format 2D exemplarily refers to a DCI format including a PQI field. In addition, the predetermined one of the PQI state values represents a default PQI state value, and may be defined as, for example, the first PQI state value or the lowest PQI state value. In addition, the parameter associated with the CRS RM pattern among the PQI parameters corresponds to the number of CRS ports (e.g., 1, 2, 4, or reserved value), CRS frequency shift, and an MBSFN subframe configuration.

According to a variation of the embodiment, regardless of the subframe type (e.g., MBSFN or non-MBSFN) and the search space type (e.g., common search space or UE-specific search space), if a PDSCH is scheduled according to DCI format 1A, the UE may operate according to a PQI parameter corresponding to a predetermined one (e.g., the lowest PQI state value) of the PQI state values configured for DCI format 2D. If a CRS-based PDSCH is scheduled, however, the UE may not be allowed to expect that PDSCH start symbol information and/or CRS RM pattern information, which are PQI parameters, will be RRC-configured according to information of a cell other than the serving cell. Corresponding UE operations may be summarized as follows.

First, a UE operation for the CRS RM information may be defined as follows.

If a PDSCH is scheduled according to DCI format 1A in a non-MBSFN subframe, the UE is not allowed to expect that a parameter associated with the CRS RM pattern indicated by a predetermined one of the PQI state values configured for DCI format 2D will differ from the CRS RM information of the serving cell of the UE. Herein, DCI format 2D refers to a DCI format including a PQI field. In addition, the predetermined one of the PQI state values represents a default PQI state value, and may be defined as, for example, the first PQI state value or the lowest PQI state value. In addition, the parameter associated with the CRS RM pattern among the PQI parameters corresponds to the number of CRS ports (e.g., 1, 2, 4, or reserved value), CRS frequency shift, and an MBSFN subframe configuration.

The above UE operation may be expressed as follows.

When the UE set to TM10 receives a PDSCH demodulated through ports 0 to 3, the UE may assume that the number of CRS ports in a PQI state defining RE mapping of the PDSCH, v-shift (or frequency shift), and MBSFN subframe configuration information as given are identical to those of the serving cell. Herein, ports 0 to 3 represent CRS antenna port indexes.

Next, a UE operation for the PDSCH start symbol information may be defined as follows.

If a PDSCH is scheduled according to DCI format 1A in a non-MBSFN subframe, the UE is not allowed to expect that PDSCH start symbol information indicated by a predetermined one of the PQI state values configured for DCI format 2D will differ from the PDSCH start symbol information of the serving cell of the UE. Herein, DCI format 2D refers to a DCI format including a PQI field. In addition, the predetermined one of the PQI state values represents a default PQI state value, and may be defined as, for example, the first PQI state value or the lowest PQI state value.

The above UE operation may be expressed as follows.

When the UE set to TM10 receives a PDSCH demodulated through ports 0 to 3, the UE may assume that the start symbol information of a PQI state defining the start symbol of the PDSCH as given is identical to that of the serving cell. Herein, ports 0 to 3 represent CRS antenna port indexes.

According to another variation of the embodiment, if a PDSCH is scheduled according to DCI format 1A, the UE may operate according to a PQI parameter corresponding to a predetermined one (e.g., the lowest PQI state value) of the PQI state values configured for DCI format 2D. If a PDSCH is scheduled according to DCI format 1A transmitted in the common search space in a non-MBSFN subframe, the UE may not be allowed to expect that PDSCH start symbol information and/or CRS RM pattern information, which are PQI parameters, will be RRC-configured according to information of a cell other than the serving cell. Corresponding UE operations may be summarized as follows.

First, a UE operation for the CRS RM information may be defined as follows.

If a PDSCH is scheduled according to DCI format 1A in the common search space in a non-MBSFN subframe, the UE is not allowed to expect that a parameter associated with the CRS RM pattern indicated by a predetermined one of the PQI state values configured for DCI format 2D will differ from the CRS RM information of the serving cell of the UE. Herein, DCI format 2D refers to a DCI format including a PQI field. In addition, the predetermined one of the PQI state values represents a default PQI state value, and may be defined as, for example, the first PQI state value or the lowest PQI state value. In addition, the parameter associated with the CRS RM pattern among the PQI parameters corresponds to the number of CRS ports (e.g., 1, 2, 4, or reserved value), CRS frequency shift, and an MBSFN subframe configuration.

Next, a UE operation for the PDSCH start symbol information may be defined as follows.

If a PDSCH is scheduled according to DCI format 1A in the common search space in a non-MBSFN subframe, the UE is not allowed to expect that PDSCH start symbol information indicated by a predetermined one of the PQI state values configured for DCI format 2D will differ from the PDSCH start symbol information of the serving cell of the UE. Herein, DCI format 2D refers to a DCI format including a PQI field. In addition, the predetermined one of the PQI state values represents a default PQI state value, and may be defined as, for example, the first PQI state value or the lowest PQI state value.

PDSCH QCL Behavior and EPDCCH QCL Behavior

In the above description of various proposed embodiments of the present invention, Behavior A and Behavior B have been defined as QC behaviors (or PDSCH QCL behaviors) for a PDSCH. To summarize the behaviors, PDSCH QCL Behavior A is a behavior of assuming a QCL relationship among a serving cell CRS, a CSI-RS and a PDSCH DMRS, and PDSCH QCL Behavior B is a behavior of assuming a QCL relationship between a CSI-RS (e.g., a CSI-RS which is QCL with a CRS of a specific cell) and a PDSCH DMRS.

In the above description of various proposed embodiments of the present invention, Behavior A and Behavior B have been defined as QC behaviors (or EPDCCH QCL behaviors) for an EPDCCH. To summarize the behaviors, EPDCCH QCL Behavior A is a behavior of assuming a QCL relationship between an EPDCCH DMRS and a serving cell CRS, and EPDCCH QCL Behavior B is a behavior of a QCL relationship between an EPDCCH DMRS and a CSI-RS.

According to an additional embodiment of the present invention, EPDCCH QCL Behavior A and EPDCCH QCL Behavior B may be configured with a restriction depending on a PDSCH QCL behavior that is RRC-configured.

For example, if the UE is configured for PDSCH QCL Behavior A (i.e., QCL among a serving cell CRS, a CSI-RS and a DMRS), EPDCCH QCL Behavior A (i.e., QCL between a serving cell CRS and an EPDCCH DMRS) may be automatically configured. In other words, if the UE is configured for PDSCH QCL Behavior A, the EPDCCH QCL behavior should be configured only as EPDCCH QCL Behavior A. In other words, if the UE is configured for PDSCH QCL Behavior A, the UE is not allowed to expect that EPDCCH QCL Behavior B (i.e., QCL between a CSI-RS and an EPDCCH DMRS) will be configured. If the UE is configured for PDSCH QCL Behavior A, information about an NZP CSI-RS configuration intended for QCL may not be included in the PQI parameters. Thereby, when EPDCCH QCL Behavior B is configured, the UE cannot identify a CSI-RS with which the EPDCCH DMRS is QCL. Accordingly, if the UE is configured for PDSCH QCL Behavior A, it is appropriate to configure EPDCCH QCL Behavior A in order to eliminate such ambiguity. For a similar purpose, when EPDCCH Behavior A is configured, PDSCH Behavior A may be configured.

In another example, if the UE is configured for PDSCH QCL Behavior B (i.e., QCL between a CSI-RS and a DMRS), EPDCCH QCL Behavior B (i.e., QCL between a CSI-RS and an EPDCCH DMRS) may be automatically configured. In other words, if the UE is configured for PDSCH QCL Behavior B, the EPDCCH QCL behavior should be configured only as EPDCCH QCL Behavior B. In other words, if the UE is configured for PDSCH QCL Behavior B, the UE is not allowed to expect that EPDCCH QCL Behavior A (i.e., QCL between the serving cell CRS and the EPDCCH DMRS) will be configured. This is intended to maintain unity of a PDSCH QCL behavior and an EPDCCH QCL behavior. Similarly, if EPDCCH Behavior B is configured, PDSCH Behavior B may be configured.

In other words. restrictions may be applied such that both the PDSCH QCL behavior and the EPDCCH QCL behavior are configured as QCL Behaviors A or as QCL Behaviors B. That is, the PDSCH QCL behavior and the EPDCCH QCL behavior may be RRC-configured so as to be connected to or dependent on each other.

Meanwhile, if the UE is configured for PDSCH QCL Behavior B (i.e., QCL between a CSI-RS and a DMRS), the EPDCCH QCL behavior may be configured as either EPDCCH QCL Behavior A ((i.e., QCL between a serving cell CRS and an EPDCCH DMRS) or EPDCCH QCL Behavior B (i.e., QCL between a CSI-RS and an EPDCCH DMRS). That is, only when the UE is configured for PDSCH QCL Behavior B, restrictions may be eased such that the EPDCCH QCL behavior may be RRC-configured as EPDCCH QCL Behavior A or B.

Similarly, if EPDCCH QCL Behavior B is configured, one of PDSCH QCL Behaviors A and B may be configured.

Alternatively, the aforementioned restrictions may not be applied in order to provide independency of configuration between the PDSCH QCL behavior and the EPDCCH QCL behavior. Specifically, if the UE is configured for PDSCH QCL Behavior A (i.e., QCL among a serving cell CRS, a CSI-RS and a DMRS), the EPDCCH QCL Behavior may be configured as either EPDCCH QCL Behavior A (i.e., QCL between a serving cell CRS and an EPDCCH DMRS) or EPDCCH QCL Behavior B (i.e., QCL between a CSI-RS and an EPDCCH DMRS).

Similarly, if EPDCCH QCL Behavior A is configured, the UE may be configured for one of PDSCH QCL Behaviors A and B.

Meanwhile, one specific PQI state value to be applied to each EPDCCH set (or to be used for demodulation of a PDSCH scheduled by DCI transmitted through an EPDCCH and/or for decoding of the EPDCCH) may be RRC-configured. In this case, if EPDCCH Behavior A (i.e., QCL between a serving cell CRS and an EPDCCH DMRS), the UE may operate according to some of the PQI parameters included in a PQI parameter set linked to the one indicated specific PQI state value and to other PQI parameters of the DL serving cell, in order to perform PDSCH demodulation and/or EPDCCH decoding.

Herein, the PQI parameters included in a PQI parameter set linked to the one RRC-indicated specific PQI state value may include the number of CRS ports, CRS frequency shift, MBSFN subframe configuration information, NZP CSI-RS configuration information, ZP CSI-RS configuration information, and PDSCH start symbol information.

For example, the UE may operate according to only the PDSCH start symbol information among the PQI parameters included in a PQI parameter set linked to the one RRC-indicated specific PQI state value and to the other parameters of the serving cell.

In another example, the UE may operate according to only CRS RM pattern information (e.g., the number of CRS ports of a serving cell, CRS frequency shift of the serving cell, and MBSFN subframe configuration of the serving cell) among the PQI parameters included in a PQI parameter set linked to one RRC-indicated specific PQI state value and to the other parameters of the serving cell.

In yet another example, the UE may operate according to only ZP CSI-RS configuration information among the PQI parameters included in a PQI parameter set linked to one RRC-indicated specific PQI state value and to the other parameters of the serving cell.

In yet another example, the UE may operate according to only PDSCH start symbol information and CRS RM pattern information (e.g., the number of CRS ports of a serving cell, CRS frequency shift of the serving cell, and MBSFN subframe configuration of the serving cell) among the PQI parameters included in a PQI parameter set linked to one RRC-indicated specific PQI state value and to the other parameters of the serving cell.

In yet another example, the UE may operate according to only PDSCH start symbol information and information of one ZP CSI-RS configuration among the PQI parameters included in a PQI parameter set linked to one RRC-indicated specific PQI state value and to the other parameters of the serving cell.

In yet another example, the UE may operate according to only CRS RM pattern information (e.g., the number of CRS ports of a serving cell, CRS frequency shift of the serving cell, and MBSFN subframe configuration of the serving cell) and information of one ZP CSI-RS configuration among the PQI parameters included in a PQI parameter set linked to one RRC-indicated specific PQI state value and to the other parameters of the serving cell.

In yet another example, the UE may operate according to only PDSCH start symbol information, CRS RM pattern information (e.g., the number of CRS ports of a serving cell, CRS frequency shift of the serving cell, and MBSFN subframe configuration of the serving cell) and one ZP CSI-RS configuration information among the PQI parameters included in a PQI parameter set linked to one RRC-indicated specific PQI state value and to the other parameters of the serving cell.

Configuration of PQI Field

DCI format 2D for a new transmission mode (e.g., TM10) whose main feature is to support CoMP operation may include a PQI field. The PQI field may be defined to have a size of N bits, thereby indicating one of $2^N$ state values. PQI parameter sets corresponding to the $2^N$ PQI state values respectively may be RRC-configured. One PQI parameter set may include the number of CRS ports, CRS frequency shift, MBSFN subframe configuration information, NZP CSI-RS configuration information, ZP CSI-RS configuration information, and PDSCH start symbol information. Accordingly, one of the $2^N$ PQI parameter sets may be dynamically indicated or switched according to the PQI state value.

Meanwhile, DCI format 1A for the fallback operation in TM10 is defined not to include a PQI field. In other words, DCI format 1A in TM10 without the PQI field means that a non-CoMP operation is supported by DCI format 1A, and may be interpreted as meaning that only non-CoMP transmission from, for example, a DL serving cell is scheduled.

In another example, DCI format 1A transmitted in the common search space may be defined not to include the PQI field in order to maintain the same length as that of the other DCI formats. On the other hand, DCI format 1A transmitted in the UE-specific search space may be defined to include the PQI field as in the case of DCI format 2D, thereby supporting the CoMP operation.

In yet another example, DCI format 1A transmitted in a non-MBSFN subframe may be defined not to include a PQI field, while DCI format 1A transmitted in an MBSFN subframe may be defined to include the PQI field as in the case of DCI format 2D. Thereby, the CoMP operation may be supported.

In yet another example, DCI format 1A transmitted in the common search space in a non-MBSFN subframe may be defined not to include the PQI field, while DCI format 1A transmitted in an MBSFN subframe and DCI format 1A transmitted in the UE-specific search space in a non-MBSFN subframe may be defined to include the PQI field as in the case of DCI format 2D. Thereby, the CoMP operation may be supported.

In yet another example, DCI format 1A transmitted in a non-MBSFN subframe and DCI format 1A transmitted in the common search space in an MBSFN subframe may be defined not to include a PQI field, while DCI format 1A transmitted in the UE-specific search space in an MBSFN subframe may be defined to include the PQI field as in the case of DCI format 2D. Thereby, the CoMP operation may be supported.

Meanwhile, the PQI bit width (i.e., N) may be differently defined depending on UE capabilities. For example, UE capability for the maximum number (N_P) of CSI processes supported (in TM10) may be defined, and the UE may inform the eNB of the UE capability. For example, N_P may be defined as N_P=1, 3, or 4.

According to one embodiment of the present invention, it is proposed that the PQI bit width (N) be determined according to the value of N_P (N may be defined to indicate the PQI bit width, the number of PQI states, an encoding pattern of PQI states, or the like).

If N_P=1, an explicit bit for the PQI may be defined as being not present in a DCI format. In this case, although there is no explicit bit for the PQI, a PQI parameter set for one default PQI state may be RRC-signaled as default information, or RRC-configured parameters corresponding to a default PQI state used in DCI format 1A may be defined to be used in DCI format 2D without separate RRC signaling.

Alternatively, if N_P=1, an explicit bit for the PQI may not be defined, but 2 associated state values (0 or 1) may be used as PQI state values according to the value of the nSCID field.

Alternatively, if N_P=1, an explicit bit for the PQI may be included in the DCI format. Thereby, 2 PQI state values may be provided.

If N_P=3 or 4, 2 explicit bits for the PQI may be defined to be included in the DCI format.

Alternatively, if N_P=3 or 4, 1 explicit bit for the PQI may be included in the DCI format, and 2 associated state values (0 and 1) may be combined according to the 1 bit and the value of the nSCID field to indicate one of 3 or 4 PQI states.

Alternatively, if N_P=3, only one explicit bit for the PQI may be applied, and 2 state values may be restrictively used.

In the examples described above, PQI bit width (or the number of PQI states) N is statically determined according to the UE capability value N_P for the maximum number of supported CSI processes. Similarly, the maximum value of the PQI bit width (or the number of PQI states) may be determined according to the value of N_P. That is, a PQI parameter set may be RRC-configured within the maximum value of the PQI bit width.

Meanwhile, RRC parameter set information of a PQI state to be used in DCI format 1A may be statically used for a specific PQI state (e.g., the lowest state index) of DCI format 2D. In addition, as a PQI parameter to be used in the case of DCI format 1A, a PQI parameter indicated by a specific PQI state of DCI format 2D may be RRC-configured.

Figure 12:
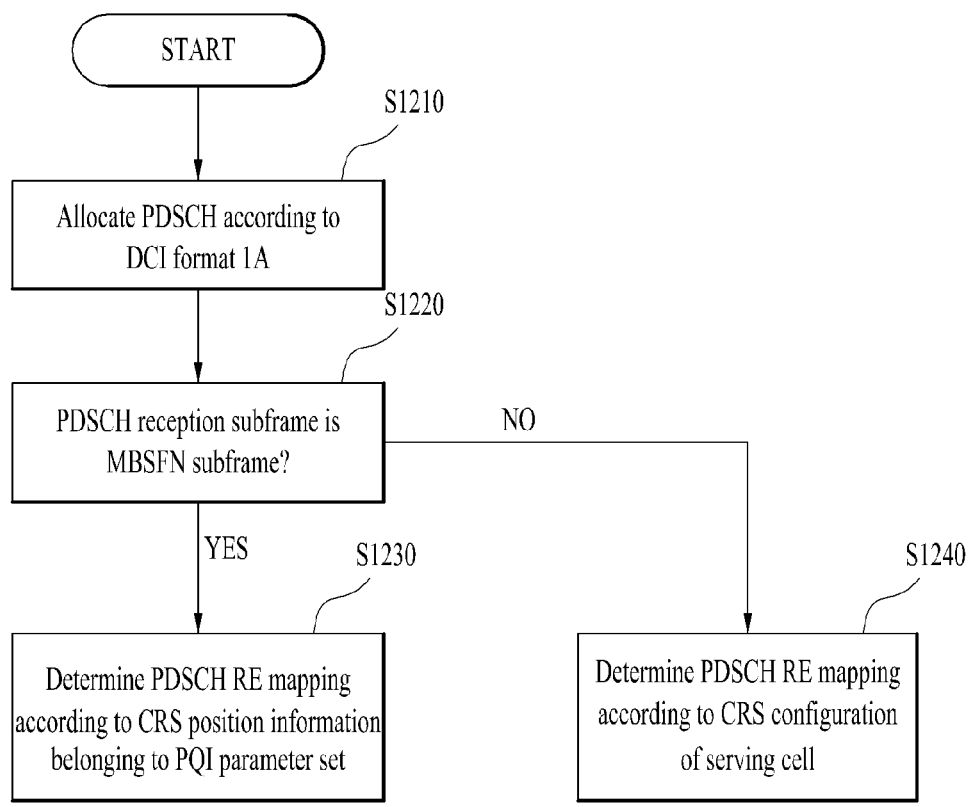
FIG. 12 is a flowchart illustrating a method for transmitting and receiving a PDSCH signal according to one embodiment of the present invention.

FIG. 12 is a flowchart illustrating a method for transmitting and receiving a PDSCH signal according to one embodiment of the present invention.

In step S1210, the UE may be assigned a PDSCH according to DCI format 1A by an eNB. If the UE is set to TM10, the PDSCH allocated according to DCI format 1A corresponds to a PDSCH scheduled in the fallback mode.

In step S1220, the UE may determine whether or not the PDSCH reception subframe is an MBSFN subframe. If the subframe is an MBSFN subframe, the CRS is not transmitted in the data region, and thus CRS-based PDSCH transmission (e.g., antenna port 0 transmission or transmit diversity mode) cannot be performed. Accordingly, in this case, DMRS-based PDSCH transmission (e.g., PDSCH transmission through antenna port 7) may be performed.

If the subframe is determined to be an MBSFN subframe as a result of step S1220, the process may proceed to step S1230.

In step S1230, the UE may determine an RE to which the PDSCH is mapped (or PDSCH RE mapping) based on CRS position information (e.g., number-of-CRS ports information, CRS frequency shift information, MBSFN subframe configuration information, etc.) belonging to a PQI parameter set. Specifically, the UE may determine an RE location to which a CRS is mapped, based on CRS position information and assume that an RE to which the PDSCH is not mapped is not used for the CRS. The UE may decode the PDSCH and receive a PDSCH signal based on this assumption.

Herein, the PQI parameter set may be a default parameter set (e.g., a PQI parameter set having the lowest index) of a plurality of PQI parameter sets configured for the UE by a higher layer.

If the subframe is not an MBSFN subframe as a result of step S1220 (namely, if the subframe is a non-MBSFN subframe), operation may proceed to step S1240.

In step S1240, the UE may determine the RE to which the PDSCH is mapped (or PDSCH RE mapping) based on the CRS configuration of the serving cell. Specifically, the UE may determine the RE location to which the CRS is mapped in a corresponding downlink subframe, based on the number of CRS ports of a serving cell, CRS frequency shift of the serving cell, MBSFN subframe configuration of the serving cell, and the like, and may assume that the RE to which the PDSCH is mapped is not used for the CRS. Based on such assumption, the UE may decode the PDSCH and receive a PDSCH signal.

As described above, for a PDSCH allocated according to DCI 1A, the UE may determine PDSCH RE mapping according to a subframe type (e.g., MBSFN or non-MBSFN), and receive a PDSCH signal.

Regarding the PDSCH signal transmission and reception method described above with reference to FIG. 12, details of the various embodiments of the present invention described above may be independently applied or two or more embodiments may be simultaneously applied. Redundant description is omitted.

Figure 13:
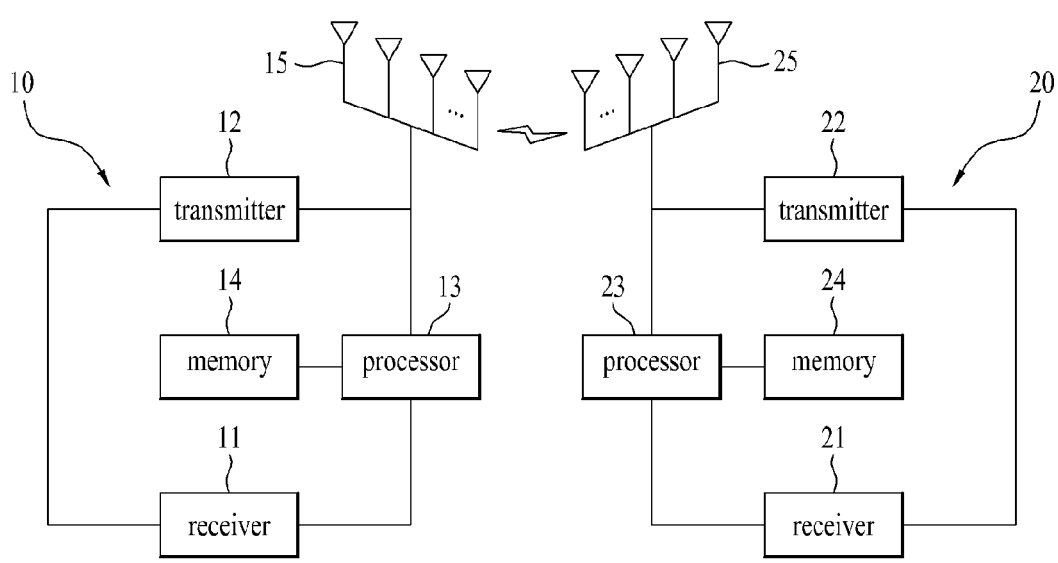
FIG. 13 is a diagram illustrating configurations of a base station and a user equipment.

FIG. 13 is a diagram illustrating configurations of a UE and an eNB according to one embodiment of the present invention.

Referring to FIG. 13, an eNB 10 may include a receive module 11, a transmit module 12, a processor 13, a memory 14, and a plurality of antennas 15. The receive module 11 may receive various signals, data and information from external devices (e.g., a UE). The transmit module 12 may transmit various signals, data and information to external devices (e.g., a UE). The processor 12 may control overall operation of the eNB 10. The antennas 15 suggest that the eNB 10 supports MIMO transmission and reception.

According to one embodiment of the present invention, the eNB 10 may be configured to transmit a PDSCH signal to the UE 20. The processor 13 may control the transmit module 12 to signal information about PDSCH allocation to the UE 20 through DCI format 1A. If the subframe in which the PDSCH is transmitted is an MBSFN subframe, the processor 13 may determine PDSCH RE mapping according to CRS position information belonging to one default parameter set of the PQI parameter sets configured for the UE through higher layer signaling. Then, the processor 13 may map the PDSCH signal to a downlink subframe and transmit the same to the UE 20 via the transmit module 12. If the subframe in which the PDSCH is transmitted is a non-MBSFN subframe, the processor 13 may determine PDSCH RE mapping according to a CRS configuration of the serving cell. Then, the processor 13 may map the PDSCH signal to a downlink subframe and transmit the same to the UE 20 via the transmit module 12.

Additionally, the processor 12 of the eNB 10 may function to operationally process information received by the eNB 10 or information to be transmitted from the eNB 10, and the memory 14, which may be replaced with an element such as a buffer (not shown), may store the processed information for a predetermined time.

Referring to FIG. 13, a UE 20 may include a receive module 21, a transmit module 22, a processor 23, a memory 24, and a plurality of antennas 25. The receive module 21 may receive various signals, data and information from external devices (e.g., an eNB). The transmit module 22 may transmit various signals, data and information to external devices (e.g., an eNB). The processor 23 may control overall operation of the UE 20. That there are plural antennas 25 suggests that the UE 20 supports MIMO transmission and reception.

According to one embodiment of the present invention, the UE 20 may be configured to receive a PDSCH signal from the eNB 10. The processor 23 may be configured to determine PDSCH RE mapping in a downlink subframe. The processor 23 may be configured to receive a PDSCH signal using the receive module 21 on the assumption that the PDSCH RE mapping is performed. The processor 23 may receive PDSCH allocation information through downlink control information (DCI). If the DCI is configured according to DCI format 1A and the downlink subframe is an MBSFN subframe, the processor 23 may determine the PDSCH RE mapping according to CRS position information included in a PQI parameter set configured by a higher layer. If the DCI is configured according to DCI format 1A and the downlink subframe is a non-MBSFN subframe, the processor 23 may determine the PDSCH RE mapping according to a CRS configuration of the serving cell.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the eNB 10 and the UE 20 as described above may be implemented such that details of the various embodiments described above are independently applied or two or more embodiments are simultaneously applied. Redundant description is omitted.

In describing the various embodiments of the present invention above, the eNB has been exemplarily described as serving as a downlink transmit entity or an uplink receive entity, and the UE has been exemplarily described as serving as a downlink receive entity or an uplink transmit entity. However, embodiments of the present invention are not limited thereto. For example, the description of the eNB given above may be equally applied to a case in which a cell, an antenna port, an antenna port group, an RRH, a transmission point, a reception point, an access point, and a relay serve as a downlink transmit entity or an uplink receive entity with respect to the UE. In addition, the principle of the present invention described above through various embodiments may be equally applied to a case in which a relay serves as a a downlink transmit entity or an uplink receive entity with respect to the UE or to a case in which the relay serves as an uplink transmit entity or a downlink receive entity with respect to the eNB.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention described above are applicable to various mobile communication systems.

The invention claimed is:

1. A method for receiving a physical downlink shared channel (PDSCH) signal by a user equipment (UE) in a wireless communication system, the method comprising:
   determining a resource element (RE) to which the PDSCH is mapped in a downlink subframe; and
   receiving the PDSCH signal based on the RE to which the PDSCH is mapped,
   wherein the PDSCH is scheduled by downlink control information (DCI), and
   wherein when the DCI is configured according to DCI format 1A, and the downlink subframe is a Multicast Broadcast Single Frequency Network (MBSFN) subframe, the RE to which the PDSCH is mapped is determined according to Cell-specific Reference Signal (CRS) position information contained in a PDSCH resource element mapping and Quasi co-location Indicator (PQI) parameter set configured by a higher layer.

2. The method according to claim 1, wherein the CRS position information contained in the PQI parameter set comprises at least one of number-of-CRS ports information, CRS frequency shift information and MBSFN subframe configuration information.

3. The method according to claim 1, wherein the PQI parameter set is a PQI parameter set having a lowest index.

4. The method according to claim 1, wherein, when the DCI is configured according to the DCI format 1A and the downlink subframe is a non-MBSFN subframe, the RE to which the PDSCH is mapped is determined according to a CRS configuration of a serving cell.

5. The method according to claim 4, wherein the CRS configuration of the serving cell comprises at least one of a number of CRS ports of the serving cell, CRS frequency shift of the serving cell and an MBSFN subframe configuration of the serving cell.

6. The method according to claim 1, wherein the RE to which the PDSCH is mapped is not used for the CRS.

7. The method according to claim 1, wherein, when the DCI is configured according to DCI format 2D, the PQI parameter set is determined according to a state value of a PQI field of the DCI format 2D.

8. The method according to claim 1, wherein the DCI is received through a physical downlink control channel (PDCCH) or an enhanced PDCCH (EPDCCH).

9. The method according to claim 1, wherein the PQI parameter set comprises at least one of parameters corresponding to number-of-CRS ports information, CRS frequency shift information, MBSFN subframe configuration information, Zero Power Channel State Information Reference Signal (ZP CSI-RS) configuration information, a PDSCH start symbol value, and Non-Zero Power (NZP) CSI-RS configuration information.

10. The method according to claim 1, wherein the UE is set to transmission mode 10 (TM10).

11. A user equipment (UE) for receiving a physical downlink shared channel (PDSCH) signal in a wireless communication system, the UE comprising:
    a transmit module;
    a receive module; and
    a processor,
    wherein the processor is configured to determine a resource element (RE) to which the PDSCH is mapped in a downlink subframe and to receive the PDSCH signal based on the RE to which the PDSCH is mapped using the receive module,
    wherein the PDSCH is scheduled by downlink control information (DCI), and
    wherein when the DCI is configured according to DCI format 1A, and the downlink subframe is a Multicast Broadcast Single Frequency Network (MBSFN) subframe, the RE to which the PDSCH is mapped is determined according to Cell-specific Reference Signal (CRS) position information contained in a PDSCH resource element mapping and Quasi co-location Indicator (PQI) parameter set configured by a higher layer.

* * * * *